United States Patent [19]
Shah et al.

[11] Patent Number: 5,717,614
[45] Date of Patent: Feb. 10, 1998

[54] SYSTEM AND METHOD FOR HANDLING EVENTS IN AN INSTRUMENTATION SYSTEM

[75] Inventors: Abhay S. Shah, Austin, Tex.; Jogen Pathak, Chandler, Ariz.; Bob Mitchell, Austin, Tex.; Hugo A. Andrade, Austin, Tex.; Samson L. DeKey, Austin, Tex.; Todd Brower, Austin, Tex.

[73] Assignee: National Instruments Corporation, Austin, Tex.

[21] Appl. No.: 438,438

[22] Filed: May 10, 1995

Related U.S. Application Data

[63] Continuation-in-part of Ser. No. 238,480, May 4, 1994.
[51] Int. Cl.$^6$ ................................................. G05B 23/02
[52] U.S. Cl. ................................. 364/579; 395/733
[58] Field of Search ............................... 364/579, 550; 395/867–870, 650, 733–742, 828–839

[56] References Cited

U.S. PATENT DOCUMENTS

| | | | |
|---|---|---|---|
| 4,855,905 | 8/1989 | Estrada et al. | 364/200 |
| 5,111,423 | 5/1992 | Kopec, Jr. et al. | 395/500 |
| 5,191,655 | 3/1993 | Sarkissian | 395/275 |
| 5,337,262 | 8/1994 | Luthi et al. | 364/550 |
| 5,359,546 | 10/1994 | Hayes et al. | 364/579 |
| 5,361,336 | 11/1994 | Atchison . | |
| 5,390,325 | 2/1995 | Miller | 395/575 |

OTHER PUBLICATIONS

*Hewlett Packard SICL Standard Instrument Control Library for C Programming,* Lee Atchinson, VXI Systems Division, Hewlett Packard Company, Jan. 21, 1994, Revision 3.9, pp. i–iii, i–iii, 1–136, Index.

*Primary Examiner*—James P. Trammell
*Attorney, Agent, or Firm*—Conley, Rose & Tayon; Jeffrey C. Hood

[57] ABSTRACT

A system and method for improved handling of events in an instrumentation system which provides numerous features and advantages over prior art methods. The present invention provides simplified application development and improved performance for instrumentation systems. The instrumentation system of the present invention provides event queueing, event handling, and suspend handling features, thus providing the user or developer with greater freedom in designing his test and measurement or process control application. The present invention includes a single operation referred to as viEnableEvent which is used for enabling events of all event types, and a single operation for installing handlers for all event types, referred to as viInstallHandlr. The operation viEnableEvent includes one or more parameters which can be specified as a filter to qualify the types of events desired to be received at the time of the event occurrence. This provides the user with greater control over which events are specified to be received. The present invention further includes an auto-acknowledge capability which enables a resource to automatically provide an acknowledge to an instrument generating an interrupt. An auto-enable feature is included for resources within the system which provides that if there are multiple sessions, the first session for which events are enabled enables the respective event receiving hardware, and the hardware remains enabled until the last session has been disabled. The present invention further provides several different mechanisms for generating interrupts within the system. For example, a user application can cause a resource to signal a session that an event has occurred, thus enabling the user application to create events within the system. Alternatively, an event can be generated internally to a resource and constructed within a resource. Further, an asynchronous notification method is provided whereby an event could be generated by a first resource and trapped by a second resource.

58 Claims, 35 Drawing Sheets

Example VISA Configuration

Example VISA Distributed Configuration

VISA Resource Classes vs. VISA Resources

Event Model Event Lifecycle

State Diagram for the Queuing Mechanism

State Diagram for the Callback Mechanism

```
status = viOpen(viDefaultRM, "VICO(GPIB1::5)", 0, 0, &vi);
status = viEnableEvent (vi, VI_EVENT_SERVICE_REQ, VI_QUEUE, VI_NULL);   ← Enable event for queuing status = viWrite(vi, "VOLT:MEAS?", 10, &retCount);   ← Perform operation which will generate event status = viWaitOnEvent (vi, VI_EVENT_SERVICE_REQ, timeout, &context);   ← Wait on or dequeue event
if (status == VI_SUCCESS)
    status = viRead(vi, rdResponse, RESPONSE_LENGTH, &retCount);
```

Sample VISA, C Language-type Application (Event Queuing)

Fig. 25

```
status = viOpen(viDefaultRM, "VICO(VX12::20)", 0, 0, &vi);
status = viInstallHandler(vi, VI_EVENT_SERVICE_REQ, SRQHandlerFunc, VI_NULL);   ← Set callback function
status = viEnableEvent(vi, VI_EVENT_SERVICE_REQ, VI_HNDLR, VI_NULL);   ← Enable event for callback ViStatus SRQHandlerFunc(ViSession vi, ViEventType eventType,
        ViEvent context, ViAddr userHandle)   ← Callback
{
    /* user defined interrupt handler code */
}
```

Sample VISA, C Language-type Application (Event Callbacks)

Fig. 26

Single op (viEnableEvent) for all types of events (queueing)

Single op (viInstallHandlr) for all types of events

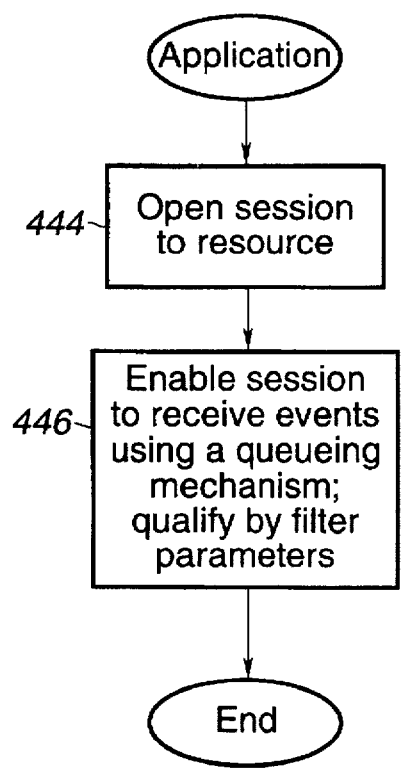
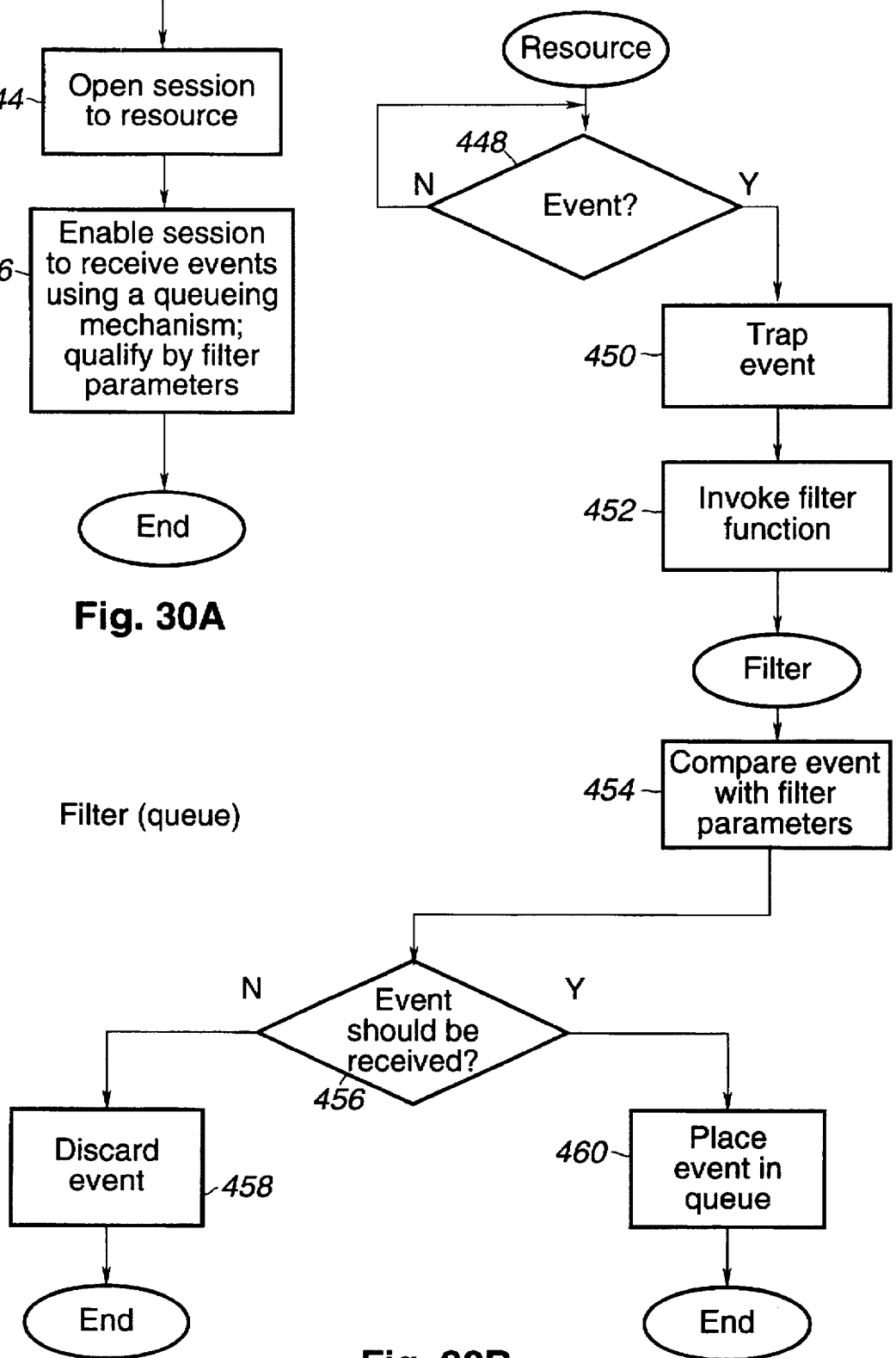
Fig. 30A
Fig. 30B

Filter (callbacks)

Auto-Acknowledge(queueing)

Auto-Acknowledge(queueing)

Auto-Acknowledge(callbacks)

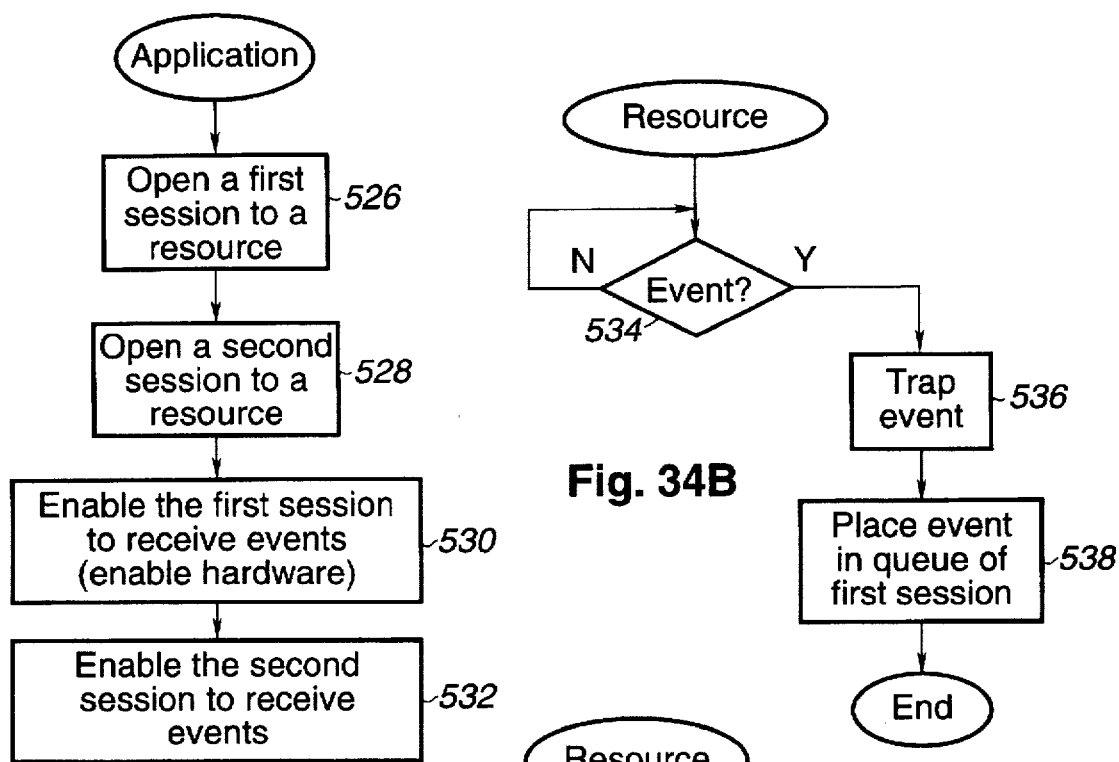
Fig. 34A
Fig. 34B
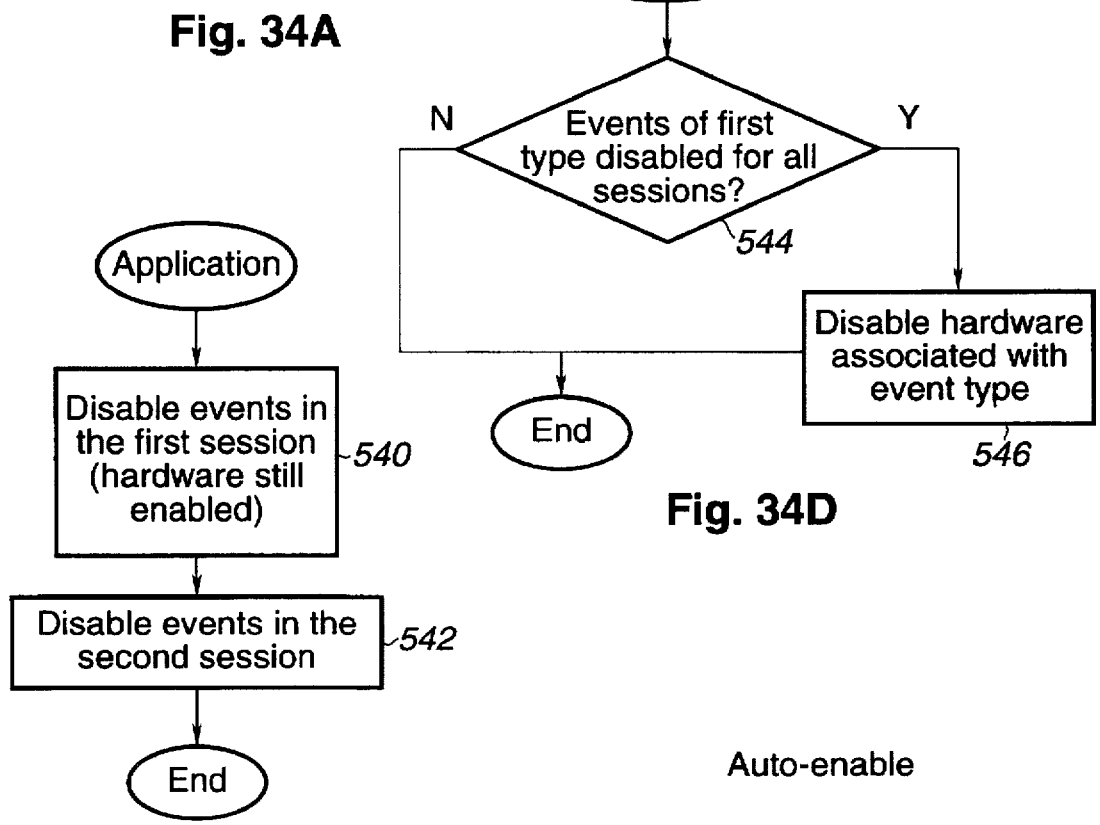
Fig. 34C
Fig. 34D
Auto-enable Queue Full

SYSTEM AND METHOD FOR HANDLING EVENTS IN AN INSTRUMENTATION SYSTEM

CONTINUATION DATA

This is a continuation-in-part of co-pending application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation.

TABLE OF CONTENTS

Description of the Related Art
Summary of the Invention
Brief Description of the Drawings Detailed Description of the Preferred Embodiment
  Instrumentation I/O Interface Options
  Computer System Block Diagram
  Software Architecture (Prior Art)
  Instrumentation Software Architecture of the Present Invention
  VISA Background
  VISA System
  Example VISA System
  VISA Resource Manager
  Resource Classes
  VISA System Operation
  VISA Resource Template
    Events
  Operation Flowchart Descriptions
Claims
Abstract

FIELD OF THE INVENTION

The present invention relates to driver level control software for instrumentation systems, and more particularly to a system and method for handling events in an instrumentation system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each front panel were either preset or were selected to be presented on a common front panel.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME extension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bitstream of 13 s and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are convened into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently require the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become a de facto standard in the industry. Another example of driver level software is the Standard Instrument Control Library (SICL) offered by Hewlett-Packard.

A primary problem with traditional driver level software is that there generally is no common look and feel and no common programming constructs. Because of various inconsistencies in driver level software, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver software do not use the full functionality of the instrument being controlled. Also, there is no common creation mechanism or requirements, no common source code and no common testing criteria.

One important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, serial or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXI bus, or connected to VXI through a GPIB-to-VXI translator.

Therefore, instrumentation programmers desire the ability to write software that is independent of hardware, operating system and I/O interface. It is also greatly desirable for the software API of an instrumentation system to have a common look and feel as well as more consistent implementations for cross-platform development and integration, cross-product development and integration, and the reusability of source code. Also, the new I/O control software architecture should not only provide access to new capabilities, but must also bridge with the past and provide a smooth migration path for the installed base and huge investment in existing systems.

One attempt to create a driver level software layer that is I/O interface independent is the Standard Instrument Control Library (SICL) developed by Hewlett-Packard Corp. SICL uses a methodology of creating APIs with interface independence that includes a purely top-down approach which merges the capabilities of a group of hardware interfaces into a two-piece API. The first element of the API includes the overlap between all of the interfaces, referred to as the core, and the second element is the set of all of the interface-specific routines. The top down interface independence approach attempts to create a common API among two or more types of hardware interfaces. In other words, top down interface independence involves creating an API that uses the same set of functions for similar capabilities between different instrument control hardware, for example, making GPIB reads and writes use the same API functions as RS-232 reads and writes. The process of creating an interface independent API using the top-down approach involves determining the different hardware interfaces to combine, compiling a list of the capabilities of each of the hardware interfaces (read, write, abort, config, and so on), and merging these fists to create a list of overlapping, or core functionality.

U.S. patent application Ser. No. 08/238,480 titled "Method and Apparatus for Controlling an Instrumentation System" filed May 4, 1994 discloses a system referred to as the Virtual Instrument Software Architecture (VISA), which is being formulated as IEEE standard SCC-20. The VISA system is used for controlling instrumentation systems and for providing a user with the capability to develop instrument drivers and application software for controlling instrumentation systems. The system provides a software architecture which defines the control and management of an instrumentation system. The VISA system utilizes a device resource independence approach whereby the individual capabilities of devices are broken down into a plurality of objects called resources, and these resources are then used to develop instrument drivers or instrument control applications. The VISA system is independent of I/O interface type, operating system, and programming language while also providing a common look and feel and consistent API to the user. A VISA system provides a single I/O interface or library which enables a user to control all types of instruments using any of the various types of I/O interfaces.

One aspect of driver level software is how to handle events within an instrumentation system. Examples of various types of events or interrupts include interrupts, exceptions, triggers, system requests, system events, and bus errors. It would be greatly desirable to provide a simplified yet powerful model for handling events in an instrumentation system. It would also be greatly desirable to provide an improved event model which enables users and developers to more easily create instrumentation applications. Therefore, a system and method is desired for handling events in an instrumentation system.

SUMMARY OF THE INVENTION

The present invention comprises a system and method for improved handling of events in an instrumentation system which provides numerous features and advantages over prior art methods. The present invention provides simplified application development and improved performance for instrumentation systems.

The instrumentation system of the present invention provides event queueing, event handling and suspend handling features, thus providing the user or developer with greater freedom in designing his test and measurement or process control application. For those events which require immediate servicing and response, the user can install one or more handlers, which are immediately invoked when the interrupt or event occurs. For those interrupts or events which are deemed less critical, the user can designate these events to be placed on a waiting queue, and the application can dequeue these events at a later time. The user can also suspend handling of events which have installed handlers for a period of time, as needed. The ability of the instrumentation system to provide event handling, suspended handling and a wait queue for events provides increased options to the user in designing his instrumentation application.

The present invention includes a single operation referred to as viEnableEvent which is used for enabling events of all event types, such as interrupts, exceptions, triggers, system requests, system events, and bus errors. The present invention further includes a single operation for installing handlers for all event types, referred to as viInstallHandler. The operation viEnableEvent includes one or more parameters which can be specified as a filter to qualify the types of events desired to be received at the time of the event occurrence. This provides the user with greater control over which events are specified to be received. When an event occurs, the resource invokes a filter function which compares the received event with the designated filter parameters and determines if this event should be received by the application. For example, the user can specify that only events from certain logical addresses are desired to be received or only certain types of events are desired to be received. This event filtering is performed after the event occurs, and thus provides the user with a greater amount of control over error handling.

The present invention further includes an auto-acknowledge capability which enables a resource to automatically provide an acknowledge to an instrument generating an interrupt. Accordingly, an application which enables a session to a resource to receive events can configure the resource with an auto-acknowledge mechanism which directs the resource to automatically acknowledge events of that type. Thus, when an event occurs, if the auto-acknowledge mechanism has been set and the application has not already acknowledged the event, the resource automatically provides an acknowledge to the instrument generating an event. This simplifies application development in the instrumentation system.

The present invention further comprises an auto-enable feature for resources within the system. The auto-enable feature provides that if there are multiple sessions, the first session for which events are enabled enables the respective event receiving hardware, and the hardware remains enabled until the last session has been disabled. In addition, according to the present invention, a session can manually turn on or turn off certain interrupt hardware, thus providing very low level control over interrupt conditions within the system. Further, in the preferred embodiment, if a queue associated with an event becomes full, the respective event receiving hardware is disabled until events have been removed from the queue and thus the queue has space for new events. This guarantees that there is no loss of information in the instrumentation system. In an alternate embodiment, this condition is not handled for simplicity.

The present invention further provides several different mechanisms for generating interrupts within the system. For example, a user application can cause a resource to signal a session that an event has occurred, thus enabling the user application to create events within the system. Alternatively, an event can be generated internally to a resource and constructed within a resource. Further, an asynchronous notification method is preferably provided whereby an event could be generated by a first resource and trapped by a second resource. The present invention also allows events to be distributed over a fully distributed network.

Therefore, a system and method for providing improved event handling within an instrumentation system is described here. The present invention provides increased options and functionality to the user to provide improved development and operation of instrumentation applications.

BRIEF DESCRIPTION OF THE DRAWINGS

A better understanding of the present invention can be obtained when the following detailed description of the preferred embodiment is considered in conjunction with the following drawings, in which:

FIG. 25 illustrates a VISA C language-type application using event queueing;

FIG. 26 illustrates a VISA C language-type application using event callbacks;

FIG. 30a and 30b illustrate flowchart diagrams of event filtering using a queueing method according to the present invention;

FIG. 34A-D illustrate flowchart diagrams of an auto-enable feature according to the present invention;

DETAILED DESCRIPTION OF THE PREFERRED EMBODIMENT

Incorporation by Reference

U.S. patent application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety, including the appendices therein. The above-referenced patent application discloses a system referred to as the Virtual Instrument Software Architecture (VISA), which is being formulated as IEEE standard SCC-20.

Appendix

Appendix A comprises a description of event handling in a VISA system and is part of this specification as though fully and completely set forth herein.

Instrumentation I/O Interface Options

Figure 1:
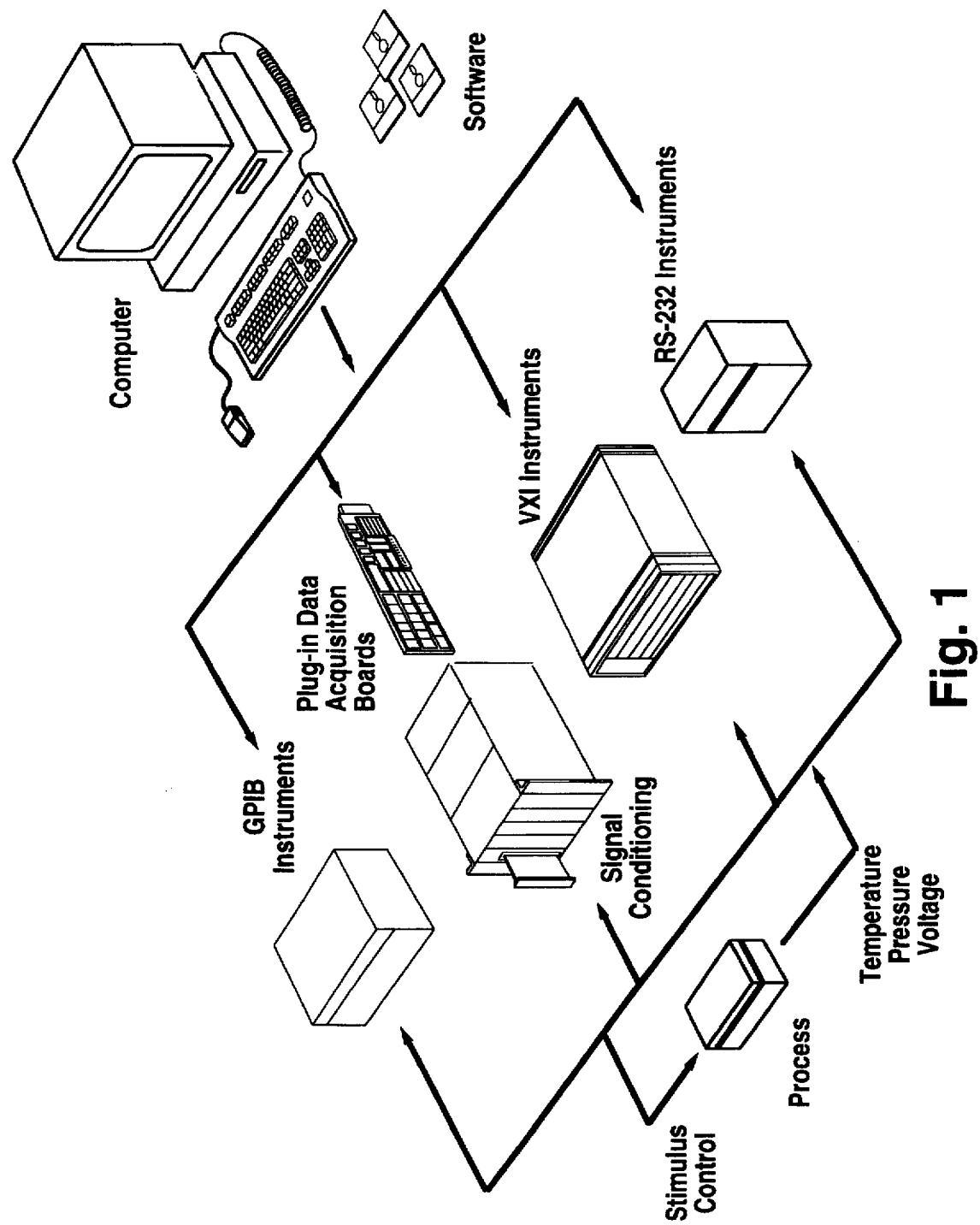
FIGS. 1 and 2 illustrate representative instrumentation control systems of the present invention including various I/O interface options.
Figure 2:
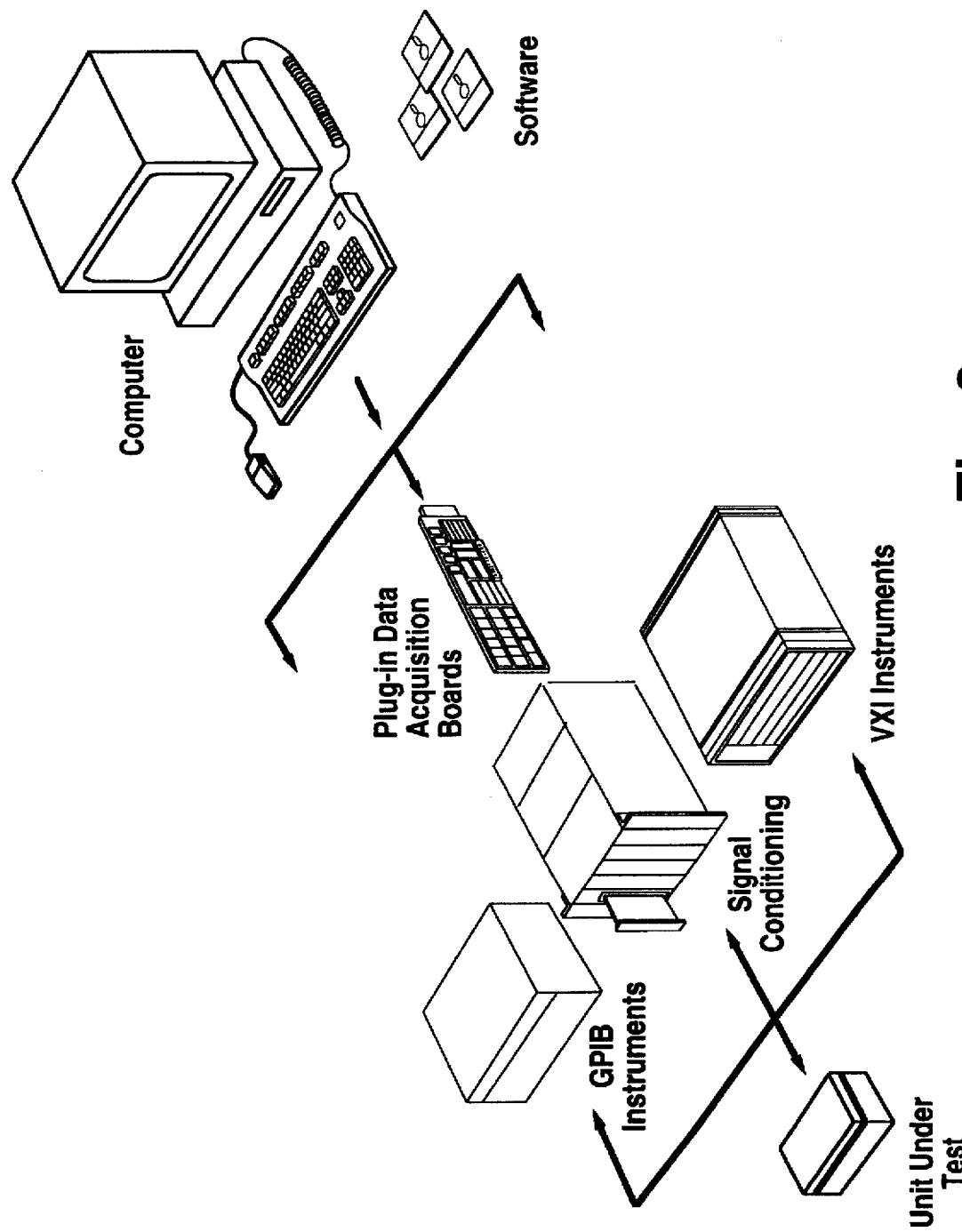

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232-controlled (serial) instruments, and VXI bus instruments. In the present disclosure, the term "instrument" is used to refer to "traditional" instruments such as GPIB instruments and RS-232 instruments, as well as VXI bus instruments configured as plug-in cards to a VXI backplane. The term "instrument" is also used to refer to a data acquisition board in a computer system. In addition, the term instrument also refers to "virtual instruments" (combinations of hardware and/or software instruments) executing on a computer system, including VISA resources. In addition, the term "instrumentation system" is used herein to refer to test and measurement systems as well as process control and modeling systems, among others.

Computer System Block Diagram

Figure 3:
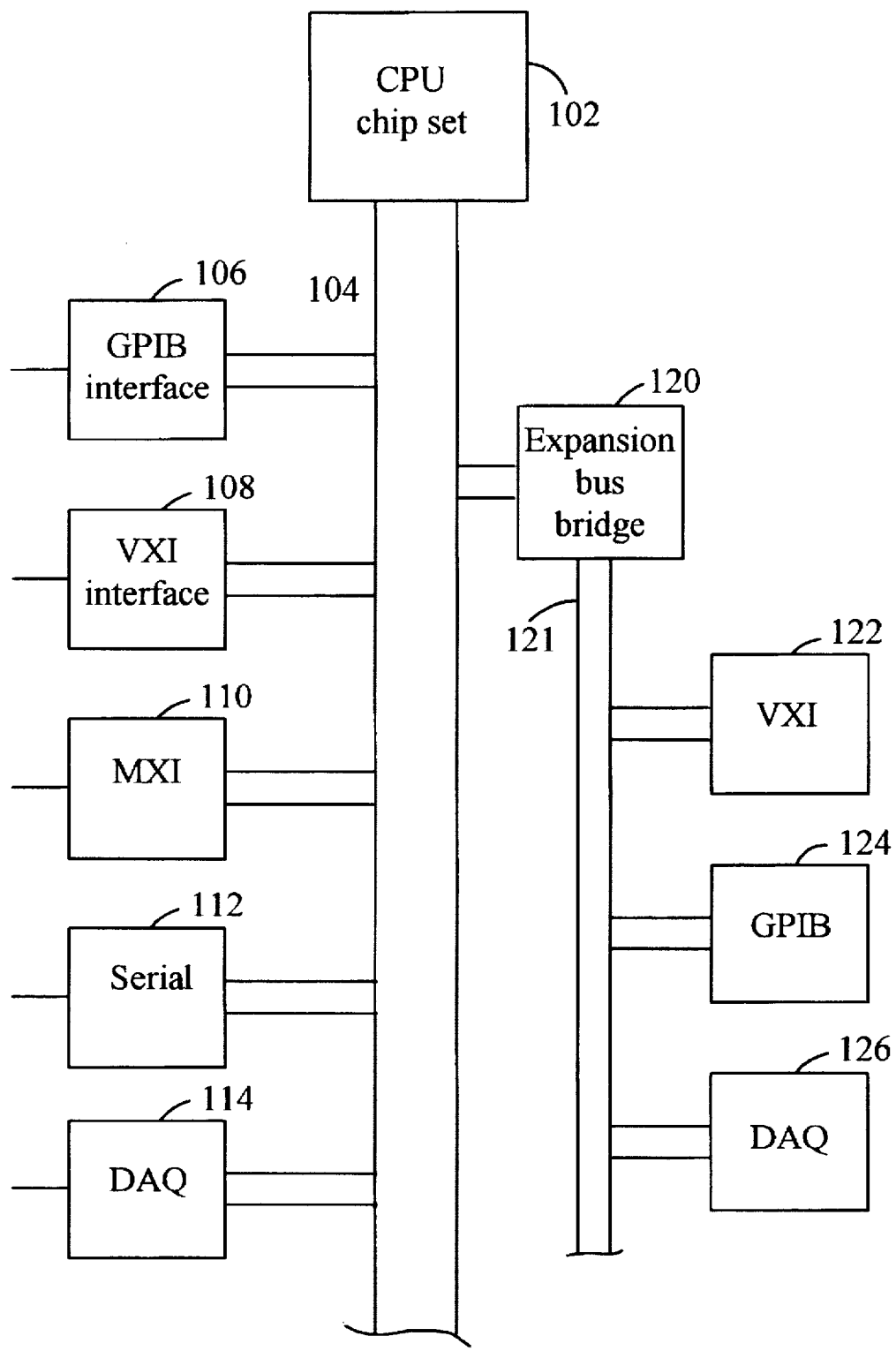
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments. As shown, the computer system includes a central processing unit (CPU) 102 which includes a CPU bus 104. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may be any of a number of types, including an AT or ISA (Industry Standard Architecture) bus, MCA (MicroChannel Architecture) bus, EISA (Extended Industry Standard Architecture) bus, NuBus, etc. A VXI interface 122, GPIB interface 124, and DAQ interface 126 are preferably coupled to the expansion bus 121, as shown.

Software Architecture (prior art)

Figure 4:
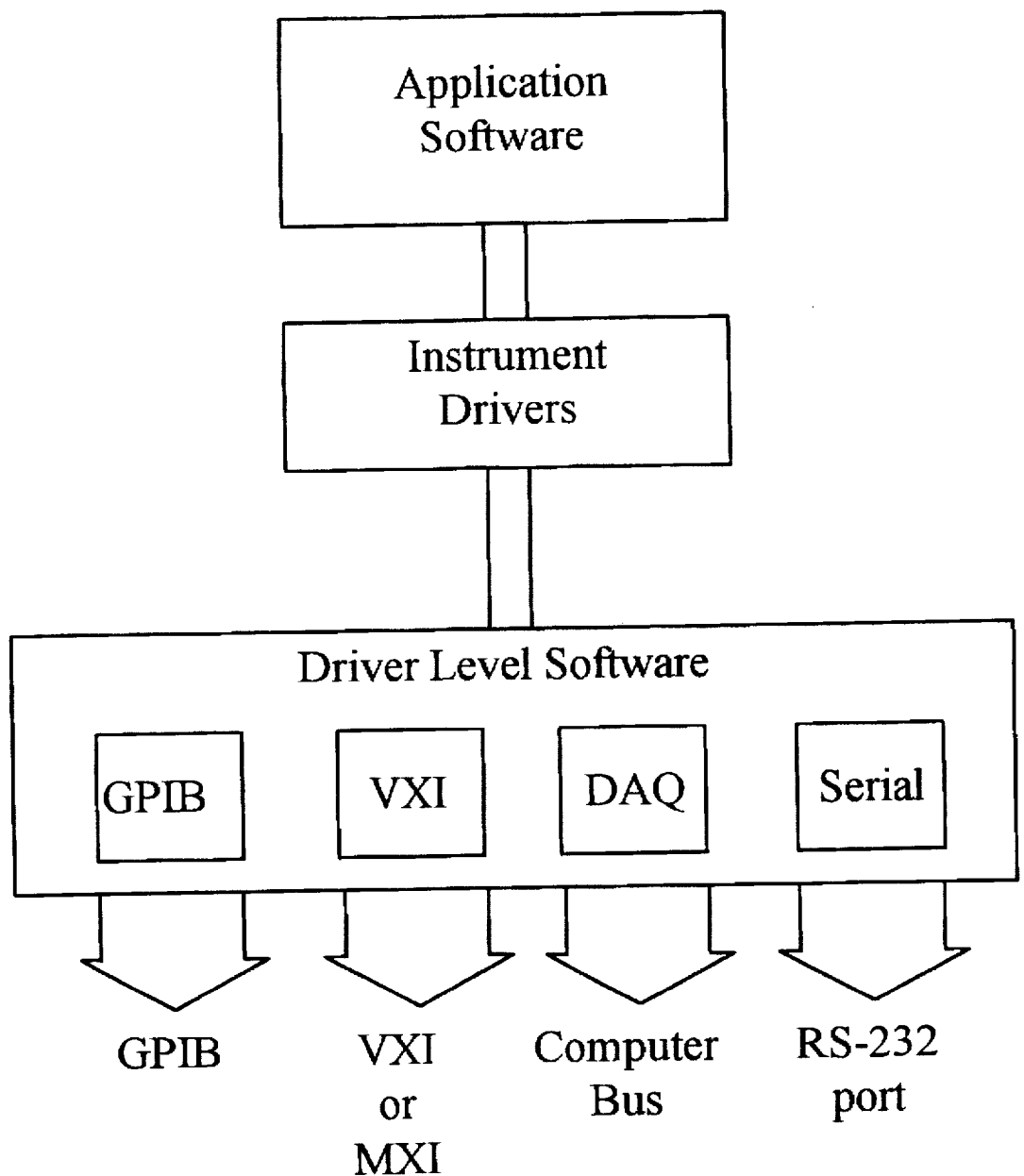
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming. A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments.

Software Architecture of the Present Invention

Figure 5:
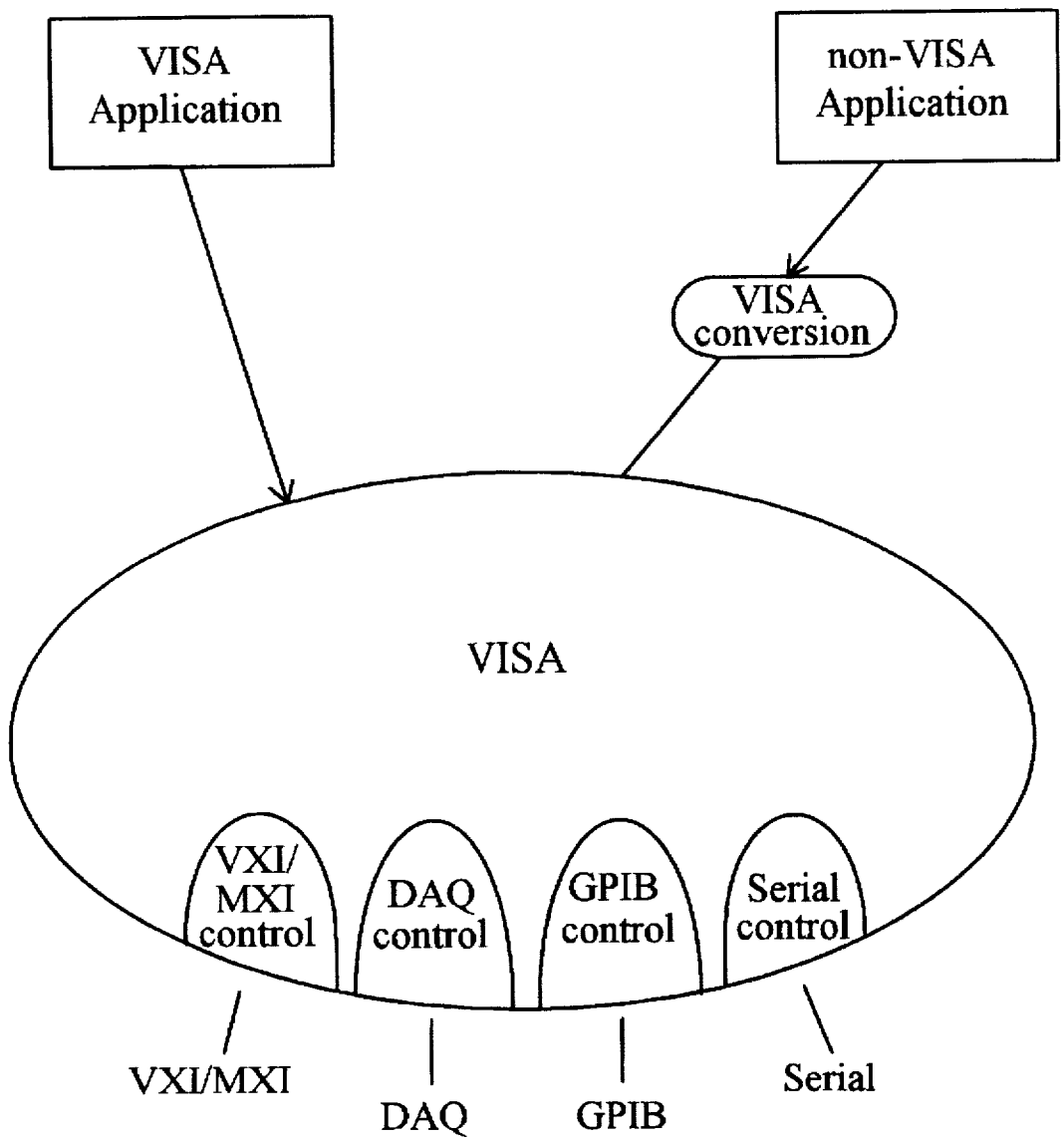
FIG. 5 illustrates the VISA software architecture of the present invention.

The present invention comprises a system and method which performs improved event handling in an instrumentation system. In the present disclosure, the present invention is based on a software architecture referred to as the Virtual Instrument Software Architecture (VISA), and a system developed according to the present invention can be referred to as a VISA system. Referring now to FIG. 5, a diagram illustrating the software architecture of the preferred embodiment of the present invention is shown. As shown, an application created according to the method of the present invention, referred to as a VISA application, interfaces directly to a VISA system which in turn interfaces directly to hardware. FIG. 5 also illustrates the manner in which a non-VISA application, i.e., a software application which was not developed according to the system and method of the present invention, interfaces to a VISA system through a VISA conversion method. A non-VISA application can comprise an application developed to conform to other driver level software standards, including NI-VXI, NI-488, and NI-DAQ from National Instruments Corp., or the Standard Instruments Control Library (SICL) from Hewlett-Packard, among others.

VISA Background

Background on the Virtual Instrument Software Architecture (VISA), referred to as a VISA system, is deemed appropriate. VISA utilizes a device resource independence model which involves breaking a device down into its individual, nonoverlapping (orthogonal) capabilities. VISA also uses object oriented concepts to simplify the creation of higher level applications. In VISA, the individual capabilities of devices are broken down into a plurality of objects called resources, and these resources are then used to develop instrument drivers or instrument control applications. The device resource independence model and its object oriented nature enable VISA to be independent of I/O interface type, operating system, and programming language. Thus VISA provides a single I/O interface or library which enables a user to control all types of instruments using any of the various types of I/O interfaces.

Due to its object oriented nature, VISA can operate transparently in distributed environments. In other words, the object oriented nature of VISA provides a direct mechanism for the distribution of I/O control software modules across any type of network. Also, the programming model of VISA is the same regardless of the location of a piece of VISA I/O control soft-ware and/or the location of the corresponding instrumentation hardware that the software controls. Further, the object oriented nature VISA allows a user to use the objects or resources provided to construct higher level resources, such as instrument drivers and/or applications software, as desired.

In a VISA system, a resource class generally is a definition of a particular capability of a device (such as read, write, trigger, etc.). A resource class is also the specific definition of how to create a resource, i.e., a template for the creation of resources. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/ disabled for reception.

A resource is a particular implementation or instance of a resource class. In general, the term "resource" is synonymous with the connotation of the word "object" in object-oriented architectures. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). In a VISA system, every defined software module is a resource, and a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource.

Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

An attribute is a value within a resource which reflects a characteristic of the operational state of the resource. A use's application reads an attribute value to determine the current state of the resource, for example, how the resource is processing an operation, or how the resource should operate when something occurs. A user application sets an attribute to change the way in which the resource operates. For example, if a user's application desires to use a write resource and wants to use a direct memory access (DMA) method, the user's application would set the attribute transfer mode to DMA and then perform the write operation. In this manner, an attribute changes the characteristics in which a resource operates.

An event object is an asynchronous occurrence that can arrive independently of normal sequential execution of the process running in a system. Examples of events include, but are not limited to, items such as hardware interrupts, exceptions, triggers, signals, and system messages (i.e., a system failure notification). The events that can occur in a VISA system include events that are received by only a single resource and events that can affect more than one resource. In a VISA system, events allow information exchange.

An operation is an action defined by a response that can be performed on a resource, and operations are the primary method of communication among resources and between applications. After a session is established between an application and a resource, the application can communicate with the resource by invoking operations on the resource.

Each resource describes the operations which it supports (which are described further below) and the resource and the application exchange information through the parameters of the operations.

A session is a term used to designate a communication channel between a user's application and a resource. In other words, a session is a communication channel that binds an application and a resource. In essence, a session is an instance of a resource, much the same way a resource is an instance of a resource class. Resources can have multiple sessions open to them. In addition, a resource can control one or more other resources.

VISA includes a grouping of resource classes referred to as the instrument control resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Specific physical device resource classes (also called hardware-specific classes) are those resource classes that have no commonality with other types of resource classes and are used to control device and/or interface level features specifically for a single type of device.

An object referred to as "ViObject" is the most basic object in a VISA system. ViObject supports attributes, i.e., viGetAttribute and viSetAttribute and closing, i.e., viClose and terminating objects, i.e., viTerminate. In a VISA system, an object cannot have sessions to it, but rather an application can only have a pointer to an object.

A resource referred to as the VISA Resource Template inherits from ViObject and defines an interface including a well-defined set of services that is used by all resources, i.e., each VISA resource derives its interface from the VISA Resource Template. The VISA Resource Template defines a set of control services including location and searching, life cycle control, characteristic control, and access control. The location and search services include services for finding a resource in order to establish a communication link to the resource. The location and search service uses an operation referred to as viFindRsrc. The life cycle control services include the creation and deletion of sessions or links to resources and include operations referred to as viOpen, viClose, viAttachRsrc, and viDetachRsrc. The characteristic control services include operations which manipulate attributes to set and retrieve the status of resources, including operations referred to as viSetRsrcAttribute and viGetRsrcAttribute. The access control services are used to control the types of accesses that can be made to resources, including operations referred to as viLock( ), viLockRsrc( ), viUnlock( ), and viUnlockRsrc( ).

The VISA Resource Template also defines various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the VISA Resource Template described above as well as the operations supported by the particular resource. The resource and application exchange information through the parameters of the operations. The VISA Resource Template also defines event reporting, including callbacks, queuing, and waiting services for resources during system events, exceptions, and resource defined events.

The VISA Resource Manager derives its interface from the VISA Resource Template and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities. The VISA Resource Manager allows a user to open a session to any resource in the system, including only single device capabilities such as a single trigger line or single write port on a device.

At startup of the system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operation, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

When VISA is implemented in the C++ programming language, a resource class and a session class are preferably implemented as C++ classes. A resource instance or resource and a session instance or session are each implemented in C++ as an instance of the class. A resource preferably includes references to global data that is global to the session. A session instance keeps a reference to the local data.

VISA System

Figure 6:
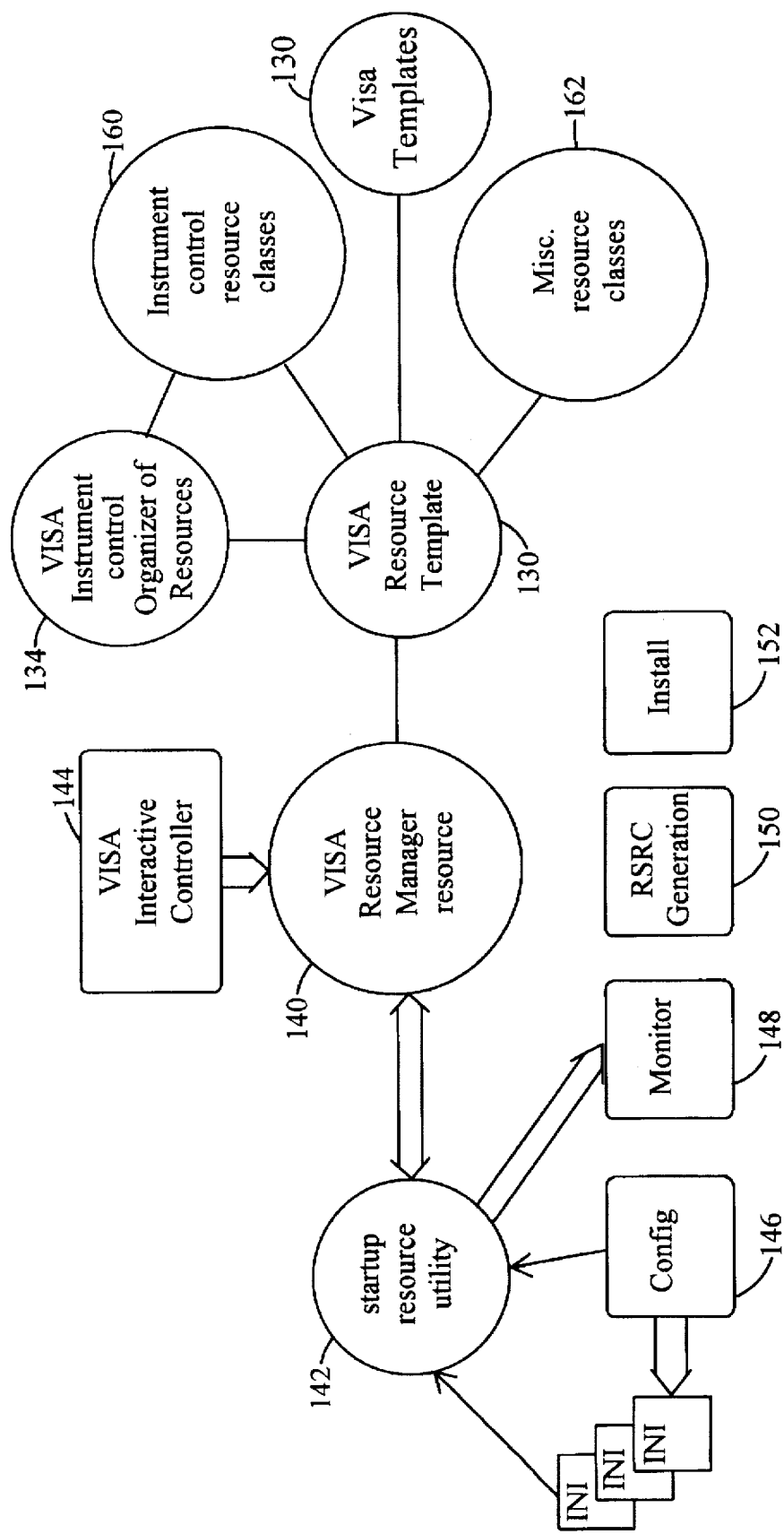
FIG. 6 illustrates the components of a VISA system according to the present invention.

Referring now to FIG. 6, the various elements comprising the preferred embodiment of the present invention are shown, including various utilities for installation and configuration. As shown, a VISA system includes a VISA Resource Template 130, a VISA Resource Manager resource 140, which acts as the primary or runtime resource manager, a startup resource utility 142, a VISA interactive controller 144, a configuration utility 146, a monitor utility 148, a resource generation utility 150, and an install utility 152. In addition, an instrumentation system according to the present invention includes a plurality of instrument control resource classes 160 as well as other resource classes 162, as desired, which preferably incorporate their interface from the VISA Resource Template 130. The present invention may further include a VISA Instrument Control Organizer (VICO) resource 134 that incorporates its interface from the VISA Resource Template 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that the present invention can include one or more additional runtime resource managers as well as additional groupings of resource classes for additional functionality, as desired.

The VISA Resource Template 130 is essentially a base class from which all new resources derive their interface. The VISA Resource Template 130 includes two class libraries referred to as VI_Resource and VI_Session. Each resource in a VISA system includes a set of basic capabilities, i.e., basic attributes, operations and events. The VISA Resource Template 130 allows a developer of new resources to reuse these basic capabilities which each resource requires.

In one embodiment of the invention, a VISA system includes a VISA Resource Metaclass (not shown) which defines the default manner in which resource classes are defined in a VISA system. In other words, the VISA Resource Metaclass defines the standard way in which resources are instantiated and destroyed.

The VISA Resource Manager 140 is responsible for managing, controlling, and distributing resources within the system, including instrument control resources. Applications use the VISA Resource Manager 140 to create sessions to particular resources within a system. In the present application, a session is defined as a communication channel to a resource within the system and a session designates a reference to an individual resource being controlled. The VISA Resource Manager 140 presents a common interface to all instrument control resources in the system regardless of their physical location. The VISA Resource Manager 140 includes the following responsibilities: creation and deletion of resources, finding resources (location search), session creation, modification and retrieval of individual resource attributes, operation invocation, event reporting, and concurrency control (locking), among others. The VISA Resource Manager 140 includes an API for these management needs and all defined resources may use these capabilities. The VISA Resource Manager 140 shields resource implementations from needing to know about most details of resource management and distribution of instrument control resources within a system. The VISA Resource Manager 140 is the runtime resource manager. In contrast, the startup resource utility 142 is invoked at startup and its function is to register the resources in the system with the VISA Resource Manager 140. The various operations, attributes, and events of the VISA Resource Manager resource 140 are discussed further below.

In the preferred embodiment, the instrument control resource classes 160 comprise resource classes for controlling GPIB, VXI, and serial instruments, as well as data acquisition (DAQ) boards. The instrument control resource classes can be logically partitioned into common resource classes and device-specific or interface-specific resource classes. Common resource classes are those class definitions that have some commonality with one or more types of devices (e.g. both GPIB and VXI or both VXI and a trigger board) or that can be defined in a manner such that the resource class is independent of the device or interface with which it is communicating (e.g. formatted I/O). Device-specific or interface-specific instrument control resource classes (also called hardware-specific resource classes) are those resource classes that have no commonality with other types of resource classes and are used to control specific devices and/or interface level features because the capabilities of the bus or connection to the device cannot be separated from the individual device. An example is the Interface clear line on the GPIB bus, which is a line that is bussed across the entire GPIB bus and thus affect other devices. The resource classes 162 may comprise classes for process control, among others.

As discussed above, a session is a term used to designate a communication channel between a user's application and a resource. A function call or operation on the VISA Resource Manager 140 referred to as viOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

In one embodiment of the invention, a VISA system includes a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. The Install utility 152 provides a common look and feel to installation of components within the VISA system.

Example VISA System

Figure 7:
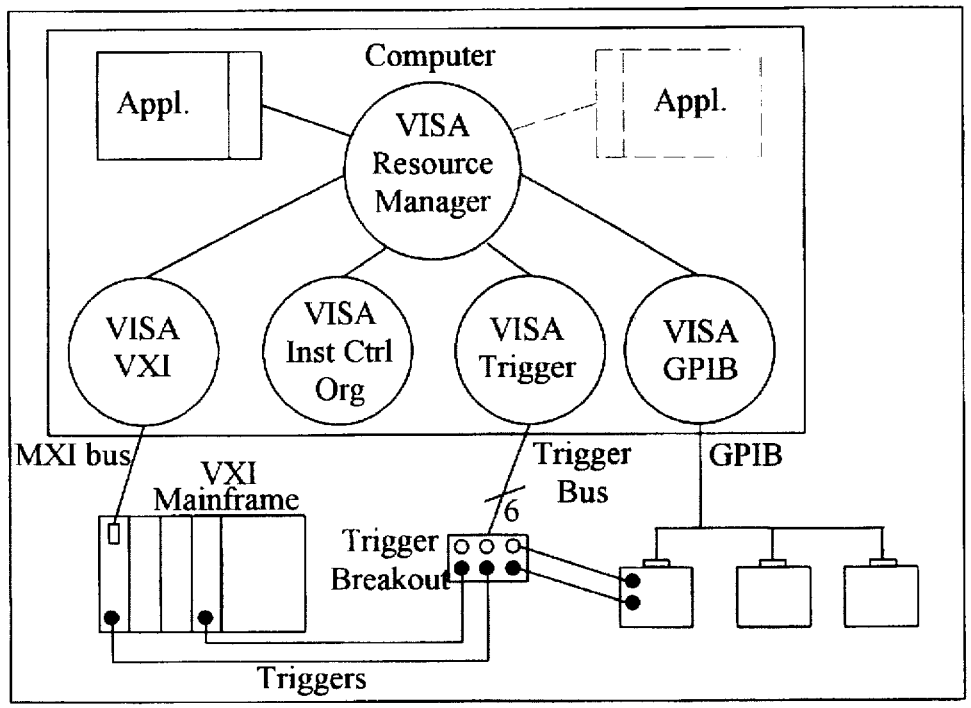
FIGS. 7 and 8 illustrate two examples of a VISA instrumentation system in a non-distributed and distributed environment, respectively.
Figure 8:
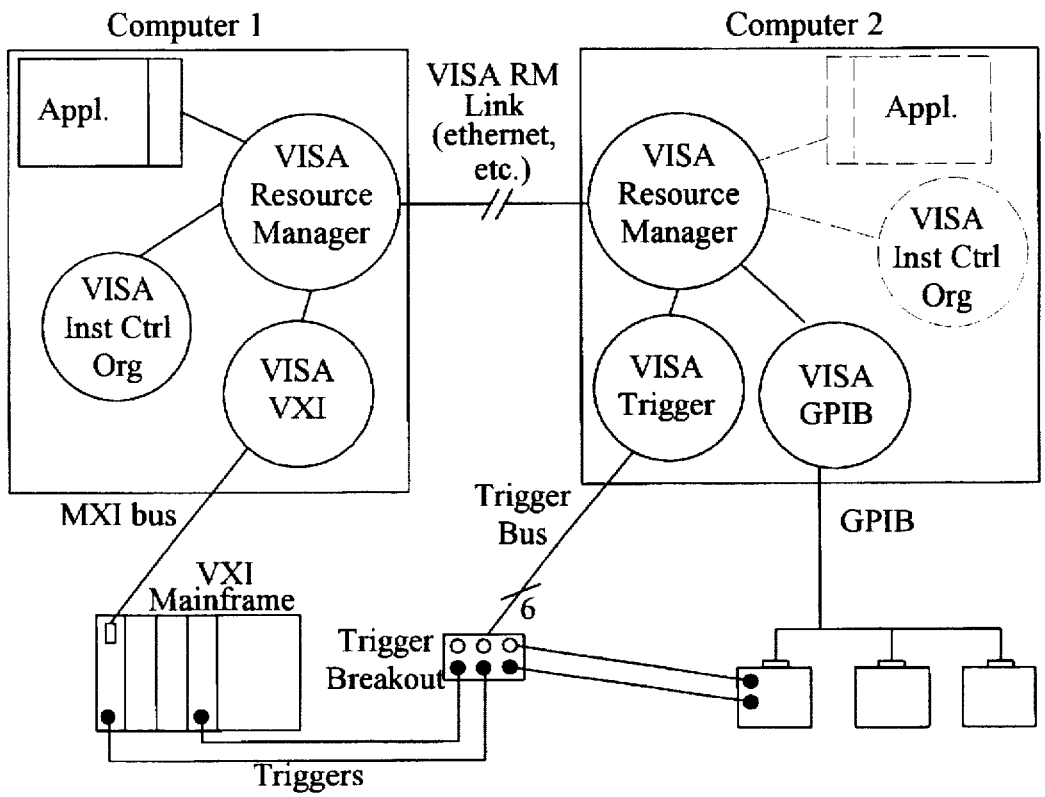

Referring now to FIGS. 7 and 8, block diagrams illustrating various embodiments of a VISA system of the present invention are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through a MXI bus. The trigger resource controls a trigger breakout device through a trigger bus and the GPIB resource controls one or more GPIB instruments through the GPIB bus.

FIG. 8 illustrates an embodiment of a VISA system according to the present invention in a distributed environment. As discussed further below, the device resource independent and object oriented nature of the present invention allows for the method of the present invention to be readily adapted to distributed environments. FIG. 8 illustrates an embodiment where two or more computers in different physical locations are used to control a single instrumentation system. As shown, computer 1 includes an application which controls one or more resources. As shown, the application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

VISA Resource Manager

As discussed above, the VISA Resource Manager 140 is a runtime resource manager that controls resources in a VISA system. The VISA Resource Manager 140 is also itself a resource, and includes attributes, operations and events like any other resource. The VISA Resource Manager 140 provides the mechanisms in a VISA system to control and manage resources. This includes but is not limited to the assignment of unique resource addresses, unique resources ID's, operation invocation, and event management. The VISA Resource Manager resource 140 is a resource like all other resources in the system and it derives its interface from the VISA Resource Template 130. The VISA Resource Manager resource 140 provides connectivity to all of the VISA resources registered with it. The VISA Resource Manager 140 gives applications control and access to individual resources and provides the services described below. The VISA Resource Manager 140 utilizes the resources available to it to service requests from the applications and other resources requiting service of a given resource.

The VISA Resource Manager 140 provides access to all of the resources that are registered with it. The VISA Resource Manager 140 is therefore at the root of a subsystem of connected resources. There could be more than one root level resource manager resource in a complete VISA system, and each descendent could itself act as a resource manager of its own. Each of these resource managers has the capability to cover multiple host computers and can be a distributed entity over the network on which the subsystem is being implemented An application can use the VISA Resource Manager 140 as a monitoring point for a particular subsystem by enabling the generation of events on the system defined events, which include the notification of resources or sessions being killed or becoming inactive. Resource level control of attributes allows an application to set and retrieve global attributes without having to open a session to this resource.

The VISA Resource Template (VI_Resource) handles all system events that occur in a VISA system, and the attributes comprised within the VISA Resource Manager resource 140 comprise global attributes about the version of the system and the characteristics of the system. The majority of operations that are included within the VISA Resource Manager resource 140 and which can be used to act upon the VISA Resource Manager 140, such as get and set attribute, generate event, etc. are also on the majority of instrument control resources 160 and miscellaneous resources 162. Thus, the VISA Resource Manager 140 follows the resource model of the resources it controls, i.e., the resource manager follows its own constraints. For example, in one embodiment, an additional resource is provided which acts in a similar manner to the VISA Resource Manager 140. This resource is used to control subnetworks of resources, with the VISA Resource Manager 140 managing the created resource which acts similarly to the VISA Resource Manager 140.

Figure 9:
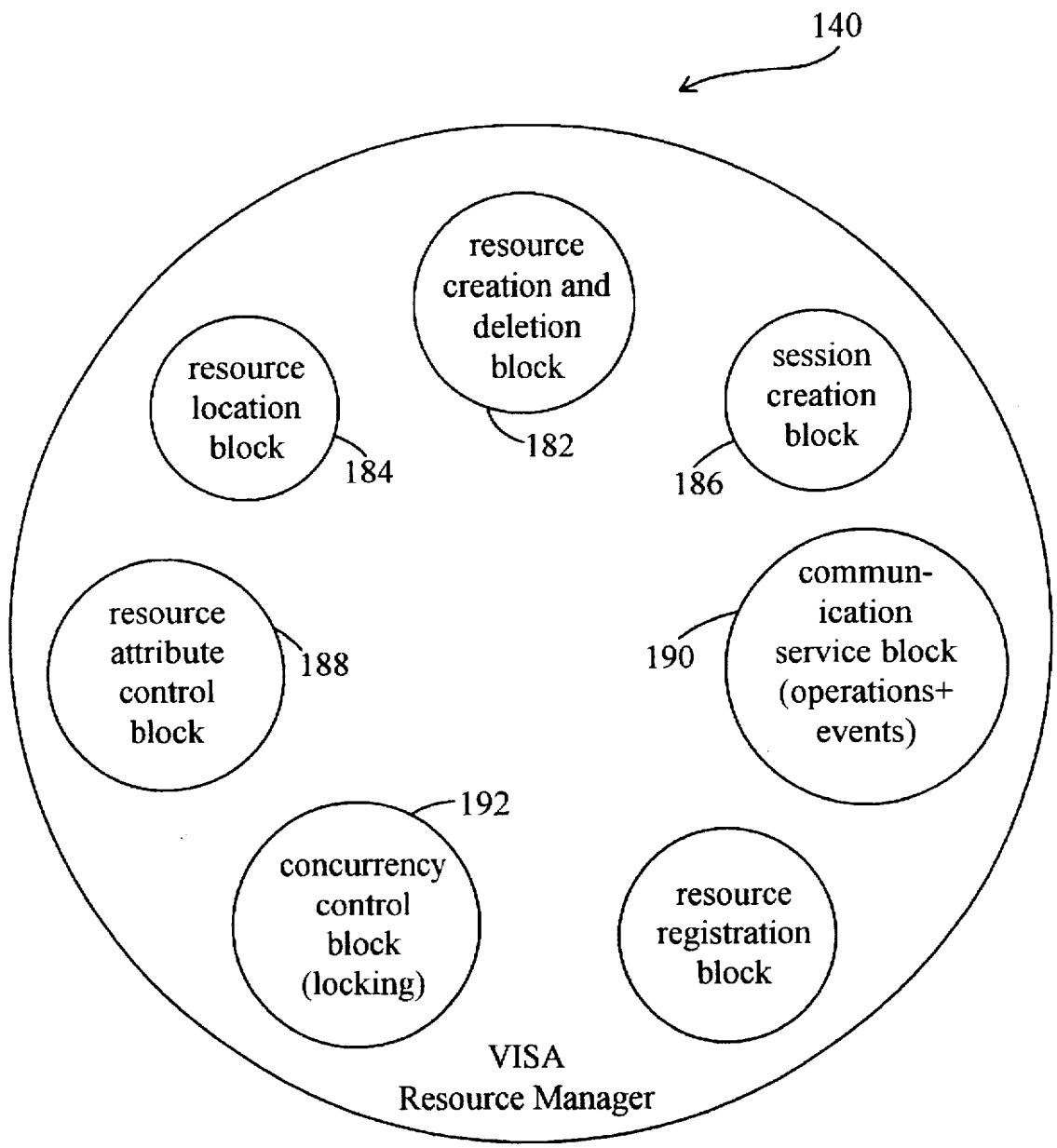
FIG. 9 illustrates the components of the VISA Resource Manager.

Referring now to FIG. 9, a diagram illustrating the various components which comprise the VISA Resource Manager 140 is shown. As shown, the VISA Resource Manager 140 includes a resource creation and deletion block 182, a resource location block 184, a session creation block 186, a resource attribute control block 198, a communication service block 190, a concurrency control block 192, and a miscellaneous function block 194. These blocks comprised within the VISA Resource Manager 140 provide basic resource control and communication services to applications.

The resource creation and deletion block 182 is involved with creating and deleting resources. The resource location block 184 finds a resource in order to establish a communication link to the resource. This search is based on a unique symbolic name. The session creation block 186, also referred to as the life cycle control block, controls the life cycle of sessions to resources established by the requests of applications, i.e., this block creates and deletes sessions to a resource.

The resource attribute control block 188 includes attribute manipulation operations to set and retrieve the status of resources. This block also performs the initialization or setup of resource attributes while creating resources. The operation in the VISA Resource Manager for modifying attributes is viSetAttribute( ) and the operation in the VISA Resource Manager that retrieves the value of an attribute is viGetAttribute( ). The resource attribute control block 188 also allows applications to set up access modes to resources. The concurrency control block 192 provides access control of resources. The resource attribute control block 188 and the concurrency control block 192 inherit functionality from the VISA Resource Template 130.

The communication service block 190 manages sessions between applications and resources. The primary method of communication among resources and between applications and resources is referred to as operation invocation, i.e., invoking an operation on the respective resource to direct the resource to perform the desired function. The communication service block 190 also allows the exchange of information through events Operation Invocation refers to communication between an application and a resource using operations defined in the resource. After establishing a session to a resource, an application can communicate with the resource by invoking operations on the resources. Each resource describes the operations supported by the resource and the resource and application exchange information through the parameters of the operations.

As discussed above, in a VISA system an event is defined as an asynchronous occurrence which can be generated either in hardware or in software. The communication service block 190 in the VISA Resource Manager traps all the system events that require system-wide action. The template events can be generated either by resources or by other external occurrences. These events are then reported back to the application. An application can be notified on occurrence of an event by two different mechanisms, as described below. In case of exceptions, the events are reported back only to the application thread causing the exception.

Resource Classes

Figure 10:
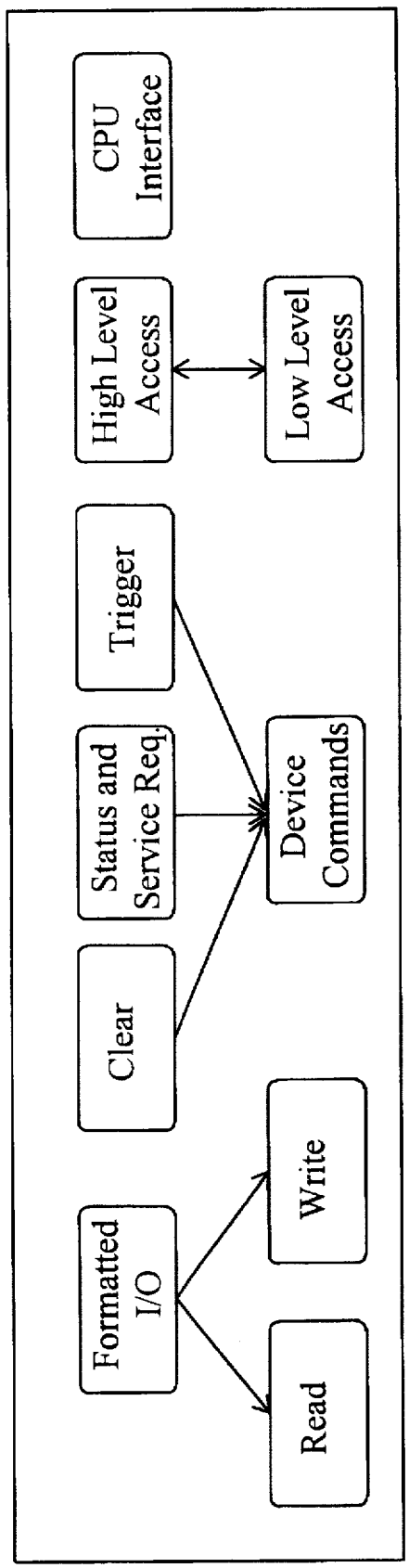
FIG. 10 illustrates the common instrument control resource classes.
Figure 11:
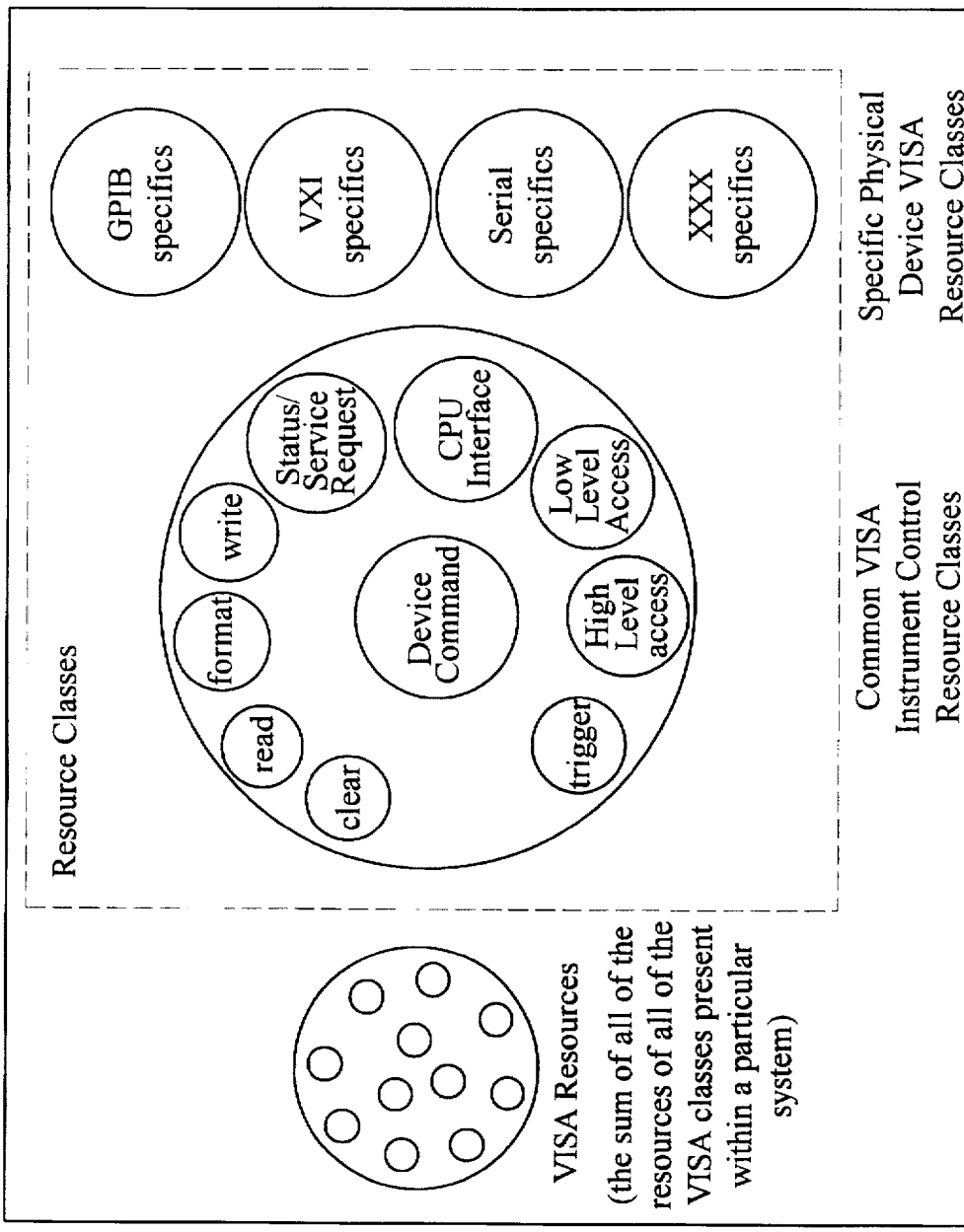
FIG. 11 illustrates the common instrument control resource classes and specific physical device VISA resource classes and corresponding VISA resources.
Figure 12:
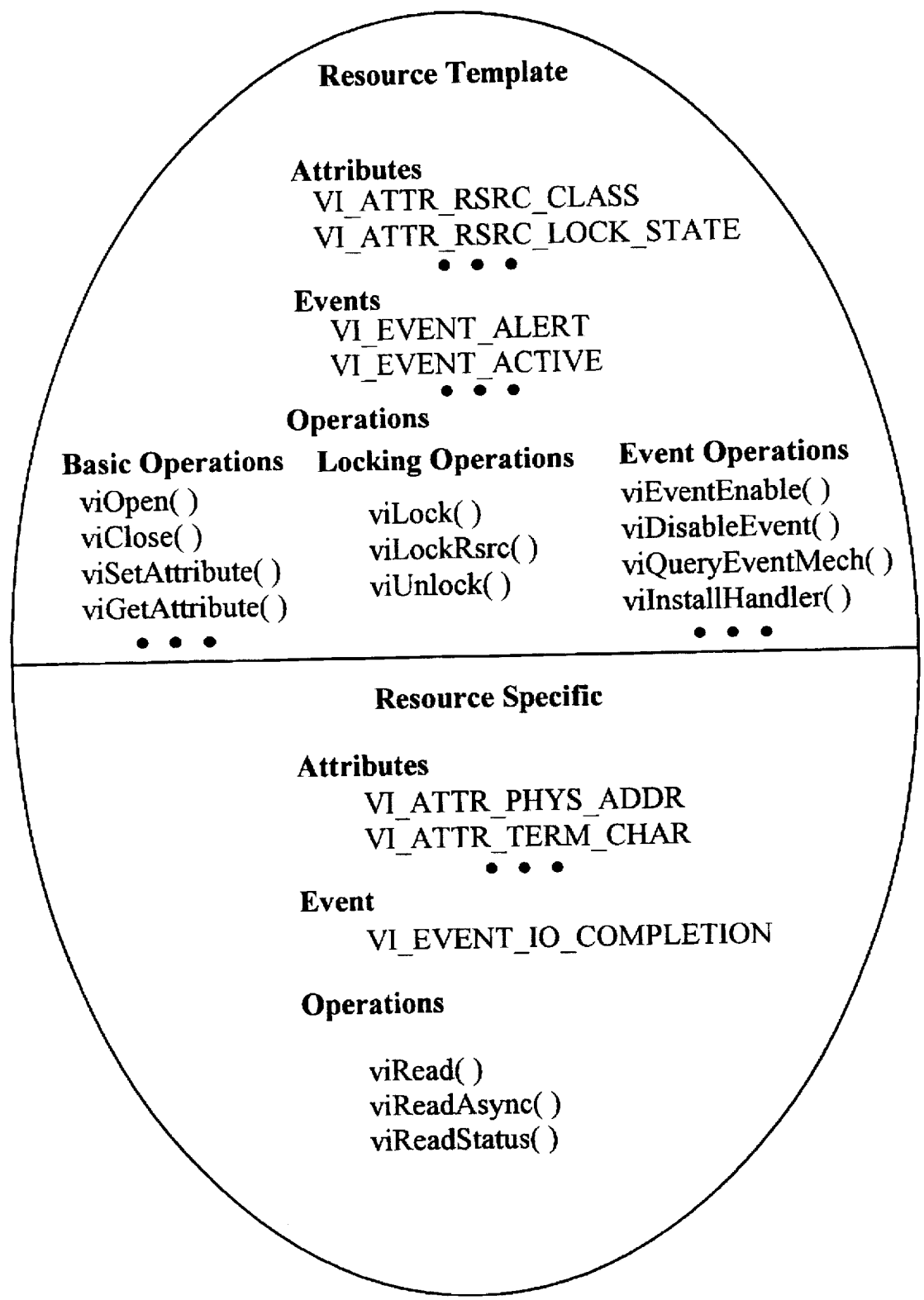
FIG. 12 illustrates the organization of an instrument control resource class.

FIGS. 10 and 11 illustrate the resource classes comprised in the instrument resource classes block 160. The instrument control resource classes 160 are provided to encapsulate the various operations of a device, including reading, writing, trigger, and so on. A VISA instrument control resource, like any other resource, is defined by the basic operations, attributes, and events of the VISA Resource Template 130. For example, modifying the state of an attribute is performed via the operation viSetAttribute( ), which is defined in the VISA Resource Template 130. Although the instrument control resource classes 160 do not have viSetAttribute( )

listed in their operations, they provide this operation because it is defined in the VISA Resource Template. Likewise, the instrument control resource classes 160 provide all of the operations included in the VISA Resource Template 130 because they are defined in the VISA Resource Template 130. As shown in FIG. 12, from the basic interface of the VISA Resource Template, i.e., this basic set of attributes, events, and operations, each resource class adds its specific operations, attributes and events, which allow the class to act as a template for resources which perform the dedicated task of the class, such as sending a string to a message-based device.

FIG. 11 illustrates the instrument control resource classes comprised in a VISA system. FIG. 11 also shows that the sum of all the VISA instrument control resource classes is comprised of the common instrument control resource classes and the specific device (interface or hardware specific) instrument control resource classes.

FIG. 10 illustrates the common resource classes, these being: Formatted I/O, Read, Write, Clear, Status and Service Request, Trigger, Device Commands, High Level Access, Low Level Access, and CPU Interface. FIG. 10 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no inter-relation with any other instrument control resource. This does not imply that the resource cannot be used with the other resources, but that it does not use, and is not used by, any other instrument control resource.

FIG. 11 illustrates the manner in which the instrument control resource classes include the common instrument control resource classes and the specific physical device instrument control resource classes. As shown, the specific physical device resource classes include GPIB specific, VXI specific, and serial specific resource classes.

The instrument control resource classes are discussed in detail in Appendix 1 of U.S. patent application Ser. No. 08/238,480, previously referenced and incorporated by reference herein in its entirety. As shown in Appendix 1 of the patent application referenced above, each of the instrument control resource classes include a number of attributes, operations, and events for implementing respective capabilities of instruments.

These instrument control resource classes in a VISA system, including the common resource classes and the hardware specific resource classes, are also listed below.

| Resource Class | Abbr. Name | Standard Name |
|---|---|---|
| Object | OBJ | VI_OBJECT |
| Instr | INSTR | VI_INSTR |
| VISA Resource Manager Resource | VRM | VI_RSRC_VISA_RM |
| VISA Instrument Control Organizer | VICO | VI_RSRC_VISA_IC_ORG |
| Write Resource | WR | VI_RSRC_WR |
| Read Resource | RD | VI_RSRC_RD |
| Formatted I/O Resource | FIO | VI_RSRC_FMT_IO |
| Trigger Resource | TRIG | VI_RSRC_TRIG |
| Clear Resource | CLR | VI_RSRC_CLR |
| Status/Service Request Resource | SRQ | VI_RSRC_SRQ |
| High Level Access Resource | HLA | VI_RSRC_HL_ACC |
| Low Level Access Resource | LOLA | VI_RSRC_LL_ACC |
| Device Specific Commands Resource | DEVC | VI_RSRC_DEV_CMD |
| CPU Interface Resource | CPUI | VI_RSRC_CPU_INTF |
| GPIB Bus Interface Control Resource | GBIC | VI_RSRC_GPIB_INTF |
| VXIbus Device Configuration Resource | VXDC | VI_RSRC_VXI_DEV_CONF |
| VXIbus Interface Control Resource | VXIC | VI_RSRC_VXI_INTF |
| VXIbus Slot 0 Resource | VXS0 | VI_RSRC_VXI_SLOT_0 |
| VXIbus System Interrupts Resource | VXSI | VI_RSRC_VXI_SYS_INTR |
| VXIbus Signal Processor Resource | VXSP | VI_RSRC_VXI_SIG_PROCESSOR |
| VXIbus Signal Resource | VXS | VI_RSRC_VXI_SIG |
| VXIbus Interrupt Resource | VXIN | VI_RSRC_VXI_INTR |
| VXIbus Extender Interface Resource | VXEI | VI_RSRC_VXI_EXTDR |
| Asynchronous Serial Bus Interface Control Resource | ASIC | VI_RSRC_ASRL_INTF |

Referring now to FIG. 12, a diagram illustrating the organization of one of the instrument control resources 160 is shown. As previously noted, each resource within a VISA system, including the instrument control resources 160, derive functionality from the VISA Resource Template 130. FIG. 12 illustrates the manner in which each instrument control resource 160 includes a portion (upper portion) that derives its interface from the VISA Resource Template 130 and a portion (lower portion) that comprises an interface that is specific to that particular resource.

Figure 13:
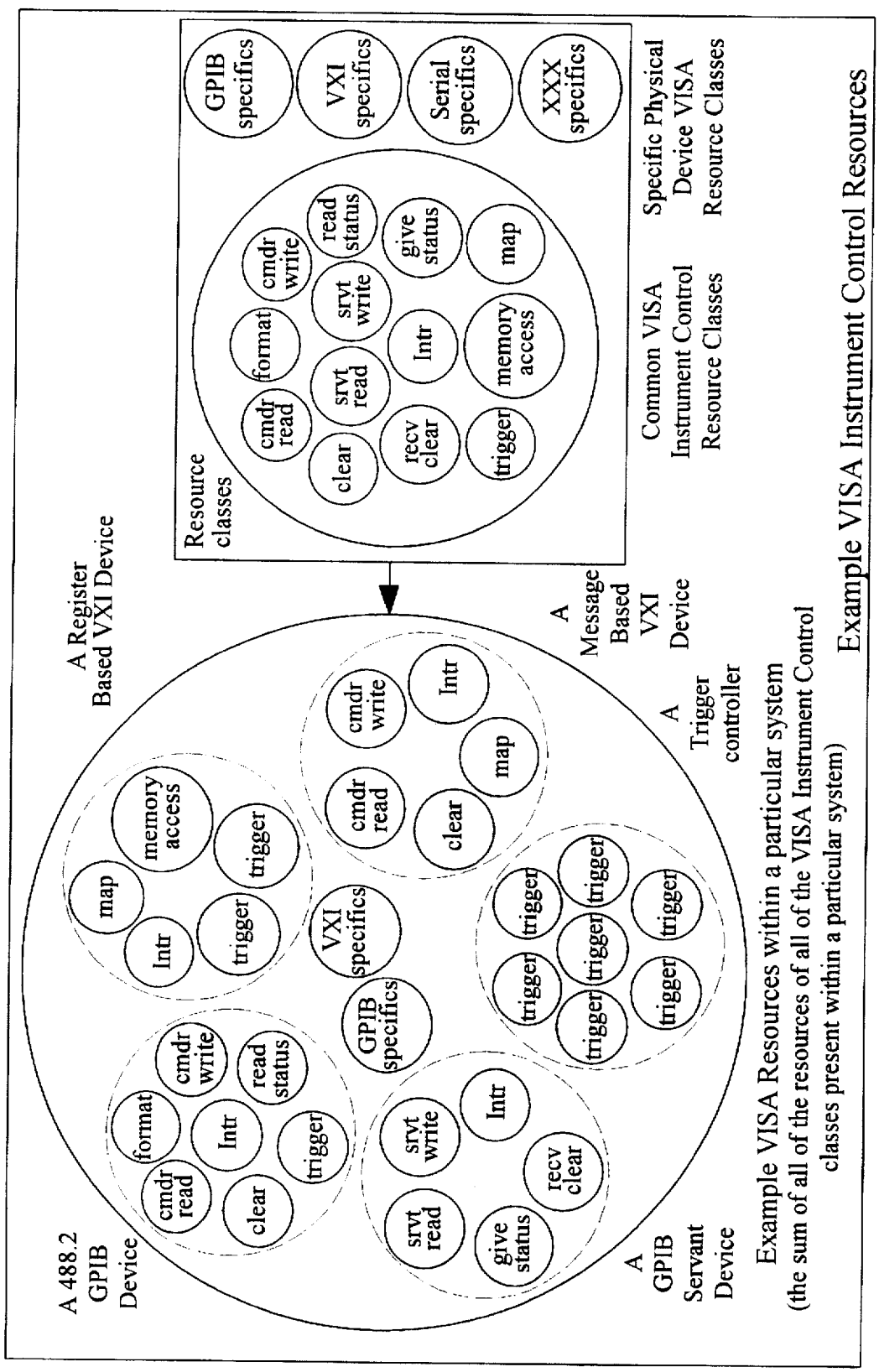
FIG. 13 illustrates example VISA instrument control resources.

FIG. 13 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same.

A resource class referred to as INSTR is an abstraction which includes different resources for different types of instruments. For example, an INSTR resource for a register-based device only includes High Level and Low Level accesses while an INSTR resource for a GPIB device only has read, write, trigger, poll and clear resource. An INSTR resource for a message-based VXI device includes read, write, trigger, poll and clear resource in addition to High Level and Low Level resources.

VISA System Operation

Figure 14:
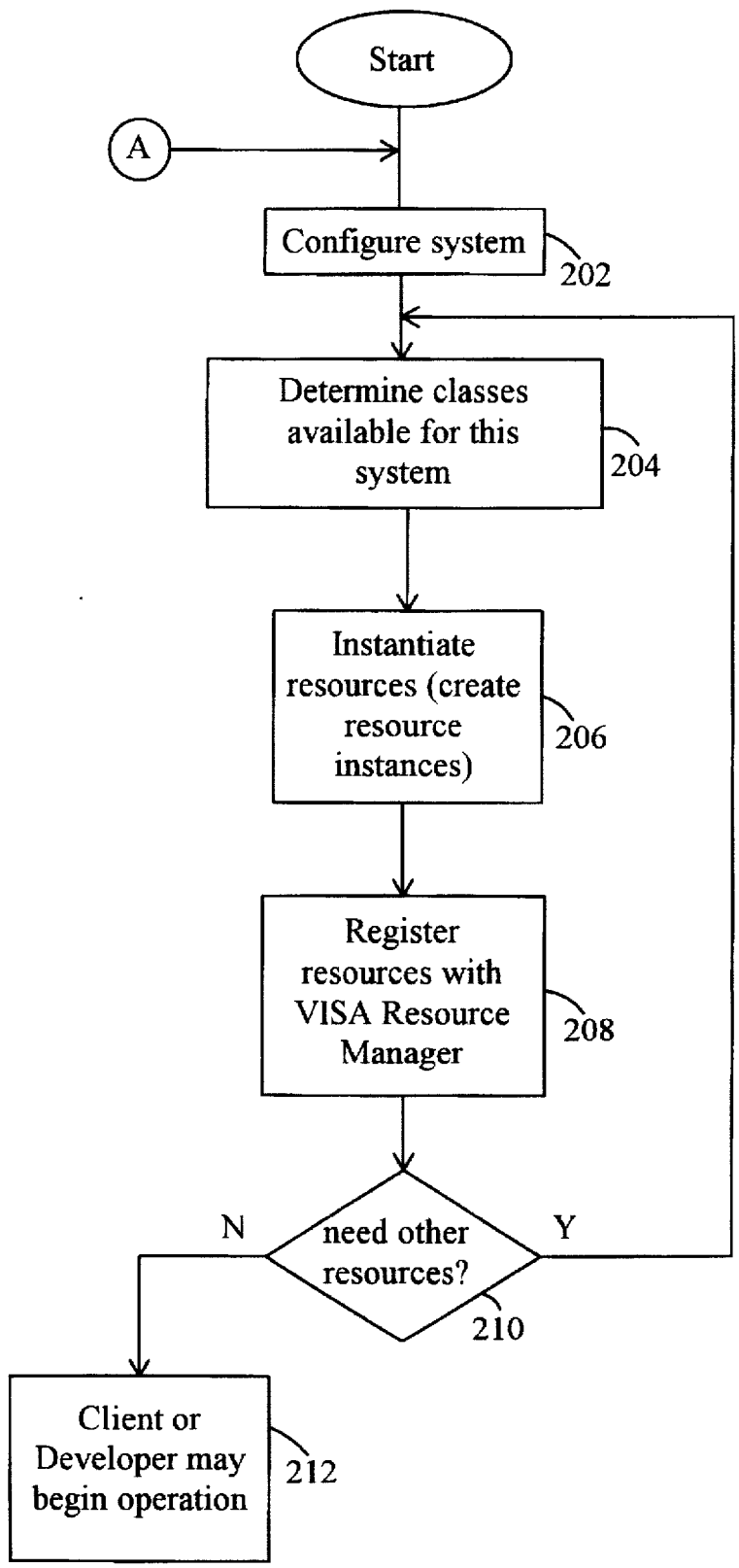
FIG. 14 is a flowchart diagram illustrating the configuration steps performed by a VISA system.
Figures 15, 16:
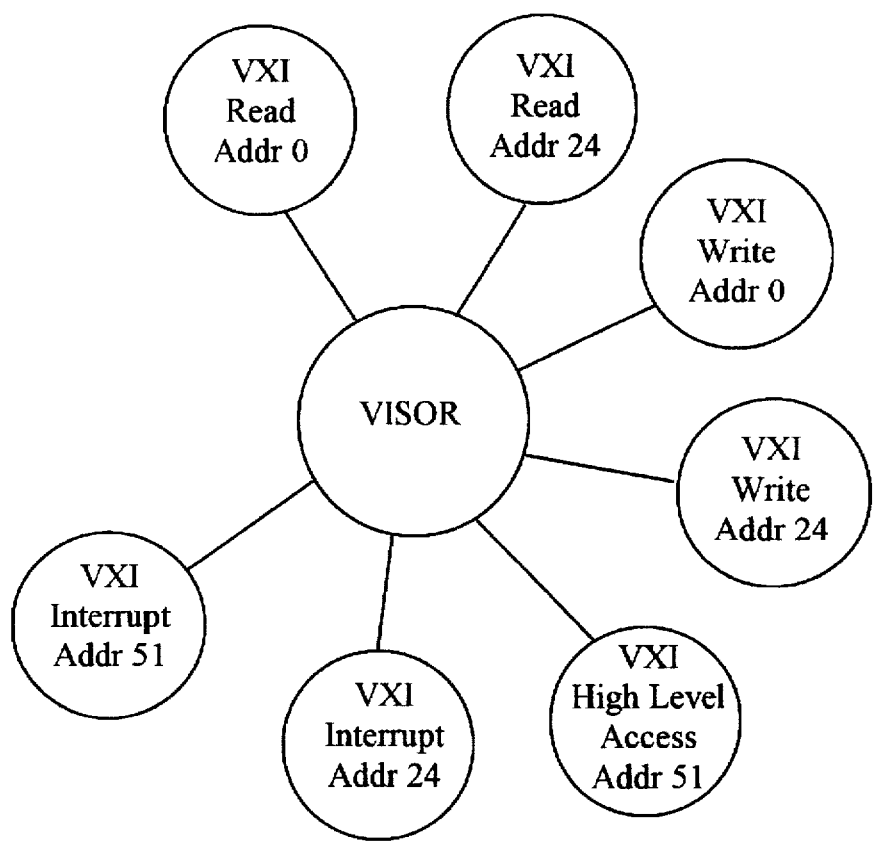
FIG. 15 illustrates an example of instrument devices and resource classes implemented in an example VISA system.
FIG. 16 illustrates the resources created by the configuration method of FIG. 14 for the example VISA system of FIG. 15.

Referring now to FIG. 14, a diagram illustrating operation of the present invention at power up is shown. This operation is described in conjunction with a simple instrumentation system which is shown in FIGS. 15 and 16. As shown in FIG. 15, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 14, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 16, a diagram illustrating the resources that are generated in this example are shown. As shown, the resources created include a VXI Read of address 0, a VXI Read of address 24, a VXI Write of address 0, a VXI Write of address 24, a High Level Access at address 51, a VXI Interrupt at address 51, and a VXI Interrupt at address 24. The startup resource utility 142 instantiates or creates these resources in step 206. The step of instantiating or creating resources in step 206 involves creating an instance which includes code that is inherited or incorporated from the class determined in step 204. The example shown in FIG. 15 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

viOpen Operation

Figure 17A:
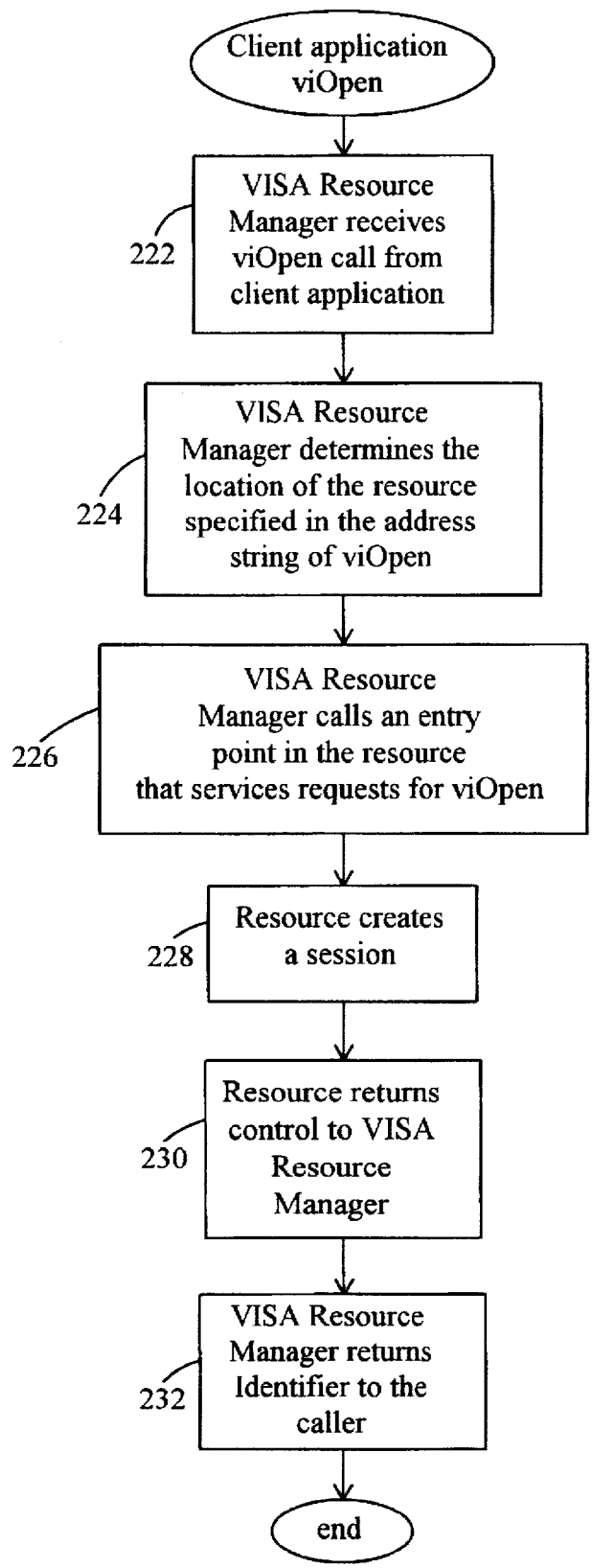
FIG. 17A is a flowchart diagram illustrating the steps performed by a VISA system when a client application uses the viOpen operation.
Figure 17B:
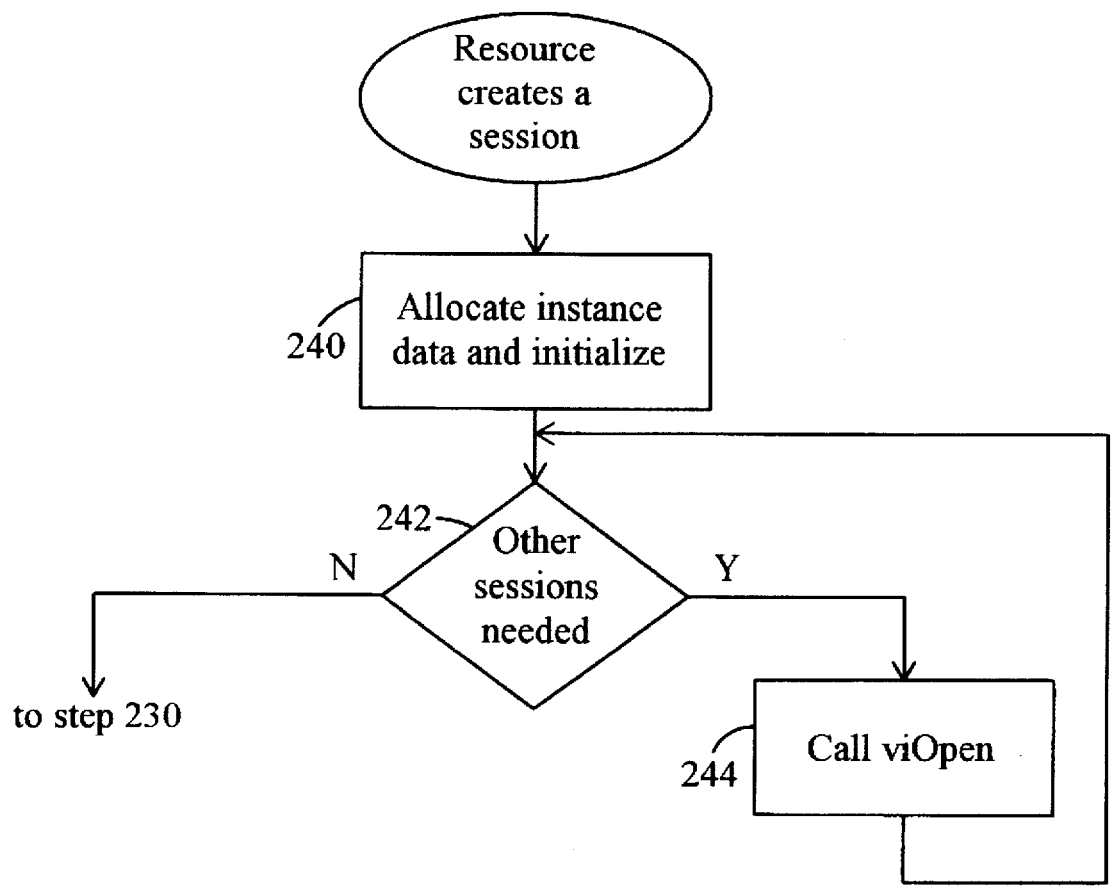
FIG. 17B is a flowchart diagram of a resource creating a session performed in step of FIG. 17A.

FIGS. 17A–B illustrate operation when a client application begins using the resources within a VISA system according to the present invention. Referring now to FIGS. 17A–B, a diagram illustrating operation of a VISA system when a viOpen instruction is received from a client application is shown. A client begins an application or session with a viOpen instruction. The viOpen instruction instructs the VISA Resource Manager 140 to connect the user's application to a desired resource. The operation of the viOpen operation illustrated in FIG. 17A is discussed in conjunction with FIG. 18.

Figure 18:
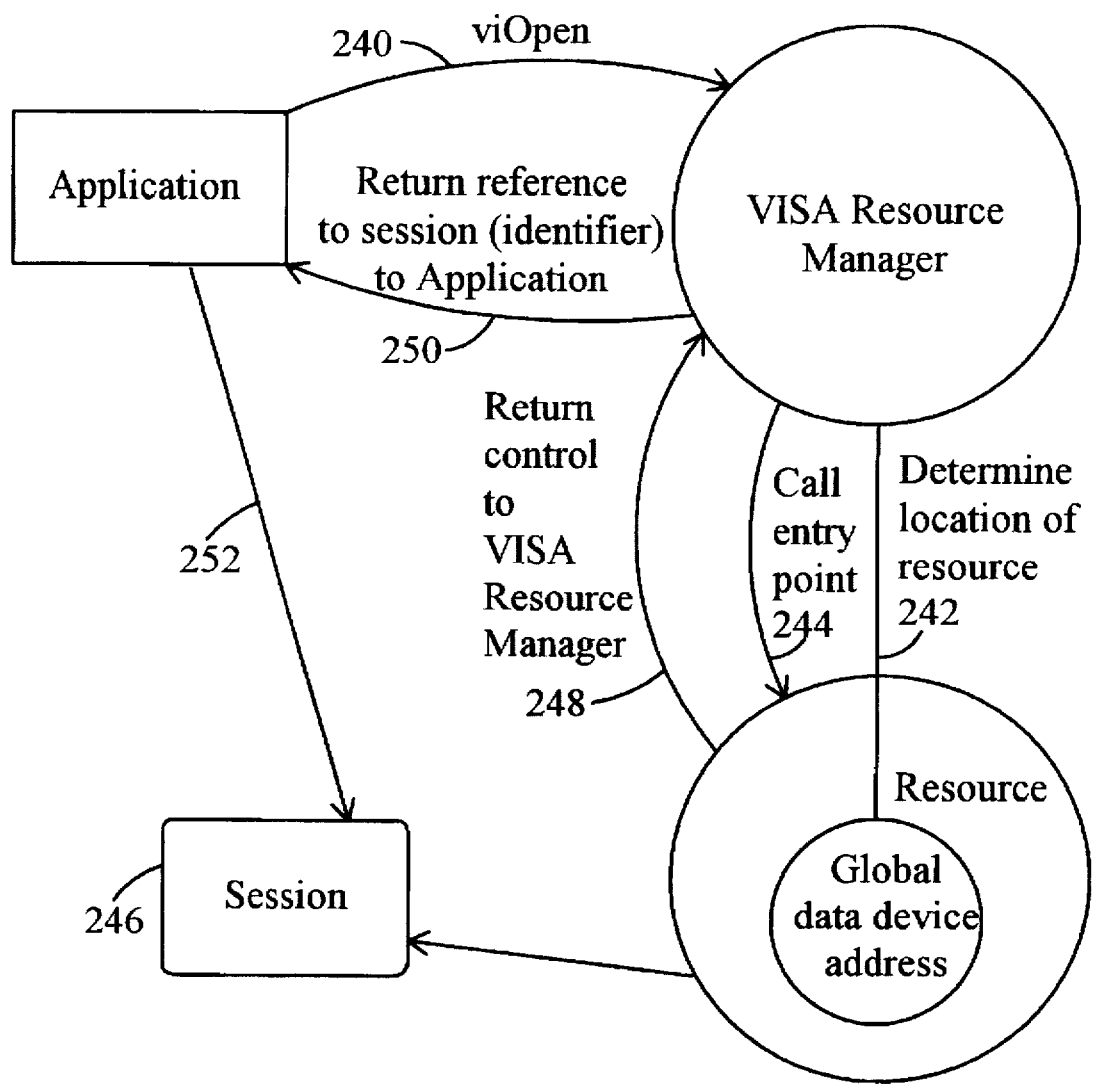
FIG. 18 illustrates the steps performed in FIG. 17A when a viOpen operation is used.

When a system according to the present invention receives a viOpen instruction in step 222, then in step 224 the VISA Resource Manager 140 determines the location of the resource specified in the address string of the viOpen instruction. In FIG. 18, the client application performing a viOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the viOpen operation. This step is illustrated at 244 in FIG. 18. In step 228 the resource creates a session, this session being shown at 246 in FIG. 18. As described above, a session is essentially an instance of a resource. Creating a session involves creating data that is needed for a particular instance of that resource.

In step 230 the resource returns control to the VISA Resource Manager 140, and this is shown at 248 in FIG. 18. In step 232 the VISA Resource Manager 140 returns a reference or identifier to the user's application. This reference is provided in the variable "session i.d." to the user application, as shown at 250 in FIG. 18. The application can then use this session i.d. value to communicate with the resource, as shown at 252 in FIG. 18.

FIG. 17B illustrates more detail regarding how a resource creates a session in step 228 of FIG. 17A. As shown, when a resource creates a session the resource allocates instance data and initializes the session in step 240. In step 242 the resource determines if other sessions are needed in step 242. If so, then viOpen is called on those other resources in step 244 and control returns to step 242. If other sessions are not needed, then control advances to step 230 in FIG. 17A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Non-VISA Application Opening a Session to VISA Resources

Figure 19:
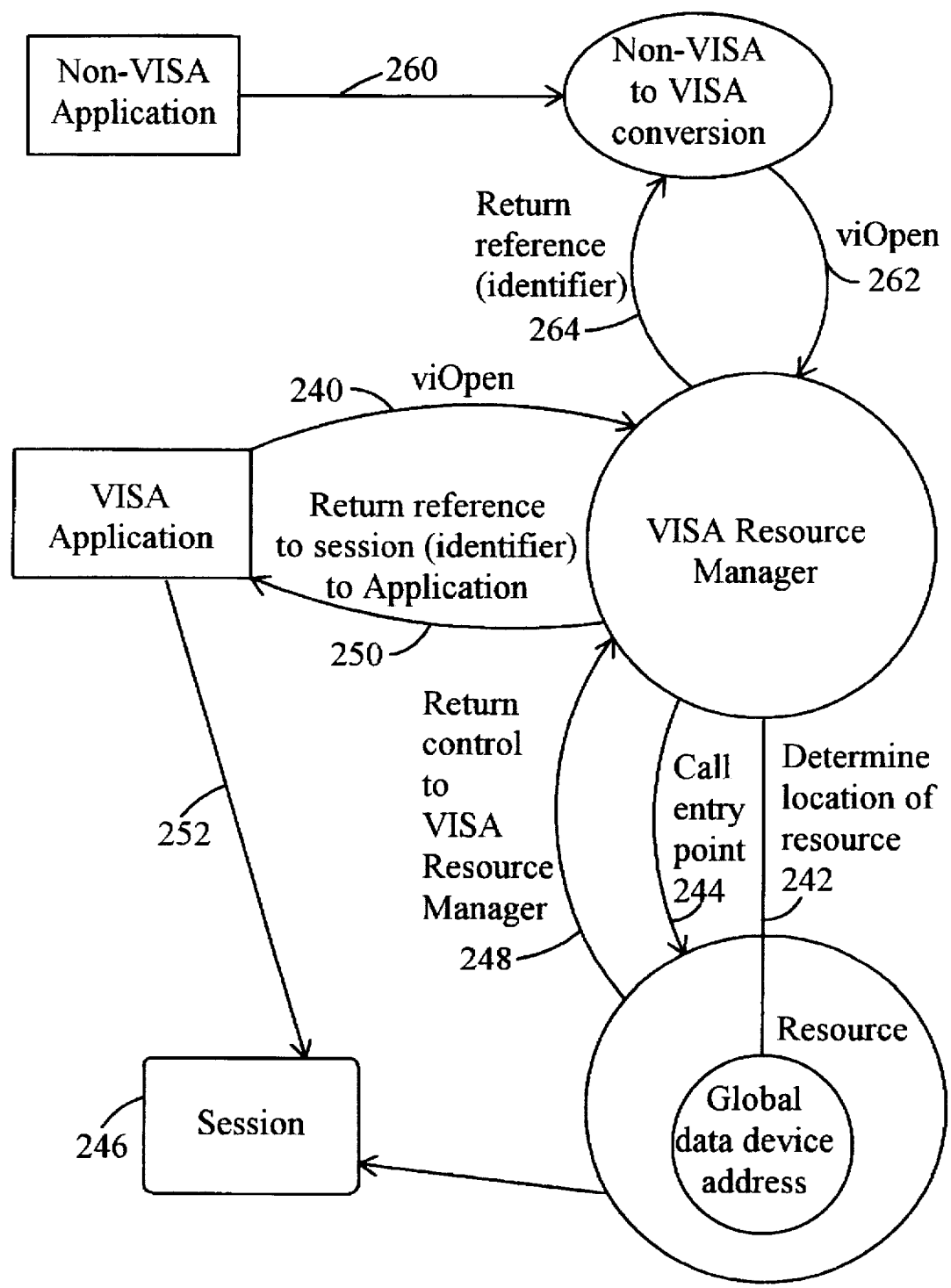
FIG. 19 is similar to FIG. 18 but also illustrates a Non-VISA to VISA conversion.

FIG. 19 is a diagram similar to FIG. 18, but also shows how a non-VISA application, such as an application written for the SICL Driver level library, undergoes a conversion that enables it to talk to a VISA system. As shown, a non-VISA application which was developed according to a different software architecture can open sessions with VISA resources within a VISA system by means of the non-VISA to VISA conversion block, as shown. The non-VISA to VISA conversion block also receives instructions from the non-VISA application and transmits various operations to the VISA Resource Manager 140 to implement the steps in the non-VISA application.

VISA Resource Data Types

A VISA system includes a plurality of defined data types. The data types related to events are described below. ViEvent is an object that encapsulates the information necessary to generate or process an event. The ViEvent object is associated with various event methods. Thus the operations viGetAttribute, viSetAttribute and viClose apply to the event object and the fields defined by viEvent are attributes for the particular event. ViHndlr is a value representing an entry point to an operation for use in callback-type operations. ViPHndlr is the location of a ViHndlr.

Format for Description of Operations

The present disclosure describes the operations of a resource using the following format:

1. Name (with Formal Parameter Names)

This portion of the operation description includes the name of the operation and a list of the formal parameter names.

2. Purpose and Description Statement

This field generally describes the operation, including a discussion of the functionality of the operation, the functionality of individual parameters, and the interrelation of particular sets of parameters.

3. Parameters

A table is included for each operation which lists each of the parameters for an operation with relevant information for the parameter. The Parameters table includes information regarding the Name, Direction, and Type of the parameter as well as a description of the parameter.

The Name column designates a symbolic name that is used when referencing actions/qualities about the associated parameter. The Direction column indicates whether the parameter is for Input and/or Output, i.e., whether the invoker of the operation supplies the value of the parameter (Input) and/or whether the invoker supplies the location to place a resultant value (Output). Input values are always passed by value and output values are passed by reference or by their location depending on the final language binding. The Type column designates the parameter as one of the predefined VISA data types as defined earlier. The type field provides a common place to perform one-to-one mappings to particular language bindings. The Description column simply gives a short description for the specific meaning of the data passed through the corresponding parameter.

4. Return Status

The return status comprises three sections: the Type section, Completion codes, and Error codes. The Type section is supplied to make it implicit as to the type of the variable returned from the corresponding operation. Although this type can be of any type, the current VISA specification generally returns only a single type, ViStatus, from all operations. Returning a single type with a single format provides a high level of consistency between operations. All Completion codes and Error codes follow one of the following formats:

The VI_SUCCESS* return code indicates that the operation completed in one of its non-error return states.

The VI_WARN* return code indicates that the operation did not complete but did not cause an error (e.g. when a parameter indicates to abort the operation if the operation cannot be completed immediately), or the operation completed but resulted in some erroneous condition that can indicate a problem.

The VI_ERROR* return code indicates that the operation did not complete successfully.

An asterisk (*) indicates that more characters may follow in the symbolic name. For a complete list of return codes, see Appendix 1, and more particularly Appendix C of Appendix 1 titled Resource Summary Information.

VISA Resource Template-EVENTS

VISA Resource Template Event-Related Attributes

The VISA Resource Template includes a plurality of attributes, including two attributes related to event handling. The attribute VI_ATTR_MAX_QUEUE_LENGTH specifies the maximum number of events that can be queued at any time on the given session. The attribute VI_ATTR_QUEUE_TRIP_POINT specifies a trip point in the event queue.

VISA Resource Template Events

The VISA Resource Template resource includes the following events:

VI_EVENT_ALERT
VI_EVENT RSRC_ACTIVE
VI_EVENT RSRC_INACTIVE
VI_EVENT RSRC_LOCK_CHANGED
VI_EVENT_QUEUE_FULL
VI_EVENT_QUEUE_TRIP

The event VI_EVENT_ALERT informs the application that a session or resource has been aborted, reset, or killed.

The event VI_EVENT_RSRC_ACTIVE informs the application that the resource has been activated and has services available to applications and other resources.

The event VI_EVENT_RSRC_INACTIVE informs the applications that the resource has been deactivated and thus has no services available to applications and other resources.

The event VI_EVENT_RSRC_LOCK_CHANGED informs the application that the state of the lock has been updated.

The event VI_EVENT_QUEUE_FULL informs the application that the queue that is used to manage the wait operations is full.

The event VI_EVENT_QUEUE_TRIP informs the application that the queue that is used to manage the wait operations has reached the trip point.

VISA Resource Template Event-Related Operations

The VISA Resource Template resource includes a number of operations. The operations related to event handling are listed here and described fully below.

viEnableEvent(vi, eventType, mechanism, context)

viDisableEvent(vi, eventType, mechanism)

viQueryEventMech(vi, eventType, mechanism, context)

viInstallHandler(vi, eventType, handler, userHandle)

viUninstallHandler(vi, eventType, handler, userHandle)

viQueryHandlers(vi, eventType, handlerList, count, handler, userHandle)

viAcknowledgeEvent(vi, eventType, context)

viWaitOnEvent(vi, eventType, timeout, outEventType, outContext)

viWaitOnMultipleEvents(vi, eventTypeList, timeout, outEventType, outContext)

viDiscardEvents(vi, eventType, mechanism)

viRaiseEvent(vi, eventType, context)

Handler Prototype

An application that defines a handler that is to be registered with VISA's event management system preferably defines this handler by the prototype:

viEventHandler(vi, eventType, context, usrContext).

VISA Events

The VISA Resource Template 130 defines a common mechanism for an application to become aware of an occurrence of certain conditions. These occurrences are referred to as events. Typically, events occur because of a condition requiring the attention of applications, the beginning or ending of activity, or an abnormal condition in the system. An event is a means of communication between a VISA resource and its applications. Events in a VISA system cover a broad scope and can carry information about the following conditions:

Conditions arising in hardware requiring attention of applications. For example, an application needs to be alerted when a device that it is controlling requests service, such as an SRQ in GPIB.

Conditions arising in hardware requiring immediate response of applications. For example, an application needs to know when a hardware line indicating system failure is being driven, such as the SYSFAIL line in VXI.

Conditions of error in normal execution sequence. For example, an application wants a uniform way of determining when an operation does not succeed.

The beginning and ending of an activity pertaining to a resource. For example, an application is interested in knowing when certain system services are brought online or offline.

An abnormal state condition. For example, a resource transits into an invalid state and it has to terminate normal execution.

A VISA system includes a mechanism for receiving events into an application called the event handling/processing mechanism. This section describes how a VISA application receives, acknowledges and creates events. The functional view of the events that include receiving, acknowledgment, and creation of events is discussed in the general event model in the section titled "Event Model." A VISA system classifies events depending upon the information of the condition. Different classes of events used in the present invention are discussed in the section titled "Event Classification and Representation." The operations that support the event model in VISA are defined in the section titled "Event Handling Operations and Handler Prototype." VISA events cover the notification of certain conditions only. As such, events do not cover the assertion of hardware conditions, such as the driving of a trigger line, or the assertion of an interrupt. The assertion of hardware conditions is handled by operations of the individual resources.

Event Model

Figure 20:
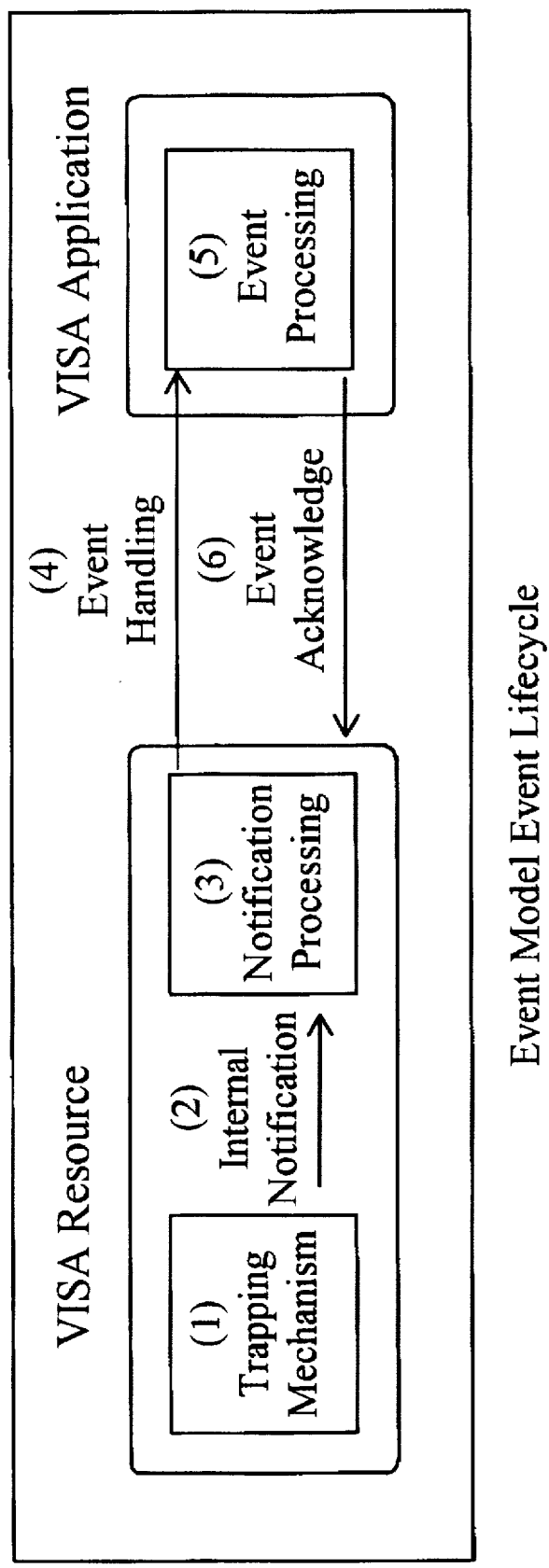
FIG. 20 illustrates the operation of event processing in the present invention.

Referring now to FIG. 20, the VISA event model according to the present invention includes three aspects: trapping and notification, handling and processing, and acknowledgment. Event trapping and notification involves a resource becoming aware of the event and passing the event to sessions that are enabled to receive the event. This aspect is discussed in the section "Event Trapping and Notification." Handling and processing involve an application being informed that an event has occurred. In a VISA system, there are several ways that an application can request to receive events, and these are discussed in the section titled "Event Handling and Processing." Event acknowledgment is necessary for certain protocols that may require some form of handshaking. This is discussed in the section titled "Event Acknowledgment."

Event Model and Order/Sequence

Event Model Overview

Figure 21:
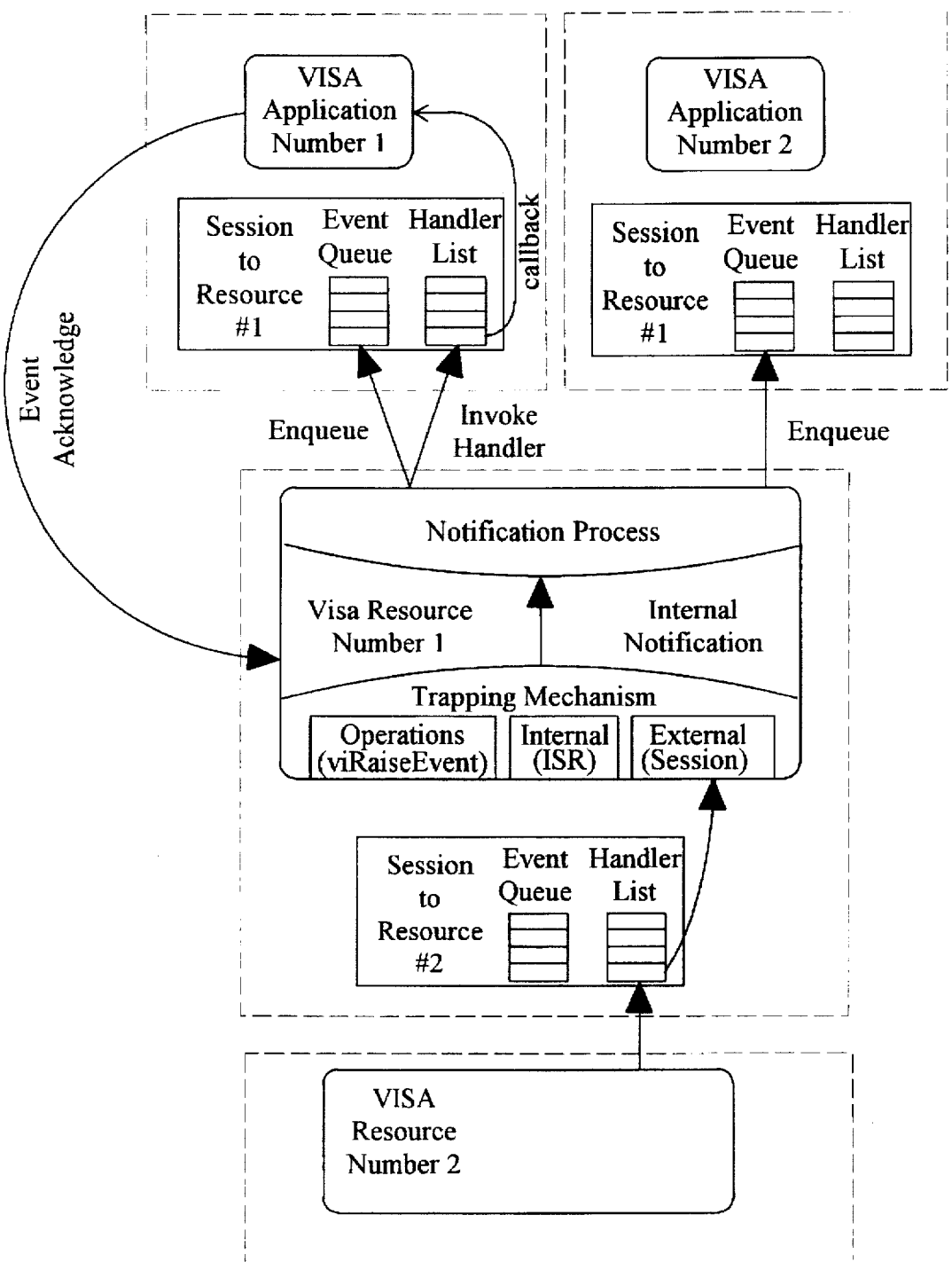
FIG. 21 is a more detailed diagram illustrating event processing according to the present invention.

This section introduces the event model using an example of a resource's implementation of the VISA event model. This section also covers the event model from an application's point of view as well as how a resource would implement it internally. FIG. 21 is a detailed overview of the VISA event model.

Overview of Event Model

The application's view of the event handling mechanisms is as follows. An application can open multiple sessions to a resource and can then enable each session to receive events of a specified type using either the callback or the queuing mechanism, or both. This can be done using the viEnableEvent( ) operation. Before enabling for the callback mechanism, the application must install at least one handler using the viInstallHandler( ) operation. Once enabled, the resource will maintain for each session both a list of handlers to be invoked for an event type and the session's event queues.

A resource's implementation of the event model uses a three-step process that includes trapping events as well as notifying the applications. The resource obtains information of an event occurrence through the trapping mechanism. Once an event is trapped, the resource notifies the handling mechanism of the event occurrence using the resource's internal notification mechanism. Finally, the handling mechanism notifies the applications of the event occurrence. These three steps are described in more detail below.

The trapping mechanism allows a resource to be informed of an event occurrence in three possible ways: internal trapping, external trapping, and operations.

Once a resource traps an event (either internally or externally), the event is transmitted to the resource's notify mechanism. The means of transmitting is internal notification of event occurrence and is described by the arrow in the diagram from the trapping mechanism to the notify mechanism. Once the resource's handling mechanism is made aware of the event occurrence, the handling mechanism uses the algorithm specified below for invoking the callback handlers and/or queueing the event occurrence for each enabled session.

Event Notification Method

---

For this specific event type
    For sessions enabled for callback mechanisms
        For all handlers in the handler list
            Invoke handler
    For each session enabled for queuing and waiting on this event
        Unblock wait
    For all other* sessions enabled for queuing mechanism on this event
        Queue the event occurrence.

*Other sessions are those on which a wait operation is not unblocked

---

Sometimes, an application's session may need to acknowledge the receipt of an event to the source of event. The session can do so using the acknowledgment mechanism provided by a VISA system. An application can use the viAcknowledgeEvent( ) operation to acknowledge the source of event notification. This is denoted by the lines from the application to the notification mechanism in FIG. 21, Overview of Event Model.

Event Trapping and Notification

Internal trapping means that the need for the event was generated internally and the event occurrence was constructed within the resource. An example of receiving events internal to a resource is VI_EVENT_QUEUE_FULL. One method by which internal trapping of events can occur is by using an interrupt service routine. External trapping means that the event was received from another resource.

There are three possible ways for a VISA resource to be informed of the occurrence of an event: internal trapping, external trapping, and operations. Internal trapping means that the event is first constructed in that resource. Examples of internal trapping include interrupt service routines (ISRs) and parameter validation errors or the overflow of the queue in a session (VI_EVENT_QUEUE_FULL). External trapping means that the event was received from another resource. A resource can receive events from other resources in exactly the same fashion as an application does. Examples of receiving events externally from other resources are an alert condition such as a system failure (VI_EVENT_ALERT) and a resource coming on line (VI_EVENT_RSRC_ACTIVE). For trapping external event occurrences, the resource can either install callback routines or enable the queueing mechanism on other resources as described in the section titled "Event Handling and Processing." This allows the event handling mechanism to be consistent for a user application as well as to any other resource in the VISA system. Finally, the third method in a VISA system for trapping events is through the use of operations to programmatically generate an event within that resource. The VISA Resource Template defines an operation viRaiseEvent( ) for this specific purpose.

Once a resource has trapped an event, it passes the event to its notification mechanism. The notification mechanism then informs whichever sessions are enabled to receive that event, using each event handling mechanism for which the session is currently enabled.

An application can use the viRaiseEvent( ) operation to cause a resource to signal its sessions that an event has occurred. Through this operation, it is possible to target the notification of the event toward a specific session (the one on which the operation is invoked). The VISA model requires every VISA resource to support programmatic event notification for all the events that it supports.

Once a resource has trapped an event, the resource passes the event to its notification mechanism. The notification mechanism then informs the respective sessions that are enabled to receive that event, using each event handling mechanism for which the session is currently enabled. The passing of the event from the trapping mechanism to the notify mechanism is represented by the arrow in FIG. 17.

Every VISA resource allows programmatic event notification for all the event types that it supports. By allowing programmatic event notification, the VISA event model can be used to simulate events such as the occurrence of an interrupt.

Event Handling and Processing

Figure 24:
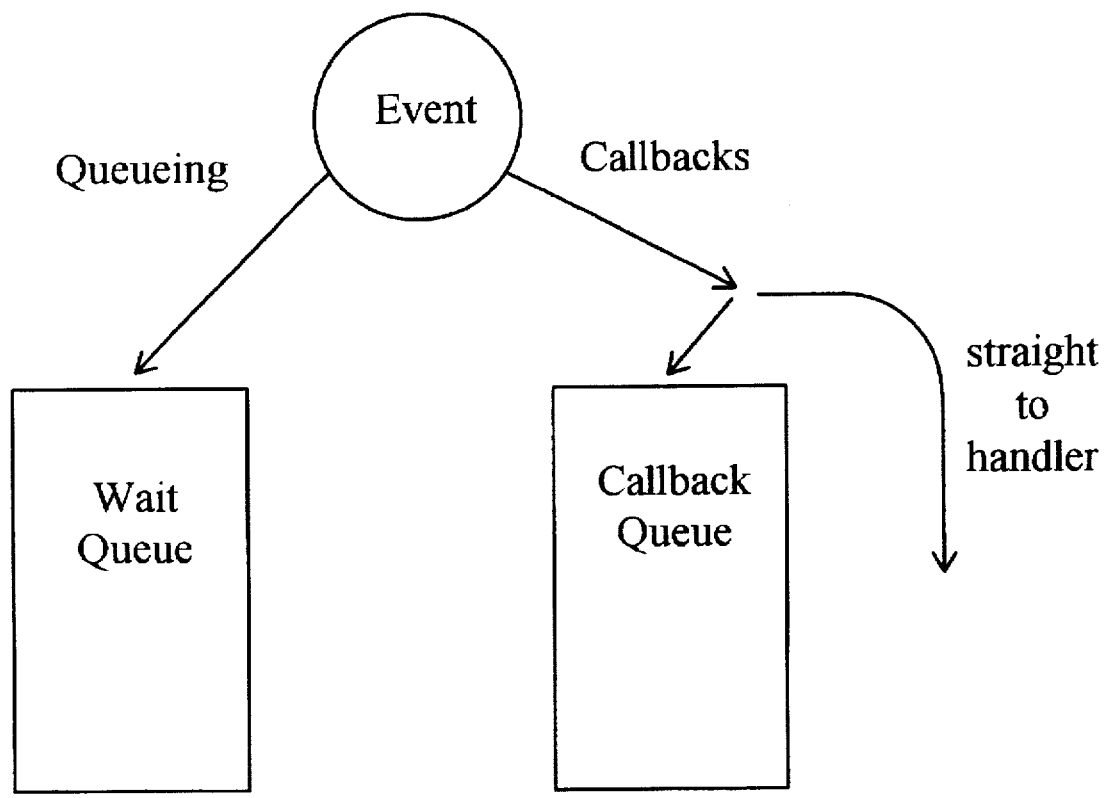
FIG. 24 illustrates two mechanisms by which a client application can be notified of events, these being event queueing and event callbacks.

As shown in FIG. 24, the VISA event model provides two different ways for an application to receive event notification, these being event queueing and event callbacks. The first method is to place all the occurrences of a specified event type in a session-based queue, wherein there is one event queue per event type per session. The application can receive the event occurrences later by dequeueing them with either the viWaitOnEvent( ) or the viWaitOnMultipleEvents( ) operation. The other method is to call the application directly, invoking a function which the application installed prior to enabling the event. A callback handler is invoked on every occurrence of the specified event. There can be multiple handlers installed on the same session.

Every VISA resource preferably implements both the queueing and callback event handling mechanisms. The queueing and callback mechanisms are suitable for different programming styles. The queuing mechanism is generally useful for non-critical events that do not need immediate servicing. The callback mechanism, on the other hand, is useful when immediate responses are needed. These mechanisms work independently of each other, and both can be enabled at the same time. By default, a session is not enabled to receive any events by either mechanism. The viEnableEvent( ) operation can be used to enable a session to respond to a specified event type using either the queueing mechanism, the callback mechanism, or both. Similarly, the viDisableEvent( ) operation can be used to disable one or both mechanisms for receiving events. Because the two mechanisms work independently of each other, one can be enabled or disabled regardless of the current state of the other. The viQueryEventMechanism( ) operation can be used to get the currently enabled event handling mechanisms for a specific event.

The queueing mechanism is discussed in the section titled "Queueing Mechanism." The callback mechanism is described in the section titled "Callback Mechanism."

Queuing Mechanism

The queueing mechanism in a VISA system gives an application the flexibility to receive events only when it requests them. In the preferred embodiment, events are prioritized solely based on time. In another embodiment, an additional priority scheme is incorporated. For example, in this embodiment, when a session is enabled for queueing, events for that session are placed in a priority queue. Each event defines its own priority. The priority queue allows the highest priority events to be put ahead of lower-priority events that are already in the queue. Events of the same priority are put in FIFO order. A separate event queue is maintained for each individual session per event type. Each event which is to be placed on a queue is queued in the order of its priority. If an event is to be placed on a queue, and there are events on the queue of equal priority, then the event to be queued is placed in the queue such that it is dequeued after all the existing events.

An application retrieves event information by using either the viWaitOnEvent( ) operation or the viWaitOnMultipleEvents( ) operation. If the specified event (s) exist in the queue, these operations retrieve the event information and return immediately. Otherwise, the application thread is blocked until the specified event(s) occur or until the timeout expires, whichever happens first. When an event occurrence unblocks a thread, the event is not queued for the session on which the wait operation was invoked.

Figure 22:
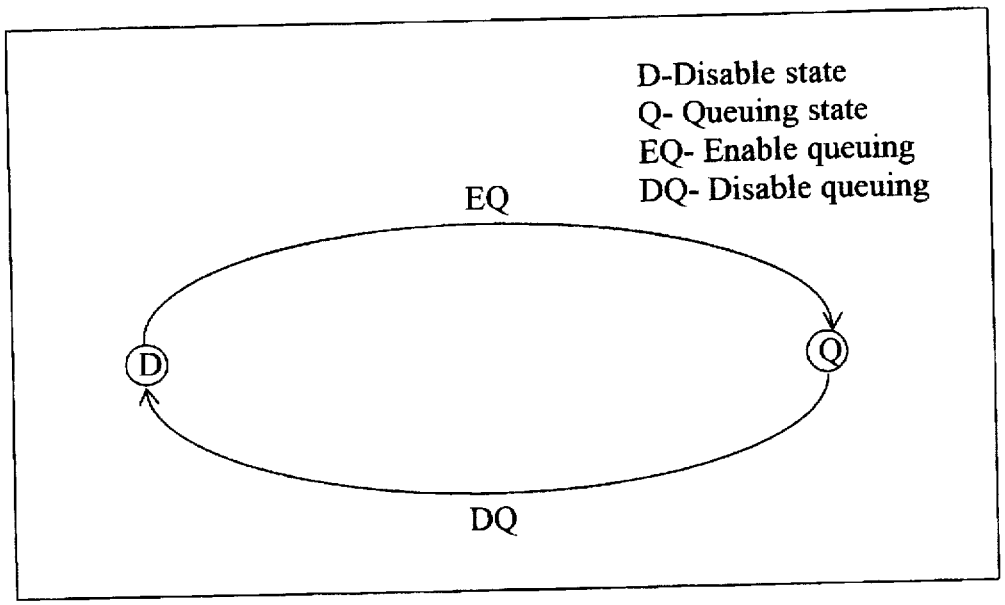
FIG. 22 illustrates a state diagram of the queueing mechanism of the present invention.

Referring now to FIG. 22, a state diagram for the queuing mechanism is shown. This state diagram includes the enabling and disabling of the queueing mechanism and the corresponding operations. The queuing mechanism of a particular session can be in one of two different states: Disabled or Queuing (enabled for queuing). A session can transition between these two states using the viEnableEvent( ) or viDisableEvent( ) operation. Once a session is enabled for queuing (EQ transition to the Q state), all the event occurrences of the specified event type are queued. When a session is disabled for queuing (DQ transition to D state), any further event occurrences are not queued, but event occurrences that were already in the event queue are retained. The retained events can be dequeued at any time using either of the wait operations. An application can explicitly clear (flush) the event queue for a specified event type using the viDiscardEvent( ) operation.

If there are any events in a session's queue, and the queueing mechanism transitions between states, then the resource does not discard any events from the queue.

The following table lists the state transitions and the corresponding values for the mechanism parameter in the viEnableEvent( ) and viDisableEvent( ) operations.

TABLE

State Transitions for the Queuing Mechanism

| Destination State | Paths Leading to Destination State | Value of mechanism parameter | Operations |
|---|---|---|---|
| Q | EQ | VI_QUEUE | viEnableEvent |
| D | DQ | VI_QUEUE, VI_ALL_MECH | viDisableEvent |

Every VISA resource provides two attributes for use in configuring and maintaining session queues. The VI_ATTR_MAX_QUEUE_LENGTH attribute specifies the maximum number of events that can be queued at any time on the given session. The VI_ATTR_QUEUE_TRIP_POINT attribute specifies a trip point in the event queue. The purpose of this trip point is to warn the application when the event queue contains the specified number of events. For example, if an application needs to know if its queue is ever more than half full, this attribute value should be set to half of whatever value the attribute VI_ATTR_MAX_QUEUE_LENGTH is set to.

Once the trip point is set and the queue fills up to the trip point, the application receives a warning through the event VI_EVENT_QUEUE_TRIP. The application also receives a warning status on the next dequeue of an event. After receiving this warning, an application can take appropriate actions such as increasing the queue size or removing events from the queue. Also, if the event queue fills up to the value set in VI_ATTR_MAX_QUEUE_LENGTH, the application receives the system event VI_EVENT_QUEUE_FULL. Once a queue becomes full, existing event occurrences may be lost when newer events are received. Any new event occurrence is placed in the order of its priority, and the event with the lowest priority and minimum timestamp (that is, the oldest event) is discarded.

| Symbolic Name | Access Privilege | Data Type | Range |
|---|---|---|---|
| VI_ATTR_MAX_QUEUE_LENGTH | R/W | Local | ViUInt16 | N/A |
| VI_ATTR_QUEUE_TRIP_POINT | R/W | Local | ViUInt16 | N/A |

Every VISA resource supports both the VI_ATTR_MAX_QUEUE_LENGTH and VI_ATTR_QUEUE_TRIP_POINT attributes as well as both the VI_EVENT_QUEUE_FULL and the VI_EVENT_QUEUE_TRIP events.

If a queue is full, and a new event is to be placed on the queue, then the event with the lowest priority and the minimum timestamp is discarded, and the resource causes an internal trap of VI_EVENT_QUEUE_FULL. If a queue is filled to the trip point value, and a new event is to be placed on the queue, then the resource causes an internal trap of VI_EVENT_QUEUE_TRIP.

Callback Mechanism

The VISA event model also allows applications to install functions which can be called back when a particular event type is received. The viInstallHandler( ) operation can be used to install handlers to receive specified event types. These handlers are invoked on every occurrence of the specified event, once the session is enabled for the callback mechanism. At least one handler must be installed before a session can be enabled for sensing using the callback mechanism.

If no handler is installed for an event type, and an application calls viEnableEvent( ), and the mechanism parameter is VI_HNDLR, then the viEnableEvent( ) operation returns the error VI_ERROR_HNDLR_UNINSTALLED.

A VISA system allows applications to install multiple handlers for an event type on the same session. Multiple handlers can be installed through multiple invocations of the viInstallHandler( ) operation, where each invocation adds to the previous list of handlers. If more than one handler is installed for an event type, each of the handlers is invoked on every occurrence of the specified event(s). VISA specifies that the handler installed last is the first to be invoked, then the one installed just before it, and so on. Thus, if multiple handlers are installed for an event type on the same session, then the handlers are invoked in the reverse order of the handlers' installation (LIFO order). When a handler is invoked, the VISA resource provides the event filter context as a parameter to the handler. The event filter context is filled in by the resource. Applications can also fill certain parts of the filter context while enabling the event by filling the context structure passed to viEnableEvent( ). The context fields filled by an application are passed unchanged to the handlers when they are invoked.

Besides filling the event filter context, an application can also supply a reference to any application-defined value while installing handlers. This reference is passed back to the application as the userHandle parameter, to the callback routine during handler invocation. This allows applications to install the same handler with different application-defined contexts. For example, an application can install a handler with a fixed value 0×1 on a session for an event type. An application can install the same handler on the same session with a different value, say 0×2, for the same event type. The two installations of the same handler are different from each other. Both the handlers are invoked when the event of the given type occurs. However, in one invocation the value passed to userHandle is 0×1 and in the other it is 0×2. Thus, VISA event handlers are uniquely identified by a combination of the handler address and user context pair. This identification is particularly useful when different handling methods need to be performed depending on the user context data.

An application may install the same handler on multiple sessions. In this case, the handler is invoked in the context of each session for which it was installed. If a handler is installed on multiple sessions, then the handler is called once for each installation when an event occurs.

An application can uninstall any of the installed handlers using the viUninstallHandler( ) operation. This operation can also uninstall multiple handlers from the handler list at one time. The viQueryHandlers( ) operation can be used to query the currently installed handlers on an event type.

Figure 23:
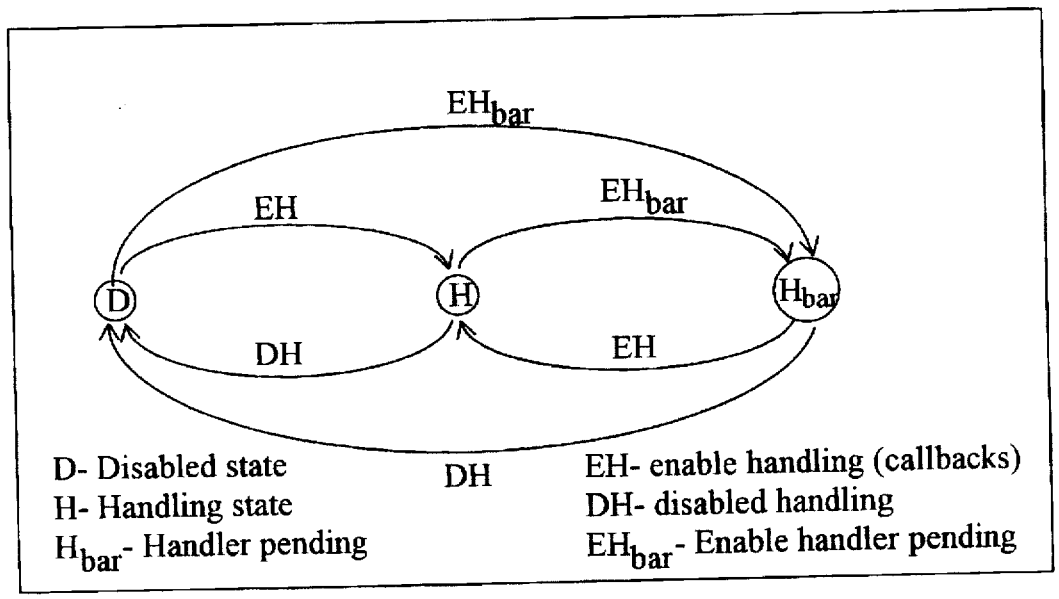
FIG. 23 illustrates a state diagram of the callback mechanism of the present invention.

Referring now to FIG. 23, a state diagram of a resource implementing a callback mechanism is shown. This state diagram includes the enabling and disabling of the callback mechanism in different modes and also briefly describes the operations that can be used for state transitions. The table immediately below lists different state transitions and parameter values for the viEnableEvent( ) and viDisableEvent( ) operations.

The callback mechanism of a particular session can be in one of three different states: Disabled, Handling, or Suspended handling ($H_{bar}$). When a session transitions to the handling state (EH transition to H state), the callback handler is invoked for all the occurrences of the specified event type. When a session transitions to the suspended handling state ($EH_{bar}$ transition to $H_{bar}$), the callback handler is not invoked for any new event occurrences, but occurrences are kept in a suspended handler queue. The handler is invoked later, when a transition to the handling state occurs. When a session transitions to the disabled state (DH transition to the D state), the session is desensitized to any new event occurrences, but any pending occurrences are retained in the queue. In the suspended handling state, a maximum of the VI_ATTR_MAX_QUEUE_LENGTH number of event occurrences are kept pending. If the number of pending occurrences exceeds the value specified in this attribute, the lowest-priority and oldest events are discarded as described in the section titled "Queueing Mechanism."

If the number of pending occurrences equals to the VI_ATTR_QUEUE_FULL value, and a new event arrives, then the event with the lowest priority and the minimum timestamp is discarded. Also, if the number of pending occurrences equals to the VI_ATTR_QUEUE_FULL value, and a new event arrives, then the resource causes an internal trap of VI_EVENT_QUEUE_FULL.

If the number of pending occurrences equals to the VI_ATTR_QUEUE_TRIP_POINT value, and a new event arrives, then the resource causes an internal trap of VI_EVENT_QUEUE_TRIP.

The following table lists the state transition diagram for the callback mechanism and the corresponding values for the mechanism parameter in the viEnableEvent( ) or viDisableEvent( ) operations.

Event Acknowledgment

Many event types defined by VISA require an acknowledgment. A typical example is that of two VXI devices implementing the Asynchronous Trigger protocol, which requires an acknowledgment from the receiving VXI device to the triggering VXI device.

A VISA system allows applications to acknowledge the receipt of events using the viAcknowledgeEvent( ) operation. Whenever an event is received for which acknowledgment is required, an application should acknowledge the event occurrence using this operation. To determine whether an acknowledgment is required, an application can check the viEventAckReqr field in the event context structure. The event context passed to the viAcknowledgeEvent( ) operation should be the same event context which was received with the event notification, in order to uniquely identify the event occurrence in the operation.

As described in the section titled "Event Handling," multiple sessions can be enabled for an event type. When a resource finds out that an event has occurred (for example, through an interrupt), the resource notifies all its sessions of the event occurrence. If the event type requires acknowledgment, all the listening sessions must acknowledge this event occurrence. The resource performs necessary actions only after receiving acknowledgments from all the listening (enabled) sessions. In VISA, the necessary actions typically include acknowledging a source of the interrupt in hardware, freeing other system resources allocated for the event occurrence, and so on. VISA system resources often participate in standard protocol implementations. Therefore, the VISA event model requires resources to wait until they have received acknowledgment from all the listening sessions.

As described above, VISA resources specify whether occurrences of an event type require acknowledgment, depending upon the protocol they implement. However, an application can overwrite this requirement specified by the resource. In the viEnableEvent( ) operation, the application

TABLE

State Transition Table for the Callback Mechanism

| Destination State | Source State | Paths Leading to Destination State | Value of Mechanism Parameter | Operation |
|---|---|---|---|---|
| H | D | EH | VI_HNDLR | viEnableEvent |
| H | $H_{bar}$ | EH | VI_HNDLR | |
| $H_{bar}$ | D | $EH_{bar}$ | VI_SUSPEND_HNDLR | |
| $H_{bar}$ | H | $EH_{bar}$ | VI_SUSPEND_HNDLR | |
| D | H | DH | VI_HNDLR, VI_ALL_MECH | viDisableEvent |
| D | $H_{bar}$ | DH | VI_SUSPEND_HNDLR, VI_ALL_MECH | |

If the callback mechanism mode for event handling is changed from VI_SUSPEND_HNDLR to VI_HNDLR, then all the pending events for the event type specified in eventType parameter of viEnableEvent( ) are handled before viEnableEvent( ) completes.

It is noted that the queuing mechanism and the callback mechanism operate independently of each other. In a VISA system, sessions keep information for event occurrences separate for both mechanisms. If one mechanism reaches its predefined limit for storing event occurrences, it does not directly affect the other mechanism.

can specify whether it will acknowledge occurrences of the specified event type. The section titled "Event Filter Context" includes a description of how an application can specify its intention of acknowledgment by filling the VI_ATTR_ACK_REQ field. When an application specifies that it will acknowledge occurrences of an event type, the resource waits until the application invokes the viAcknowledgeEvent( ) operation. If there are multiple sessions to a resource, each session can individually specify whether it will acknowledge a given event type. The resource acknowledges the source of the event immediately after it has received acknowledgment from all the sessions that have specified their desire to acknowledge events.

A resource acknowledges an occurrence of an event to the event source only after receiving acknowledgments from all the sessions that are enabled to both receive and acknowledge the event. A resource does not wait for an acknowledgment from all the sessions that have specified not to acknowledge the event. The queueing of event occurrences may cause a delay in acknowledging the source of an event. Queueing time-critical event types may cause unpredictable behavior in applications and lower the overall system performance.

Event Classification and Representation

Figure 20A:
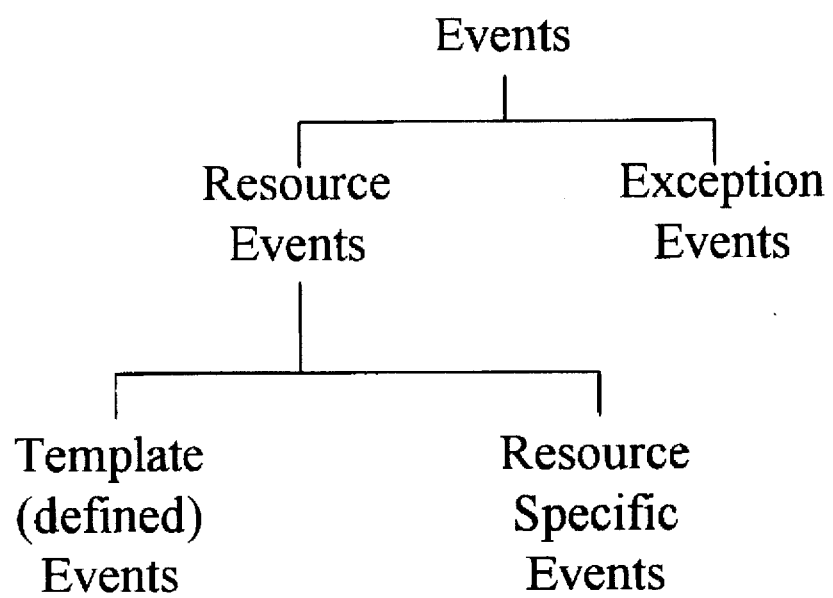
FIG. 20A illustrates classification of events.

Each event defined by a VISA resource has a well-defined behavior. If multiple resources in VISA support one type of event, the behavior of the event is similar on all resources. VISA divides events into two broad classes based on the operational environment: resource events, and exceptions (a type of event). FIG. 20A illustrates Event Classification according to the preferred embodiment of the present invention.

Resource events are useful for exchanging information between a resource and its applications and are defined per resource. Although VISA allows each resource to define new events, there are a few resource events which have to be supported by all the VISA resources, while there are some which are defined by a specific resource only. The events that are supported by all VISA resources are defined by the VISA template set and are hence referred to as template events. Two examples of template events are VI_EVENT_ALERT and VI_EVENT_ACTIVE. Contrary to template defined events, resource defined events are defined by individual resources and are therefore referred to as resource specific events. For example, the GPIB Bus Interface Resource defines the VI_EVENT_GPIB_ATN event to notify applications whenever the attention line is asserted.

Refer to individual resource descriptions for information on resource-specific events. The template events and the resource specific events behave identically with regard to event handling mechanisms and operations.

Exceptions are generated because of errors in a predetermined sequence of execution. Exceptions are defined per operation, whereas resource events are defined per resource definition. Typical examples of these errors include VI_ERROR_BUS_ERROR indicating that the transfer did not complete because a bus error occurred, and VI_ERROR_NSUP_PRIV indicating that an access with specified privilege is not supported by underlying hardware. These errors cause exceptions in VISA when they are enabled.

In a VISA system, different classes of events are represented in the same way. The event representation includes information for uniquely identifying event types and also includes other related information about the events. The representation of event occurrences is referred to as event context, or context. The context is further discussed below in the section titled "Event Information and Context Structure."

Event Information and Context Structure

In a VISA system event types are uniquely identified by explicitly specifying the type of event in the parameters of VISA defined operations. Event contexts contain information to uniquely identify occurrences of events, the class of the event, and other information related to specific events. The representation of all the event types is similar, and a VISA system defines context structure for all events to represent information about events.

The context information of each event is divided into generic and specific context information. The generic context information describes information fields common to all the events. The fields are the same for every VISA system event, although the values contained in the fields may vary. A VISA system requires each resource to report the generic event context at the beginning of the event context. A VISA system defines the ViEvent data type. The ViEvent data type is of type ViObject and represents the complete event context. Specific context is a unique extension of the generic context for a specific event type. The context-specific structure can be found in the description of each event defined as a part of resource definition. A VISA System also defines the ViEventFilter data type which is the input portion of the event context. This context is passed when enabling an event using the operation viEnableEvent, as described below.

All the events defined in a VISA system include the generic event information as the initial information of the event context. The generic event context includes the event class, acknowledge requirement information, and so on and is described in the following table.

TABLE

Generic Event Context Fields

| Generic Context Field Name | Type | Range | Default |
| --- | --- | --- | --- |
| VI_ATTR_EVENT_CLASS | ViUInt16 | VI_SYS_EVENT VI_RSRC_EVENT VI_EXCEPTION | N/A |
| VI_ATTR_EVENT_QUEUE_STATUS | ViStatus | N/A | N/A |
| VI_ATTR_EVENT_TYPE | ViEventType | | |
| VI_ATTR_ACK_REQ | ViBoolean | VI_TRUE VI_FALSE | N/A |

The following paragraphs describe the fields in more detail.

The VI_ATTR_EVENT_CLASS field contains the class of the event. A VISA system defines two classes of events: resource events and exceptions. They are denoted as *VI_RSRC_EVENT, and VI_EXCEPTION, respectively.

The VI_ATTR_EVENT_QUEUE_STATUS field indicates the state of the queue. Refer to the return codes of the viWaitOnEvent( ) and the viWaitOnMultipleEvents( ) operations for descriptions of values returned in this field. The return codes returned in this field are: VI_SUCCESS_QUEUE_EMPTY, VI_WARN_QUEUE_FULL, VI_WARN_QUEUE_OVERFLOW, and VI_WARN_QUEUE_TRIP.

The VI_ATTR_EVENT_TYPE field defines the type of the event.

Event Filter Context

A VISA system includes an event filter according to the present invention. As discussed further below, the operation viEnableEvent includes a filter parameter which is used to qualify the types of events desired to be received at the time of the event occurrence. A VISA system includes a filter type referred to as ViEventFilter, described below. ViEventFilter is of type ViObject.

| VI_ATTR_AUTO_ACK | ViBoolean | VI_TRUE VI_FALSE | VI_FALSE |
| VI_ATTR_EVENT_TYPE | ViEventType | | |

The VI_ATTR_AUTO_ACK field is used by the resource generating the event to specify whether it requires acknowledgment of this event. Applications can indicate that they will not acknowledge an event type when they enable a session for the event type. The value specified by an application overwrites normal behavior of the event acknowledgment for the session. Refer to the section titled "Event Acknowledgment" for further discussion.

As discussed above, the viEvent field defines the type of event.

Template Events

Template events include information about the operational state of VISA resources, availability of their services, or other information that may affect the normal execution sequence of applications. In general, any information that affects normal execution of applications is carried from VISA resources to the applications through template events. As described in the section titled "Event Handling," recipients of these events get event-specific information either as a part of an input parameter, if the callback mechanism is used, or as part of the output parameter in the viWaitOnEvent( ) operation. The following section defines template events in VISA. Each event description includes a corresponding event-specific context.

VI_EVENT_ALERT

This event notifies the receiver about an alert condition. The announced occurrence is further distinguished in the VI_ATTR_DEGREE attribute. Applications receiving this event should implement follow-up actions based on the description of the occurrence type. The queuing of this event type may result in unpredictable behavior.

Event Fields

| Attribute | Type | Range | Default |
|---|---|---|---|
| VI_ATTR_DEGREE | ViUInt16 | VI_ABORTED VI_RESET VI_FAILED VI_KILLED | N/A |
| VI_ATTR_TARGET | ViBoolean | VI_SESSION VI_RSRC | VI_SESSION |
| VI_ATTR_JOB_ID | ViJobId | VI_ASYNC VI_SYNC VI_ALL Any valid job identifier. | VI_ALL |

Event Fields Description

The VI_ATTR_DEGREE attribute notifies a receiver about the degree of alert using one of the following degrees:

The VI_ABORTED degree notifies a receiver that all the pending operations of the type indicated in viOperType are aborted.

The VI_RESET degree notifies a receiver that all the pending operations of a target are aborted and that it has also relinquished all the associated system resources. After aborting the operations, the target is reinitialized to its default state.

The VI_FAILED degree notifies a receiver that a resource has ceased functioning, but the data (kept by the failed resource in response to service requests by applications) may be recoverable. Associated system resources used by the resource are not relinquished.

The VI_KILLED degree notifies a receiver that a resource has ceased functioning and has relinquished all the associated system resources. All the system resources should be freed up, when the notification of the event at this degree is received.

The VI_KILLED and the VI_FAILED degrees can be generated by a resource itself or any other resource managing or monitoring the resource.

The VI_ATTR_TARGET attribute specifies whether the specified occurrence indicates an action on a session (VI_SESSION) or on a resource (VI_RSRC).

The VI_ATTR_JOB_ID attribute indicates the types of the aborted operations or the operation referred by job identifier. The types of operations supported by VISA resources are the synchronous (VI_SYNC), the asynchronous (VI_ASYNC), or both (VI_BOTH).

A resource relinquishes all the system resources used by the operations that are aborted after notifying applications and all the system resources used by the sessions or resources that are being reset after notifying applications.

A resource also relinquishes all the system resources used by the sessions or resources that are killed after notifying applications.

VI_EVENT_RSRC_ACTIVE

This event notifies applications using VISA resource that the source of the event is operational. Applications can invoke operations on the resource after it becomes active.

Event Fields

This event does not define any event-specific field.

VI_EVENT_RSRC_INACTIVE

This event notifies applications using VISA resource that the source of the event will not be operational after the time specified in the viTimeBeforeInactive field. After the resource becomes inactive, applications cannot invoke operations on the resource. All of the operations invoked on the resource are terminated or returned with an error before the resource becomes inactive. When the resource becomes active, it sends the VI_EVENT_RSRC_ACTIVE event.

Event Fields

| Field Name | Type | Range | Default |
|---|---|---|---|
| VI_ATTR_INACTIVE_TIMEOUT | ViUInt32 | 0-FFFFFFFFh | VI_IMMEDIATE |

Event Fields Description

The VI_ATTR_INACTIVE_TIMEOUT attribute specifies the time, in milliseconds, after which the resource will become inactive.

VI_EVENT_RSRC_LOCK_CHANGED

When a session has locked a VISA resource, no other session can invoke operations on that resource successfully. Applications, which do not have the access to the resource when it is locked, may want to receive notification when the lock mode transitions from one mode to another. The valid modes of lock are VI_EXCLUSIVE_LOCK and VI_NON_EXCLUSIVE_LOCK. The unlocked state of the resource is specified by VI_NOLOCK. Other embodiments include other lock modes, such as VI_SHARED_EXCLUSIVE. This event can be handled using both event handling mechanisms. Operations to enable or disable this event type succeed regardless of the lock state of a VISA resource. Applications can also install and uninstall handlers for the event when a resource is locked.

Event Fields

| Field Name | Type | Range | Default |
|---|---|---|---|
| VI_ATTR_NEW_LOCK_TYPE | ViUInt16 | VI_EXCLUSIVE_LOCK VI_NON_EXCLUSIVE_LOCK VI_NOLOCK | N/A |
| VI_ATTR_PREV_LOCK_TYPE | ViUInt16 | VI_EXCLUSIVE_LOCK VI_NON_EXCLUSIVE_LOCK VI_NOLOCK | N/A |

Field Description

VI_ATTR_NEW_LOCK_TYPE is an attribute for the mode of the lock that a resource has transitioned into.

VI_ATTR_PREV_LOCK_TYPE is an attribute for the mode of the lock that a resource has transitioned from.

Operations to enable or disable this event type succeed regardless of the lock state of a VISA resource.

Applications can also install and uninstall handlers for the event when a resource is locked.

Applications can start listening to VI_EVENT_RSRC_LOCK_CHANGED in any locking mode. This allows an application to get notification when the resource gets unlocked. If the application requires service of the resource that is unlocked, then the application can wait for resource to get unlocked or continue normal execution and poll whether handlers installed to listen to this event have executed. Whenever the resource changes the mode of the lock, the application can decide whether the required service is available after the mode change.

In an alternate embodiment, the event fields include exclusive, non-exclusive, and shared lock types.

VI_EVENT_QUEUE_FULL

In VISA resources, the size of the queue for the queuing mechanism and number of pending occurrences for the callback mechanism in a session are limited. Applications can specify the number of maximum occurrences that are not handled in VI_ATTR_MAX_QUEUE_LENGTH, after which session starts discarding events. Whenever the maximum limit is reached for either mechanism, applications using the session are notified using this event.

Event Fields

| Field Name | Type | Range | Default |
|---|---|---|---|
| VI_ATTR_MECHANISM | ViUInt16 | VI_QUEUE VI_SUSPEND_HNDLR | N/A |
| VI_ATTR_FULL_EVENT_TYPE | ViEventType | | |

Event Fields Description

VI_ATTR_MECHANISM is an event handling mechanism attribute specified by either the VI_QUEUE or the VI_SUSPEND_HNDLR, for which the maximum limit of occurrences that are not handled has reached.

VI_ATTR_FULL_EVENT_TYPE denotes the event type (ViEventType) of the event for which the queue full condition occurred. This field is necessary since there is one queue per event type.

VI_EVENT_QUEUE_TRIP

In VISA resources, the size of the queue for the queuing mechanism and number of pending occurrences for the callback mechanism in a session are limited. Applications can specify the trip point number for occurrences that are not handled in VI_ATTR_QUEUE_TRIP, after which the session notifies the application. Whenever the trip point is reached for either mechanism, applications using the session are notified using this event.

Event Fields

| Attribute Name | Type | Range | Default |
| --- | --- | --- | --- |
| VI_ATTR_MECHANISM | ViUInt16 | VI_QUEUE VI_SUSPEND_HNDLR | N/A |
| VI_ATTR_FULL_EVENT_TYPE | ViEventType | | |

Event Fields Description

VI_ATTR_MECHANISM is an event handling attribute specified by either the VI_QUEUE or the VI_SUSPEND_HNDLR, for which the trip limit of occurrences that are not handled has reached.

VI_ATTR_FULL_EVENT_TYPE is an attribute denoting the event type (ViEventType) of the event for which the queue full condition occurred. This field is necessary since there is one queue per event type.

Exceptions

In VISA, when an error occurs while executing an operation, the normal execution of a VISA resource halts. The resource notifies the error condition m the application, invoking the operation, through the exception event. The notification includes sufficient information for the application to know the cause of the error. If the application can programmatically correct the error condition, the operation can resume normal execution. Otherwise, the application specifies to terminate further execution of the operation. VISA provides this functionality through the exception event, or exceptions. The facility to handle exceptions is referred to as the exception handling mechanism in this document. In VISA, each error condition defined by operations of resources can cause exception events. With the exception handling mechanism, an application can try to correct the error condition. If unable to do so, the application can instruct the VISA resource to terminate the executing operation, kill the session, reset the session, or fail the session. If the error is corrected, the application can instruct to continue the execution of the operation.

In VISA, exceptions are defined as events. Exceptions are handled as events; however, the operating environment poses some restrictions. Therefore, exception handling model is restricted compared to the event handling model. The restrictions on the event handling model are described in the following section titled "Exception Handling Model," which includes an application showing how to use the exception handling mechanism. The section titled "Generating an Error Condition" defines a method for programmatic generation of errors on resources. Exceptions are defined as events and therefore, they are represented with an event context. The description of the exception context can be found in the section titled "Exception-specific Context."

Exception Handling Model

This section describes the exception handling model in a VISA system. In the VISA system, exceptions follow the event model presented in the section titled "Event Handling" though certain restrictions apply. As described in the event handling model, it is possible to install a callback handler which is invoked on an error. This installation can be done using the viInstallHandler( ) operation on a session. Whenever an error occurs, the handler is invoked in the context of the calling thread, the thread which called the operation that generated the error. Also, the handler has access to the state of the resource at the time of the exception occurrence.

As described in the callback mechanism discussion, the exception handler is executed synchronously; the operation that caused the exception will block until the exception handler has completed its execution. This block allows the operation to continue from the point of exception, if the problem is corrected. If the error condition cannot be corrected, the handler may instruct the exception operation to terminate execution. Depending on the severity of the error, it may also instruct it to terminate or kill the session. An exception handler can specify its intention of continuing or terminating the execution through the return codes of the handler. Refer to the definitions of the prototype of the handler and the viEventHandler( ), for more information.

As stated above, an exception operation will block until the exception handler execution is completed. The exception operation waits for the completion of a handler execution. The thread on which the handler executes may be different than the thread of the exception operation. In such cases, the handler terminates prematurely without completion. Then it becomes necessary to acknowledge the exception operation to ensure dean termination. The handler can terminate prematurely to exit the thread or to use an exception handling scheme native to the operating environment (for example, the C++ language exception handling scheme). In multitasking (multiple processes) and distributed systems the operation causing the exception, and the exception handler, execute on two different threads. Therefore, in all such cases, an exception handler should acknowledge the blocking operation in order to guarantee data consistency. If the blocking operation is not acknowledged, the application may hang or the resource may be placed into an inconsistent state. The results are not predictable in this scenario.

If the thread executing an exception handler prematurely terminates the handler, it does so only after acknowledging the exception.

An exception handler can acknowledge the blocking thread using the viAcknowledgeEvent( ) operation. Refer to the section titled "Event Operations" for more information.

VISA allows the operating system and language-specific exception handling facility to work coherently with the VISA-defined exception handling mechanism. In such a case, all restrictions of the specific environment apply. For example, the C++ try/catch mechanism allows an exception to be thrown from an operation. Once an exception is thrown in C++, the context of the operation causing the exception is lost and execution cannot continue. Therefore, before throwing an exception in C++, the exception handler must acknowledge the VISA resource in order to ensure dam consistency. This acknowledgment ensures resource state and data (stack time) consistency in VISA.

Comparison of Exception Handling and Event Handling Models

The exception handling model closely follows the event handling model, and it uses the same operations used for event handling. viInstallHandler( ), viUninstallHandler( ), AcknowledgeEvent( ), viQueryEventHandlers( ), and viRaiseEvent( ) can be used for exception events with the same behavior. The following list describes the restrictions on the exception handling model over the general event model:

Contrary to event handling, where multiple handlers can be set for an event type on a session, only one handler can be set for exception handling on a session. The exception handling model does allow multiple sessions to a single resource. The same handler or different handlers can be installed on these sessions.

The exception handling model does not allow queuing or waiting on an exception event. Thus, VISA does not allow an application to call either the viWaitForEvent( ) or the viWaitForMultipleEvents( ) operations for the exception event.

The pending handler mode for the callback mechanism is not supported. Because exception handling supports only direct callbacks, it is not necessary to enable the exception handling mechanism using the viEnableEvent( ) operation. Installing a callback handler automatically enables the exception handling mechanism.

The following example illustrates how to use the VISA exception handling mechanism in an application.

An Example of Exception Handling

An application installs an exception handler to be invoked after successfully opening a session to a GPIB resource. If an error occurs during the subsequent operations, the handler is invoked in the context of the exception operation, which in this example is viWrite( ). The exception handler can check for the error code, and depending on the code, it can take corrective action and continue or terminate the operation.

```
int main(void) //UserApplication
{
ViStatus status;
ViUInt32 retcount;
ViVisor *visorId = 0;
ViSession *vi;

status = viOpen(visorId, "VISN{GPIB1::5}", "", &vi)
    status  =  viInstallHandler(vi,   VI_EXCEPTION,
exceptionHandler,        NULL);

// Do processing.
    status = viWrite(vi, "IDN?", 5, &retcount);
    // The above operation causes an error and the handler
installed by the.
    // application is invoked. The handler code is shown
below.

status = viRead(vi, rdResponse, RESPONSE_LENGTH,
&retcount);
    status = viClose(vi);
    return 0;
}
```

Sample VISA, C Language-type Application
(Normal Execution Thread)

As shown in the following handler code, the handler first determines the type of error. The error is VI_ERROR_IN_PROGRESS, which indicates that another operation is currently executed by the resource and therefore, it cannot execute the requested operation. In this case, the handler may decide to wait for the operation to complete and then request the resource to continue. If so, it delays for a fixed time and then returns from the handler with the VI_SUCCESS return value. However, if the handler cannot correct the error condition, it may choose to terminate the operation generating the exception. In this case, it returns the VI_ABORT. The handler may choose to return any other code to take corresponding action depending on the application requirement. The return values can abort all operations of the session, fail the session, or kill the session. Refer to the description of the viEventHandler( ) for a description of the return values and the corresponding behavior defined by VISA.

```
ViHndlr ExceptionHandler( vi, eventType, context, usrContext)
ViSession *vi;
ViUInt16 eventType;
ViEvent context;
ViAddr usrContext;
{
    switch(context.errorCode) // determine the error type
    {
        case VI_ERROR_IN_PROGRESS:
        // Check for completion of the operation currently
executed by the resource.
        // If the operation is completed, return
VI_SUCCESS. Otherwise, return
        an error condition.

if (ERROR_CORRECTED)
            return SUCCESS;
        else
            return ABORT;
        case VI_ERROR_RSRC_LOCKED:
        // wait for rsrc to get unlocked;

//other error processing
    }
}
```

Sample VISA, C Language-type Application
(Handler)

Generating an Error Condition

It may be necessary for an application to generate an error condition on a resource. Applications can simulate an error occurrence on a resource. VISA resource may propagate an error condition to another VISA system resource after partially handling an exception, and allow the other resource to complete the exception handling. The viRaiseEvent( ) operation can be used to propagate exceptions to resources in VISA. This operation can be called from the exception handler to regenerate the exception with specified context on any other resource. If a callback routine was specified, it is invoked when the exception is generated. Otherwise, the error context for the last error is set to the one specified in the viRaiseEvent( ) operation.

Exception-Specific Context

This section defines the exception context that must be passed to its handler along with the exception. The description of the fields is given in the following table titled Exception-Specific Context. The genetic event context is also passed with the exception specific context. The genetic context will always precede the exception specific context. Refer to the section titled "Event Information and Context Structure" on event context for more information about the genetic part of the exception context.

TABLE

Exception-Specific Context

| Field Name | Type | Range | Default |
|---|---|---|---|
| VI_ATTR_ERROR_CODE | ViUInt32 | N/A | N/A |
| VI_ATTR_HANDLED | ViBoolean | VI_TRUE VI_FALSE | VI_FALSE |
| VI_ATTR_CONTINUABLE | ViBoolean | VI_TRUE VI_FALSE | VI_FALSE |
| VI_ATTR_ACK_ACTION | ViUInt16 | VI_ABORT VI_RESET VI_KILL VI_FAIL | VI_ABORT |

Description

VI_ATTR_ERROR_CODE: VI_ATTR_ERROR_CODE is the error code returned from the operation. The error codes are defined for individual operations. Each error in VISA may cause an exception, if an exception handler is installed.

VI_ATTR_HANDLED_VI_ATTR_HANDLED should be set to VI_TRUE when an exception is rethrown to another resource for handling. If a resource has handled the exception partially and wants another resource to continue with the error correction, it can set this field in the context before generating the exception.

VI_ATTR_CONTINUABLE Depending on the severity of errors, it may be possible to continue with execution after handling the exception. If VI_ATTR_CONTINUABLE is set to VI_FALSE, the operation cannot continue, even after corrective actions. In this case, the exception handler can clean up data structures allocated by the application.

VI_ATTR_ACK_ACTION If a handler needs to acknowledge the exception operation so that the handler thread can terminate (see "Exception Handling Model"), the acknowledgment should also specify the action to be taken by the blocking operation. This field is filled by the exception handler routine before acknowledging the exception operation. The following table lists the actions that can be specified. It is preferably not to specify the VI_RESET or VI_KILL action values, because they also affect the execution of other sessions.

TABLE

Acknowledgment Action Description

| viAckAction value | Description |
| --- | --- |
| VI_ABORT | Request to abort a pending operation that generated the exception. |
| VI_RESET | Request termination of all the pending operations of the target resource. The target resource will be initialized and any system resources used by the target will be relinquished. |
| VI_KILL | Request a resource associated with a specified session to cease functioning. All the system resources associated with the target should be freed up on the request. |

Event Functions

As mentioned above, events are objects which have attributes and can be acted upon. The functions viEventNew( ) and viEventFilterNew( ) are included to create event objects and filter event objects. These functions take the string name of the class as an argument. It is noted that, unlike operations, functions are not associated with any resource.

Event Handling Operations and Handler Prototype
Operations
    viEnableEvent(vi, eventType, mechanism, context)
    viDisableEvent(vi, eventType, mechanism)
    viQueryEventMech(vi, eventType, mechanism, filtercontext))
    viInstallHandler(vi, eventType, handler, userHandle)
    viUninstallHandler(vi, eventType, handler, userHandle)
    viQueryHandlers(vi, eventType, handlerlist, count, handler, userHandle)
    viAcknowledgeEvent(vi, eventType, context)
    viWaitOnEvent(vi, eventType, timeout, outEventType, outContext)
    viWaitOnMultipleEvents(vi, eventTypeList, timeout, outEventType, outContext)
    viDiscardEvents(vi, eventType, mechanism)
    viRaiseEvent(vi, eventType, context)
    viNextHandler(handlerlist, handler, userhandle)
Handler Prototype
    viEventHandler(vi, eventType, context, usrContext)
viEnableEvent(vi, eventType, mechanism, viEventFilter)

viEnableEvent enables notification of an event identified by the eventType parameter for mechanisms specified in the mechanism parameter. The specified session can be enabled to queue events by specifying VI_QUEUE. Applications can enable the session to invoke a callback function to execute the handler by specifying VI_HNDLR. The applications are required to install at least one handler to be enabled for this mode. Specifying VI_SUSPEND_HNDLR enables the session, but the invocation of the handler is deferred to a later time. Successive calls to this operation replace the old mode with the callback mechanism. Specifying the "bit-wise OR" value of VI_QUEUE and one of the mode values for the callback mechanism enables both the queuing and callback mechanisms simultaneously.

Parameters

| Name | Direction | Type | Description |
| --- | --- | --- | --- |
| vi | IN | ViSession | Unique logical identifier to a session. |
| eventType | IN | ViEventType | Logical event identifier. |
| mechanism | IN | ViUInt16 | Specifies event handling mechanisms to be enabled. The queuing mechanism can be enabled by specifying VI_QUEUE, and the callback mechanism can be enabled by specifying VI_HNDLR or VI_SUSPEND_HNDLR. It is possible to enable both mechanisms simultaneously by specifying "bit-wise OR" of VI_QUEUE and one of the two mode values for the callback mechanism. |
| viEventFilter | IN | ViEventFilter | Information specified by applications while enabling an event given in the eventType parameter. Each event type in VISA defines its context structure. |

Return Values

Return values have the type ViStatus and are used to return the operational return status. The return value returns either a completion code or an error code as follows.

| | Description |
| --- | --- |
| Completion Codes | |
| VI_SUCCESS | Event enabled successfully. |
| VI_SUCCESS_EVENT_EN | Specified event is already enabled for at least one of the specified mechanisms. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. |
| VI_ERROR_INV_MECH | Invalid context information specified for the event. |

| Description | |
|---|---|
| VI_ERROR_HNDLR_NINSTALLED | A handler is not currently installed for the specified event. The session cannot be enabled for the VI_HNDLR mode of the callback mechanism. |

If the event handling mode is switched from VI_SUSPEND_HNDLR to VI_HNDLR for an event type, then handlers that are installed for the event are called for every occurrence of that event pending in the session before switching the modes.

A session enabled to receive events can start receiving them before the viEnableEvent( ) operation returns. In this case the handlers set for an event type are executed before the completion of the enable operation.

If the event handling mode is switched from VI_HNDLR to VI_SUSPEND_HNDLR for an event type, handler invocation for occurrences of the event type is deferred to a later time.

If no handler is installed for an event type then request to enable the callback mechanism for the event type returns VI_ERROR_HNDLR_UNINSTALLED.

The viEventFilter parameter is used only for the events that define a filtering context such as VI_EVENT_SIGNAL in the VXI-specific Signal Resource. This object supports operations like viSetAttribute, viGetAttribute and viClose. This object has a generic field VI_ATTR_AUTO_ACK which was defined above. For more information regarding event filtering, please see the discussion associated with FIGS. 30 and 31.

viDisableEvent(vi, eventType, mechanism)

viDisableEvent ( ) disables notification of an event type by the specified mechanisms. This operation disables servicing of an event type by the mechanisms specified in the mechanism parameter. The session can be disabled to queue events by specifying VI_QUEUE Applications can disable the session for the callback mechanism by specifying either VI_HNDLR or VI_SUSPEND_HNDLR. Specifying the "bit-wise OR" value of the VI_QUEUE value and one of the mode values for the callback mechanism disables both the queuing and callback mechanisms.

Parameters

| Name | Direction | Type | Description |
|---|---|---|---|
| vi | IN | ViSession | Unique logical identifier to a session. |
| eventType | IN | ViEventType | Logical event identifier. |
| mechanism | IN | ViUInt16 | Specifies event handling mechanisms to be disabled. The queuing mechanism can be disabled by specifying VI_QUEUE, the callback mechanism can be disabled by specifying VI_HNDLR or VI_SUSPEND_HNDLR. It is possible to disable both mechanisms simultaneously by specifying VI_DISABLE_ALL_MECH. |

Return Values

Return values have the type ViStatus and are used to return the operational return status. The return value returns either a completion code or an error code as follows.

| Description | |
|---|---|
| Completion Codes | |
| VI_SUCCESS | Event disabled successfully. |
| VI_SUCCESS_EVENT_DIS | Specified event is already disabled for at least one of the specified mechanisms. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. |
| VI_ERROR_INV_MECH | Specified event handling mechanism is not supported for the specified event type. |

If a request to disable an event handling mechanism is made for a session, then the events pending or queued in the session remain pending or queued, respectively, in the session.

viQueryEventMech(vi, eventType, mechanism, filterContext)

Queries the event handling mechanisms for an event type. This operation returns currently enabled handling mechanisms for an event type. If a session is disabled to handle an event type, VI_NENABLED is returned. Otherwise, all the mechanisms enabled for handling the specified event type are returned as a "bit-wise OR" value of the values denoting individual mechanisms.

Parameters

| Name | Direction | Type | Description |
|---|---|---|---|
| vi | IN | ViSession | Unique logical identifier to a session. |
| eventType | IN | ViEventType | Logical event identifier. |
| mechanism | OUT | ViUInt16 | Returns currently enabled mechanisms for the specified event. If a session does not handle an event type, no mechanism is enabled for the session. Therefore, VI_NENABLED is returned. If only the queuing mechanism is enabled, VI_QUEUE is returned. If the callback mechanism is enabled; then VI_HNDLR or VI_SUSPEND_HNDLR, denoting the mode of the callback mechanism, is returned. This operation returns two enabled mechanisms by supplying "bit-wise OR" of VI_QUEUE and one of the two modes values for the callback mechanism. |
| filterContext | OUT | ViEventFilter | Information specified by applications while enabling an event given in the eventType parameter. Each event type in VISA defines its context structure. |

Return Values

Return values have the type ViStatus and are used to return the operational return status. The return value returns either a completion code or an error code as follows.

| Description | |
|---|---|
| Completion Codes | |
| VI_SUCCESS | Event queried successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event does not exist or is not supported. | viInstallHandler(vi, eventType, handler, userHandle)

Installs handlers for event callbacks. This operation allows applications to install handlers on sessions. The handler specified in the handler parameter is installed along with previously installed handlers for the specified event. Applications can specify a value in the userHandle parameter that is passed to the handler on its invocation. VISA identifies handlers uniquely using the handler reference and this value. If VI_RSRC_EVENT or VI_EXCEPTION is specified in the eventType parameter, a specified handler is set for the corresponding class of event types.

Parameters

| Name | Direction | Type | Description |
|---|---|---|---|
| vi | IN | ViSession | Unique logical identifier to a session. |
| eventType | IN | ViEventType | Logical event identifier. |
| handler | IN | ViHndlr | Interpreted as a valid reference to a handler to be installed by a client application. |
| userHandle | IN | ViAddr | A value specified by an application that can be used for identifying handlers uniquely for an event type. |

Return Values

Return values have the type ViStatus and are used to return the operational return status. The return value returns either a completion code or an error code as follows.

| Description | |
|---|---|
| Completion Codes | |
| VI_SUCCESS | Event handler installed successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event is not defined by the resource. | viUninstallHandler(vi, eventType, handler, userHandle)

The viUninstallHandler( ) operation allows client applications to uninstall handlers for events on sessions. Applications should also specify the value in the handle parameter that was passed while installing the handler. VISA identifies handlers uniquely using the handler reference and this value. All the handlers, for which the handler reference and the value matches, are uninstalled. The following tables list all the VISA-defined values and corresponding actions of uninstalling handlers.

Parameters

| Name | Direction | Type | Description |
|---|---|---|---|
| vi | IN | ViSession | Unique logical identifier to a session. |
| eventType | IN | ViEventType | Logical event identifier. |
| handler | IN | ViHndlr | Interpreted as a valid reference to a handler to be installed by a client application. |
| userHandle | IN | ViAddr | A value specified by an application that can be used for identifying handlers uniquely in a session for an event. |

Return Values

Return values have the type ViStatus and are used to return the operational return status. The return value returns either a completion code or an error code as follows.

| Description | |
|---|---|
| Completion Codes | |
| SUCCESS | Event handler successfully uninstalled. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType did not occur or does not exist. |
| VI_ERROR_INV_HNDLR_REF | Either the specified handler reference or the user context value (or both) does not match any installed handler. |

TABLE

| VISA-Defined Special Values for eventType Parameter of the Operation | |
|---|---|
| VISA-Defined Value | Action Description |
| VI_RSRC_EVENT | Uninstall all the handlers for the resource specific class of event types. |

TABLE

| VISA-Defined Special Values for handler Parameter of the Operation | |
|---|---|
| VISA-Defined Value | Action Description |
| VI_ANY_HNDLR | Uninstall all the handlers with the matching value in the userHandle parameter. |

TABLE

VISA-Defined Special Values for userHandle Parameter of the Operation

| VISA-Defined Value | Action Description |
|---|---|
| VI_ANY_HANDLE | Unistall all the handlers with the matching handler reference. |

It is noted that any combination of VISA-defined values for different parameters of the operation is also supported.

If no handler is installed for an event type as a result of this operation, and a session is enabled for the callback mechanism in the VI_HNDLR mode, then the callback mechanism for the event type is disabled for the session before this operation completes.

The userHandle value is used by the resource to uniquely identify the handlers along with the handler reference. Applications can use this value to process an event differently based on the value returned as a parameter of handler. This allows applications to install the same handler multiple times and distinguish events from multiple resources in the same handler.

viQueryHandlers(vi, eventType, handlers, userHandle)

The viQueryHandlers( ) operation returns the first handler in the list of installed for an event type on the specified session. The handlers are invoked in the reverse order of installation, therefore the first handler returned will be the last one installed for the eventType. This operation also returns a reference to the handlerList object, which an application use to query about the rest of the handlers in the list. The viNextHandler( ) operation can be used to query information about subsequent handlers. This operation returns a list of installed handlers for all resource events, if VI_RSRC_EVENTS is specified as the event type.

Parameters

| Name | Direction | Type | Description |
|---|---|---|---|
| vi | IN | ViSession | Unique logical identifier to a session. |
| eventType | IN | ViEventType | Logical event identifier. |
| handlerList | OUT | ViHandlerList | Returns a handle identifying this handler list. This handle should be used as input to viNextHandler(). |
| numOfHandlers | OUT | ViUInt32 | number of handlers installed for the eventType. |
| handler | OUT | ViPHndlr | Returns the first handler from the list of currently installed handlers for the specified event. The first handler will be the last one installed. |
| userHandle | OUT | ViPAddr | The userHandle value passed in while installing the first handler. |

Return Values

Return values have the type ViStatus and are used to return the operational return status. The return value returns either a completion code or an error code as follows.

| | Description |
|---|---|
| Completion Codes | |
| VI_SUCCESS | Query completed successfully. |
| Error Codes | |
| VI_ERROR_INV_SESSION | The given vi does not identify a valid session. |
| VI_ERROR_INV_EVENT | Specified event does not exist or is not supported. |

Querying handlers

As stated in previous section, VISA allows to install multiple handlers per event type per session. It is therefore difficult for an application which installed multiple handlers to keep track of them. VISA provides an iterator operation through which the task of querying handler information is simplified.

The ViSession operation viQueryHandlers( ) can be used to query the first handler and the associated userHandle, for a given event type. In VISA, handlers are invoked in LIFO order, so the handler returned by viQueryHandler( ) operation was the last one installed for the event type. The viQueryHandlers( ) operation also returns ViHandlerList class handle which can be used to query other handlers in the list.

The ViHandlerList class defines operation to iterate through the list of handlers installed for a given event type. In addition, it provides attributes to select the starting point for iteraction. Also, ViHandlerList class is derived from ViObject, so it inherits the ViObject operations viGetAttribute( ) and viSetAttribute( ), which can be used to manipulate the attributes. As soon as the application is done using the handlerList object, is should invoke viClose( ) operation on this object to remove it.

ViHandlerList Attributes

| Symbolic Name | Access Privilege | Data Type | Range |
|---|---|---|---|
| VI_ATTR_LIST_SIZE | RO | iUInt32 | N/A |
| VI_ATTR_LIST_INDEX | R/W | iUInt32 | 0 to VI_ATTR_LIST_SIZE-1 |

Attribute Description

VI_ATTR_LIST_SIZE

Number of handlers installed for the event type. This attribute reflect the size of the list at the time viQueryHandler( ) operation was invoked. It is not updated if new handlers are installed/uninstalled after the query was made.

VI_ATTR_LIST_INDEX

The index of the current handler. viNextHandler( ) operation will return information about current handler. The current handler is the handler whose index is reflected in this attribute. This attribute value can be modified to a value between 0 and the VI_ATTR_LIST_SIZE -1.

viHandlerList Operation viNextHandler(handlerList, handler, userHandle)
viAcknowledgeEvent(vi, eventType, context)

The viAcknowledgeEvent( ) operation allows applications to acknowledge a reported event occurrence. The occurrence is uniquely identified by the context structure. The resource acknowledges the source of the event after receiving acknowledgments from sessions to which the occurrence was reported.

Parameters

| Name | Direction | Type | Description |
|---|---|---|---|
| vi | IN | ViSession | Unique logical identifier to a session. |
| eventType | IN | ViEventType | Logical event identifier. |
| context | IN | ViEvent | The context specified here corresponds to an occurrence of an event. The context uniquely identifies event occurrence reported by the resource. Each event type in VISA defines its context structure along with resource definitions. |

Return Values

Return values have the type ViStatus and are used to return the operational return status. The return value returns either a completion code or an error code as follows.

| | Description |
|---|---|
| Completion Codes | |
| VI_SUCCESS | Event acknowledged successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType did not occur or does not exist. |
| VI_ERROR_INV_CONTEXT | Specified event context does not identify a valid occurrence of the event type. |

A resource acknowledges a notification of an event after receiving acknowledgments from all the recipients of the notification.

viWaitOnEvent(vi, eventType, timeout, outEventType, outContext)

viWaitOnMultipleEvents(vi, eventTypeList, timeout, outEventType, outContext)

The viWaitOnEvent( ) operation suspends execution of a thread of application and waits for an event eventType for a time period not to exceed that specified by timeout. Applications can specify more than one event in the viWaitOnMultipleEvents( ) operation. The operation suspends execution of a thread and waits for an occurrence of any one of the specified events in the eventTypeList parameter. It waits for a time period not to exceed the value specified in timeout parameter. If multiple events of the same or different type occur, only one of the event occurrences is returned, in the outContext parameter. The type of the event is returned in the outEventType parameter. Refer to individual event descriptions for context structure definitions. If the specified timeout value is VI_MAX_TIMEOUT, the operations are suspended indefinitely, and they wait for an occurrence of any one of the event types.

Parameters

| Name | Direction | Type | Description |
|---|---|---|---|
| vi | IN | ViSession | Unique logical identifier to a session. |
| eventType | IN | ViEventType | Logical event identifier. |
| eventTypeList | IN | ViPUInt16 | Logical event identifier list. |
| timeout | IN | ViUInt32 | Absolute time period in time units that the resource shall wait for a specified event to occur before returning the time elapsed error. The time unit is specified in the attributes of the resource. |
| outContext | OUT | ViPEvent | Event specific information returned in the notification of an event received during the wait. |
| outEventType | OUT | ViEventType | Logical event identifier returned in the notification of an event received during the wait. |

Return Values

Return values have the type ViStatus and are used to return the operational return status. The return value returns either a completion code or an error code as follows.

| | Description |
|---|---|
| Completion Code | |
| VI_SUCCESS | Wait terminated successfully on receipt of an event notification. There are multiple event occurrences available in the session. |
| VI_SUCCESS_QUEUE_EMPTY | Wait terminated successfully on receipt of an event occurrence. The queue is empty. |
| VI_WARN_QUEUE_TRIP | Wait terminated successfully on receipt of an event occurrence. The queue has more events than trip value. |
| VI_WARN_QUEUE_FULL | Wait terminated successfully on receipt of an event occurrence. The queue is full. |
| VI_WARN_QUEUE_OVERFLOW | Wait terminated successfully on receipt of an event occurrence. The queue has overflown and events have been lost. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType, or at least one of the events in the eventTypeList parameter, is not supported by the resource. |
| VI_ERROR_INV_CONTEXT | Specified event context, or at least one of the context of the event in the inContextList parameter, is invalid. |
| VI_ERROR_TMO | Specified event did not occur within the specified time period. |

If the VI_INFINITE value is specified in the timeout parameter of viWaitOnEvent( ) or viWaitOnMultipleEvents( ), then the execution thread is suspended indefinitely to wait for an occurrence of an event.

The viWaitOnEvent( ) operation on a resource succeeds for the VI_EVENT_RSRC_LOCK_CHANGED event, regardless of the lock state of the resource.

If value zero (0) is specified in the timeout parameter of viWaitOnEvent( ) or viWaitOnMultipleEvents( ), then application execution is not suspended.

It is noted that these operations can be used to dequeue events from an event queue by setting the timeout value to zero.

viDiscardEvents(vi, eventType, mechanism)

viDiscardEvents( ) flushes event occurrences for specified event type and mechanisms in a session. This operation discards an event queue or event occurrences pending, for the callback mechanism from the specified session. The information about all the occurrences of the event, that are not handled, is discarded. This operation is useful to remove event occurrences from the queue that do not have any useful information for applications. This operation allows applications to specify VI_SYS_EVENT and VI_RSRC_EVENT to specify resource event types.

Parmeters

| Name | Direction | Type | Description |
| --- | --- | --- | --- |
| vi | IN | ViSession | Unique logical identifier to a session. |
| eventType | IN | ViEventType | Logical event identifier. |
| mechanism | IN | ViUInt16 | Specifies the mechanisms for which the events are to be discarded. The VI_QUEUE value is specified for the queuing mechanism and the VI_SUSPEND_HNDLR value is specified for the pending events in the callback mechanism. It is possible to specify both mechanisms by specifying "bit-wise OR" of the VI_QUEUE and the VI_SUSPEND_HNDLR value. |

Return Values

Return values have the type ViStatus and are used to return the operational return status. The return value returns either a completion code or an error code as follows.

| | Description |
| --- | --- |
| Completion Code | |
| VI_SUCCESS | Event queue flushed successfully. |
| VI_SUCCESS_QUEUE_EMPTY | Operation completed successfully, but the queue was empty. |
| Error Code | |
| VI_ERROR_INV_SESSION | The given vi does not identify a valid session. |
| VI_ERROR_SESSION_LOCKED | Specified operation could not be performed because the session identified by the vi has been locked for this type of access. |
| VI_ERROR_INV_EVENT | Specified event eventType did not occur or does not exist. |
| VI_ERROR_INV_MECH | Invalid mechanism specified. |

The event occurrences discarded by applications are not available to a session at a later time. This operation causes loss of event occurrences.

viRaiseEvent(vi, eventType, context)

The purpose of this operation is to notify a resource or session of the occurrence of an event. This operation can be used for any type of event, including an exception. The resource must determine whether to add the event to a queue or pass it to a user's callback handler, based on how each session to the resource is enabled for sensing.

The eventType and context parameters together define the actual event. Both values are passed to the sessions which receive the event, either through the queue or callback mechanism.

If the event is to be queued, its priority is inherent from the eventType parameter. If the event is targeted at a specific session, and there is no room in the queue (its priority is lower than any event on the queue), this operation returns VI_ERROR_QUEUE_FULL. If the event is targeted at the resource, it is irrelevant whether a given session's queue is full (although the resource may take appropriate actions), so this operation returns VI_SUCCESS.

Parameters

| Name | Direction | Type | Description |
| --- | --- | --- | --- |
| vi | IN | ViSession | Unique logical identifier to a session. |
| eventType | IN | ViEventType | Logical event identifier. |
| context | IN | ViEvent | Event specific information. |

Return Values

Return values have the type ViStatus and are used to return the operational return status. The return value returns either a completion code or an error code as follows.

| | Description |
| --- | --- |
| Completion Code | |
| VI_SUCCESS | Event notification handled successfully. |
| Error Codes | |
| VI_ERROR_INV_SESSION | The given vi does not identify a valid session. |
| VI_ERROR_RSRC_LOCKED | Specified operation could not be performed because the resource identified by the vi has been locked for this type of access. |
| VI_ERROR_INV_EVENT | Specified event eventType does not exist or the resource does not support it. |
| VI_ERROR_INV_CONTEXT | Specified event context is invalid. |
| VI_ERROR_QUEUE_FULL | The session queue is full, and this event's priority was lower than any on the queue. Therefore, this event was not queued. This value can only be returned if the target parameter is VI_SESSION. |
| VI_ERROR_NENABLED | Specified session is not currently enabled for sensing of this type of event. This value can only be returned if the target parameter is VI_SESSION. | viRaiseEvent( ) can also be used to internally notify event occurrences. This operation can be used to simulate an event. If an event is targeted to all the sessions of a resource, it may cause unpredictable results for the applications receiving the event through other sessions.

ViNextHandler(handlerList, handler, userHandle)

viNextHandler( ) returns the next handler and its associated userHandle in the handlerList. The handlerList is returned from the viQueryHandler( ) operation. User applications should invoke the viClose( ) operation on handlerList object to clean up the handlerList object.

Parameters

| Name | Direction | Type | Description |
|---|---|---|---|
| handlerList | IN | ViHandlerList | Returns a handle identifying this handler list. This handle should be used as input to viNextHandler(). |
| handler | OUT | ViPHndlr | Returns the next handler in the handlerList |
| userHandle | OUT | ViPAddr | A value specified by an application that is used for identifying handler uniquely in a session for an event. |

Return Values

Return values have the type viStatus are are used to return the operational return status. The return value returns either a completion code or an error code as follows.

| | Description |
|---|---|
| Completion Codes | |
| VI_SUCCESS | Query completed successfully. |
| Error Codes | |
| VI_ERROR_INV_SESSION | The given vi does not identify a valid session. |
| VI_ERROR_INV_EVENT | Specified event does not exist or is not supported. | viEventHandler(vi, eventType, context, userHandle)

viEventHandler( ) is an event service handler procedure prototype. This operation is called whenever a session receives an event and is enabled for handling events in the VI_HNDLR mode. The handler services the event and returns VI_SUCCESS on completion. If the handler fails to service a particular event or services the event only partially, the handler returns different error codes to notify the resource to perform cleanup actions on the session. The error codes are currently only valid for the VI_EXCEPTION event.

Parameters

| Name | Direction | Type | Description |
|---|---|---|---|
| vi | IN | ViSession | Unique logical identifier to a session. |
| eventType | IN | ViEventType | Logical event identifier. |
| context | IN | ViEvent | A structure specifying context of an event. Each event type defines its context structure. |
| userHandle | IN | ViAddr | A value specified by an application that can be used for identifying handlers uniquely in a session for an event. |

Return Values

Return values have the type ViStatus and are used to return the operational return status. The return value returns either a completion code or an error code as follows.

| | Description |
|---|---|
| Completion Code | |
| VI_SUCCESS | Event handled successfully. |
| Error Code | |
| VI_ERROR_ABORT | Event is not handled successfully. Terminate the operation causing the exception. |
| VI_ERROR_RESET | Event is not handled successfully. Terminate all the operations of the session and reinitialize the session to the default state. |
| VI_ERROR_FAIL | Event is not handled successfully. Terminate all the operations of the session. No operation can be invoked on the session except the viClose() operation. |
| VI_ERROR_KILL | Event is not handled successfully. Terminate all the operations of the session and then terminate the session. |

If multiple handlers are installed on a session and one of the handlers specifies to terminate the normal execution sequence, then the normal execution is terminated after all the handlers of the session complete execution.

VISA Event Example

As discussed above, a VISA system includes a standard event handling mechanism. An event in a VISA system is any asynchronous occurrence that the VISA I/O control library can generate or process. Referring again to FIG. 24, there are two main modes of operation of this standard event mechanism called event queuing and event callbacks. As shown, a VISA system includes two ways for receiving events. An event in a VISA system is either placed on an Event Queue, also called a Wait Queue, or the event has an associated Callback handler that has been specified for the event. In the first case, when the event is placed or posted on the Event Queue, the event must be manually removed from the queue by an application. Thus the Event Queue is for those events which do not command a high priority. When the event has an associated Callback Handler, the event can either be temporarily placed on a Suspend Queue, also referred to as a Callback Queue, or the event directly invokes a Callback Handler, as shown.

The examples in FIGS. 25 and 26 contrast these different types of event handling methods. FIG. 25 illustrates a sample VISA, C language-type application which illustrates event queuing features of the present invention. FIG. 26 illustrates a sample VISA, C language-type application which illustrates event callback features of the present invention.

Referring now to FIG. 25, for event queuing, the emphasis is placed on the ability for the application to have the VISA system keep track of events as they occur and store this information on an internal VISA queue which the application can then access at a later time. As shown in the example, this process requires two basic steps after a session is opened to a device. This first step is to notify the VISA Resource Manager 140 to begin queuing up events of particular types. This is done with the viEnableEvent( ) operation specifying VI_QUEUE as a mode of operation. In this example, VI_EVENT_SERVICE_REQ specifies to listen to device level service request events (e.g. SRQ on the GPIB). The second step occurs at the point when the application wishes to query the VISA system about currently pending events. This querying may be done using the viWaitOnEvent( ) operation. viWaitOnEvent( ) allows the application to wait for a specified time for an event to enter the queue. A time of zero specifies to return immediately whether events exist on the queue or not.

Referring now to FIG. 26, for event callbacks the emphasis is placed on the ability for the application to have the VISA system invoke user supplied operations at the time that an event occurs. As shown in this example, this process requires three basic steps. The first step is to create a user-defined event handler that can handle the desired event (s) to be passed from the VISA system to the application. In the example, this is the function SRQHandlerFunc( ). This function is written just like any other application function. The second step is to notify the VISA system about the function created in the first step. This is done via a viSetAttribute( ) operation. This operation logs the address of the function to invoke when an event occurs. The final step is to notify the VISA system to begin invoking the callback whenever the desired event(s) occur. This is done with the viEnableEvent( ) operation specifying VI_HNDLR as a mode of operation. In this example, VI_EVENT_SERVICE_REQ specifies to listen to device-level service request events. At this point, whenever a request for service event occurs, the user-defined callback is invoked.

As a general tool for both the queuing and callback event handling mechanisms of a VISA system, the operation viDisableEvent( ) can be invoked at any time to suspend or terminate the reception of events altogether. In some situations, it may be desirable to suspend callbacks for a period of time without losing events. In this case, when the application has already been enabled for callbacks, the user can use the viEnableEvent( ) operation specifying VI_SUSPEND_HNDLR to temporarily suspend callbacks. This causes events to be queued on an internal event callback queue, which is not the same queue used for the queuing mechanism. When callbacks are re-enabled via viEnableEvent( ) specifying VI_HNDLR, the user-defined callback is invoked once for every pending event on the queue. Using this method guarantees that no events are lost by the application.

Flowchart Descriptions

Event Model-Queueing, Handling and Suspend Handling

Figure 27:
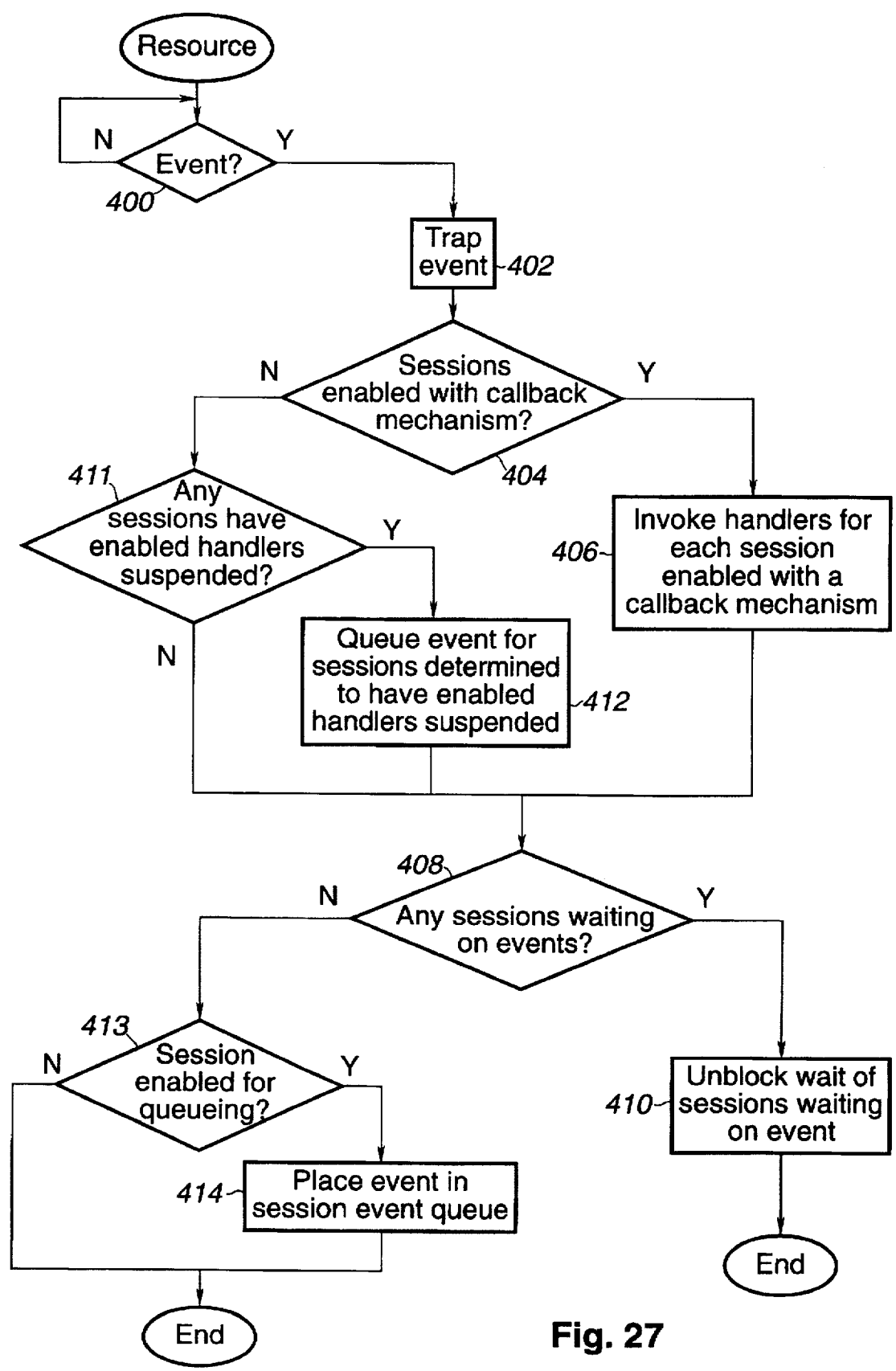
FIG. 27 is a flowchart diagram illustrating the event model of the present invention which includes event queueing, event handling or callbacks, and suspend handling.

Referring now to FIG. 27, a flowchart diagram of the event model of the present invention which provides event queueing, event handling or callbacks, and suspend handling is shown. In step 400 the resource determines if an event has been generated in the system. If an event has been generated, then in step 402 the resource traps the event. The resource then determines in step 404 if sessions were enabled with a callback mechanism for the event. If not, then in step 411 the resource determines if any sessions have enabled handlers suspended. If no sessions have enabled handlers suspended, operation advances to step 408. If one or more sessions have enabled handlers suspended, then in step 412 the resource queues the event occurrence for the sessions determined to have enabled handlers suspended and operation then advances to step 408.

If sessions were enabled with callback mechanisms in step 404, then in step 406 the resource invokes handlers in a handler list for each session. Operation then advances to step 408. If no sessions were enabled with a callback mechanism, operation proceeds directly to step 408. In step 408, the resource determines if any sessions are waiting on events. If no sessions are waiting on events, then in step 413 the resource determines if any sessions are enabled for queueing. If not, then operations completes. If so, then in step 414 the resource places events in the session event queue. If one or more sessions are waiting on events in step 408, then in step 410 the resource unblocks the wait of those sessions determined to be waiting on events and operation then completes. Therefore, the present invention includes event queueing, event handling and suspend handling all within the same model. This provides greater flexibility to the application designer in determining how to handle events.

Single viEnableEvent Operation for all Event Types

Figure 28A:
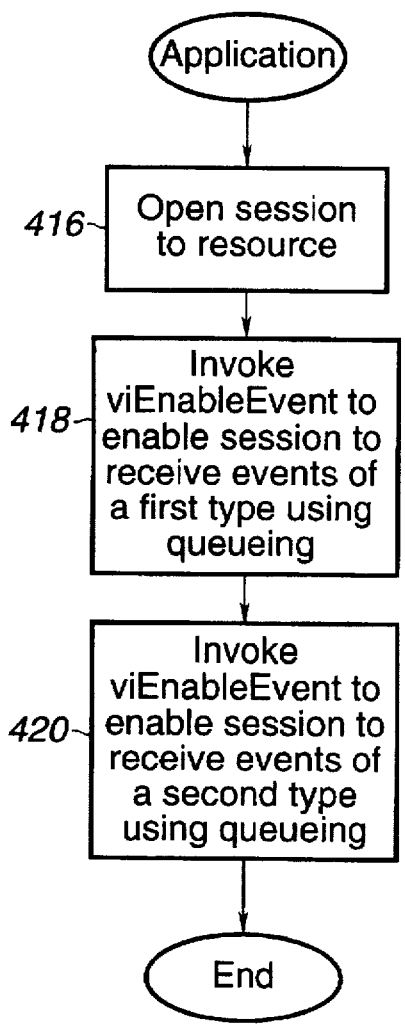
FIG. 28a and 28b illustrate flowchart diagrams of the event model of the present invention which includes a single viEnableEvent operation for all types of events.

Referring now to FIG. 28, flowchart diagrams are shown illustrating the viEnableEvent( ) operation enabling events of all event types using a queueing mechanism. The different event types include interrupts, exceptions, triggers, system requests, system events, and bus errors. The use of a single viEnableEvent operation for all event types greatly simplifies application development. As shown in FIG. 28A, in step 416 the application opens a session to a resource. In step 418 the application then invokes viEnableEvent to enable the session to receive events of a first type from the resource using a queueing mechanism. In step 420 the application then invokes viEnableEvent to enable the session to receive events of a second type from the resource using a queueing mechanism.

Figure 28B:
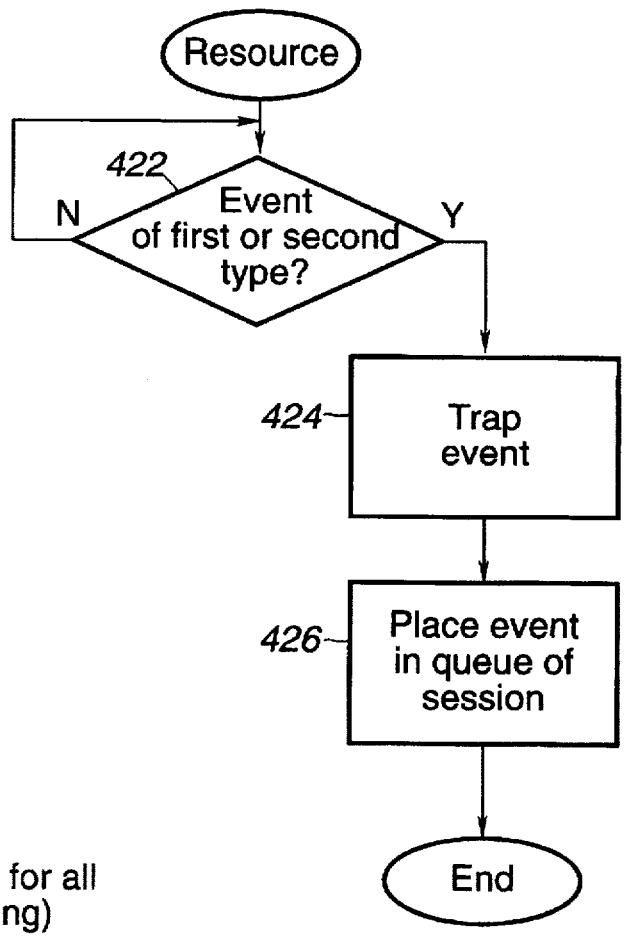

FIG. 28B illustrates the operation of a resource when an event of the first or second type occurs. In step 422 the resource determines if an event of either the first or second type has occurred. If an event of either type has occurred, the resource traps the event in step 424. In step 426 the resource then places the event in a queue of the session and operation completes.

Single viInstallHndlr Operation for all Event Types

Figure 29A:
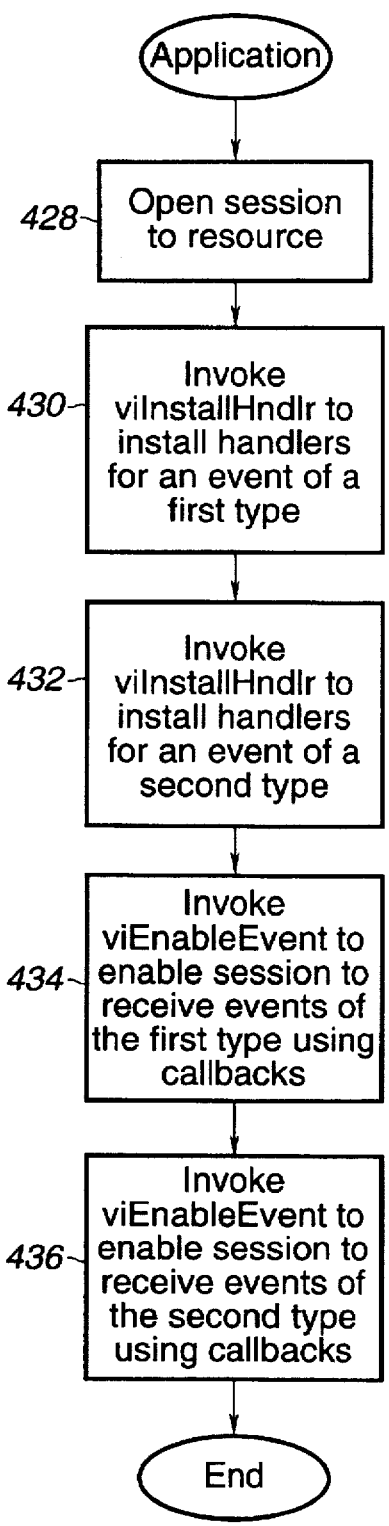
FIG. 29a and 29b illustrate flowchart diagrams of the event model of the present invention which includes a single viInstallHndlr operation for all types of events.

Referring now to FIG. 29, flowchart diagrams are shown illustrating the viInstallHndlr( ) operation used to install handlers for events of all event types. As mentioned above, these different event types include interrupts, exceptions, triggers, system requests, system events, and bus errors. The use of a single viInstallHndlr( ) operation for all event types greatly simplifies application development. As shown in FIG. 29A in step 428 the application opens a session to a resource. In step 430 the application invokes viInstallHndlr to install handlers for events of a first event type. In step 432 the application invokes viInstallHndlr to install handlers for events of a second type. The operation viEnableEvent is then invoked in step 434 to enable the session to receive events of the first type using a callback mechanism. In step 436 the operation viEnableEvent is invoked to enable the session to receive events of the second type using a callback mechanism. It is noted that steps 434 and 436 may occur directly after steps 430 and 432, respectively, as desired.

Figure 29B:
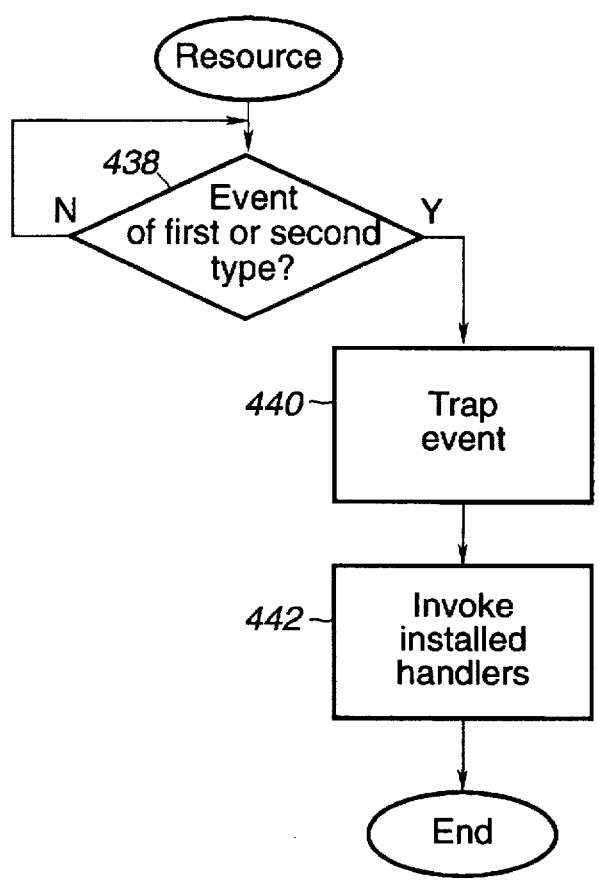

Referring now to FIG. 29B, when an event of either the first or second type occurs, the following steps are performed. In step 438 the resource determines if an event of either the first or second type has occurred. If an event of either type has occurred, the resource traps the event in step 440. In step 442 the resource invokes the installed handlers in response to the event occurrence, and operation completes.

Event Filtering

Referring now to FIG. 30, flowchart diagrams are shown illustrating event filtering using a queueing method according to the present invention. As discussed above, event filtering allows the application designer to qualify the types of events desired to be received at the time of the event occurrence. As shown in FIG. 30A, in step 444 the application opens a session to a resource. In step 446 the application invokes viEnableEvent to enable the session to receive events using a queueing mechanism. This step of enabling is qualified by one or more filter parameters, preferably including the parameter viEventFilter described above. When events are received a filter function is applied to events using one or more filter parameters. This filter only allows a subset of received events to be received by the session.

Referring now to FIG. 30B, in step 448 the resource determines if an event has occurred. If an event has occurred, the resource traps the event in step 450. In step 452 the resource invokes a filter function. In step 454 the filter function compares the event with the filter parameters. Based upon this step of comparing, the filter function determines in step 456 if the event should be received by the session. If the comparison indicates that the session should receive the event, in step 460 the resource places the event in the queue of the session, and operation completes. If the comparison indicates that the session should not receive the event, then in step 458 the event is discarded and operation completes.

Figure 31A:
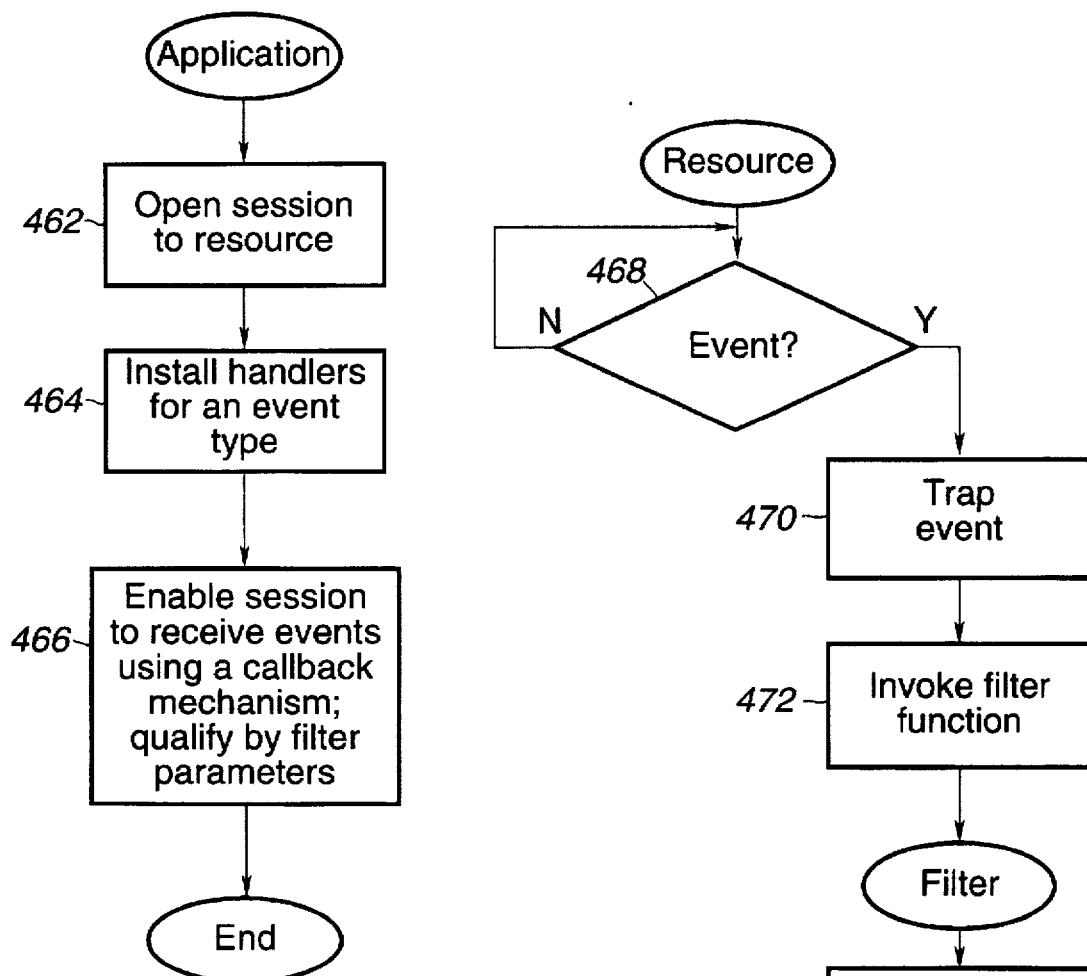
FIG. 31a and 31b illustrate flowchart diagrams of event filtering using a callback method according to the present invention.

Referring now to FIG. 31, flowchart diagrams are shown illustrating event filtering using a callback mechanism according to the present invention. In step 462 the application opens a session to a resource. In step 464 the application installs handlers for an event type, preferably using viInstallHndlr. In step 466 the application enables the session to receive events using a callback mechanism, preferably using viEnableEvent. This step of enabling is qualified by one or more filter parameters preferably including the parameter viEventFilter described above. When events are received a filter function is applied to events using one or more filter parameters. This filter only allows a subset of received events to be received by the session.

Figure 31B:
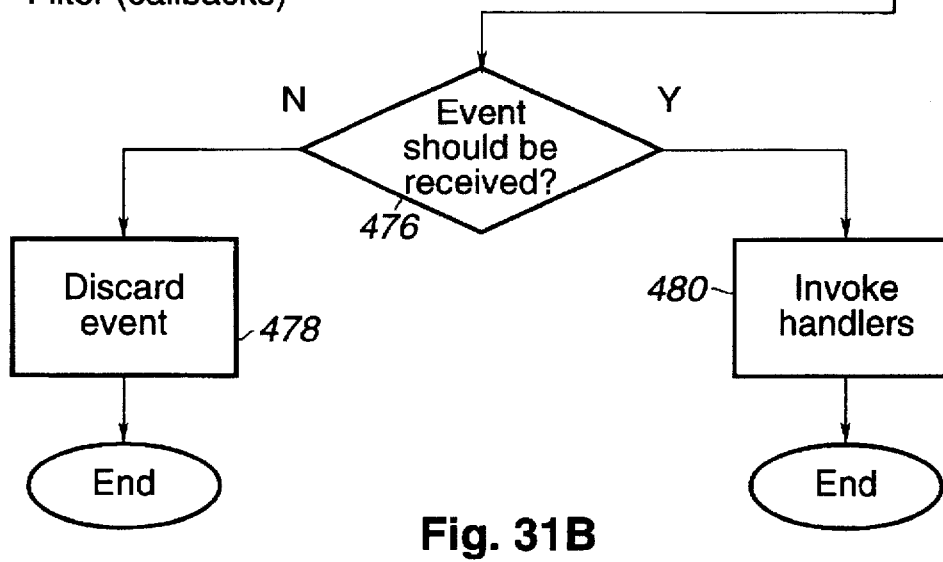

Referring now to FIG. 31B, in step 468 the resource determines if an event has occurred. If an event has occurred, the resource traps the event in step 470. In step 472 the resource invokes a filter function. In step 474 the filter function compares the event with the filter parameters. Based upon this step of comparing, the filter function determines in step 476 if the event should be received by the session. If the comparison indicates that the session should receive the event, in step 480 the resource invokes one or more handlers for the session, and operation completes. If the comparison indicates that the session should not receive the event, then in step 478 the event is discarded, and operation completes.

Event Auto-Acknowledge

Figure 32A:
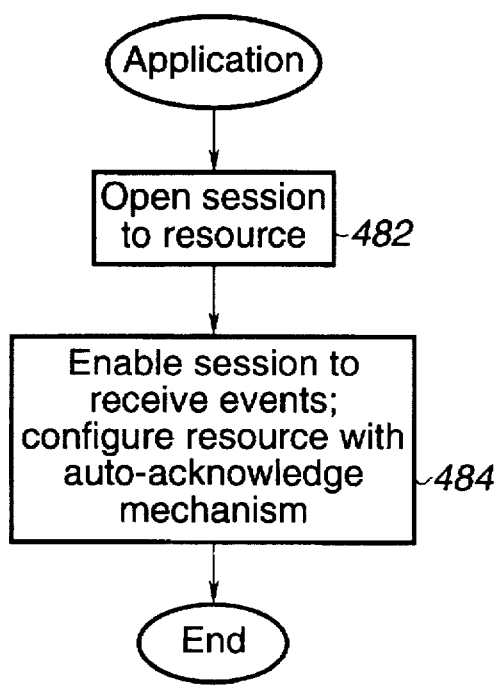
FIG. 32A-D illustrate flowchart diagrams of an event auto-acknowledge feature using event queueing according to the present invention.
Figure 32B:
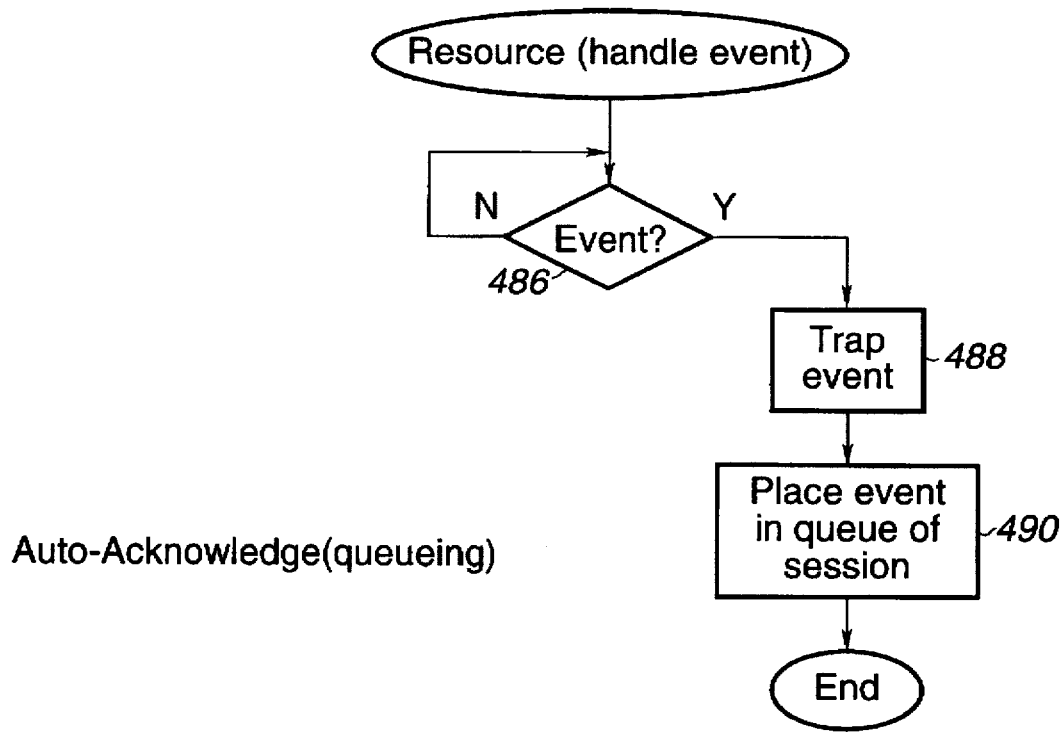

Referring now to FIG. 32, flowchart diagrams are shown illustrating an event auto-acknowledge feature using event queueing according to the present invention. As shown in FIG. 32A, in step 482 the application opens a session to a resource. In step 484 the application enables the session to receive events using a queueing mechanism. This step of enabling includes configuring the resource with an auto-acknowledge mechanism to direct the resource to automatically acknowledge events. This preferably includes setting the attribute VI_ATTR_AUTO_ACK FIG. 32B illustrates the steps that are performed by the resource when an event occurs. In step 486 the resource determines if an event has occurred. If so, then in step 488 the resource traps the event, and in step 490 the resource places the event in a queue of the session. In step 492 the application determines if the event in the session queue can be accessed. If the event is determined to be accessible, in step 494 the application accesses the event from the session queue. In step 496 the application then performs operations based on the accessed event. In step 498 the application then discards the event.

Figures 32C, 32D:
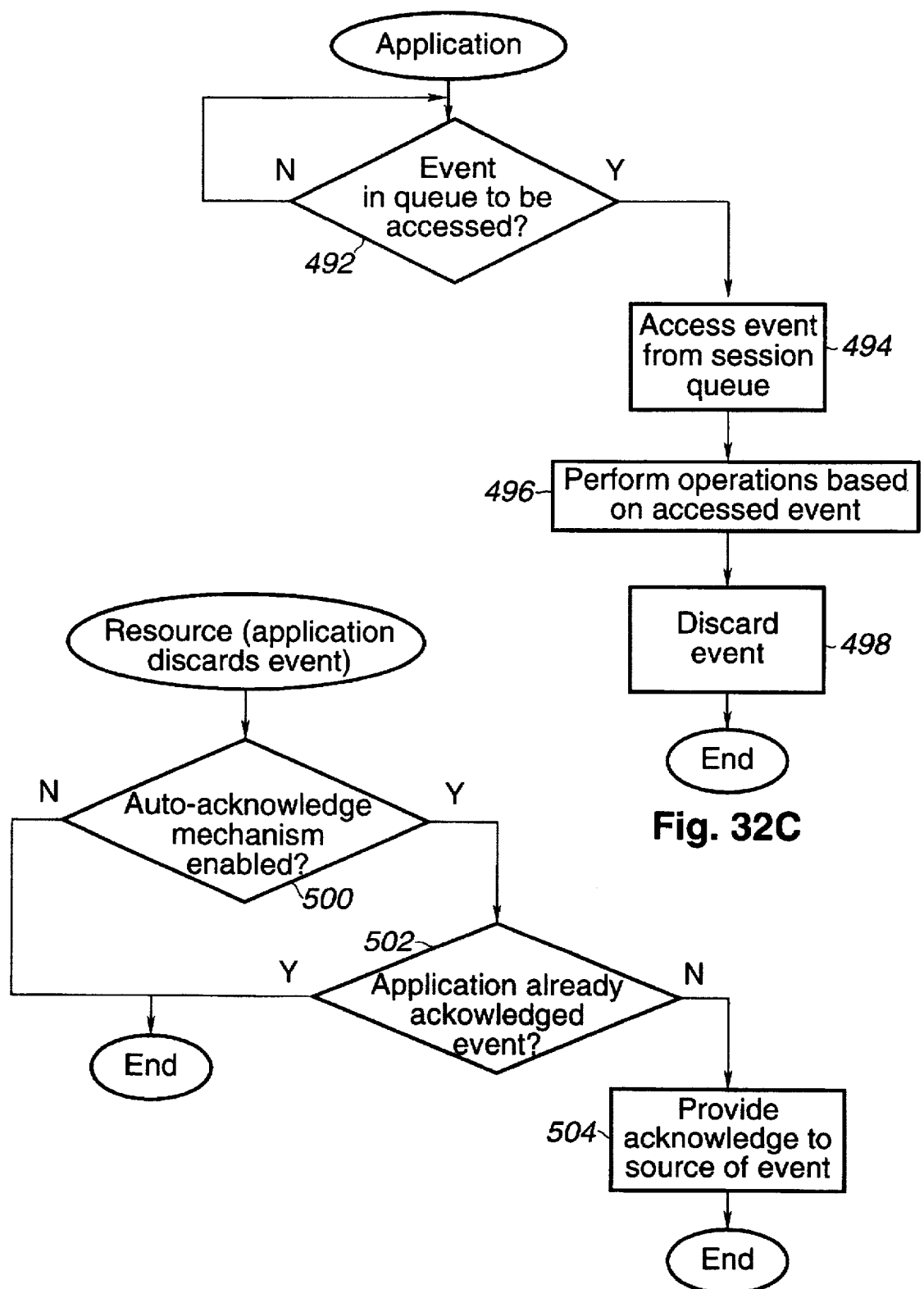

Referring now to FIG. 32D, in response to the event being discarded, the resource determines in step 500 if the auto-acknowledge mechanism is enabled. If the auto-acknowledge mechanism is not enabled, operation then completes. If the auto-acknowledge mechanism is determined to be enabled, then in one embodiment in step 502 the resource determines if the application has already acknowledged the event. If the event has already been acknowledged by the application, operation completes and an error is returned. If the auto-acknowledge mechanism is enabled and the event has not yet been acknowledged, in step 504 the resource automatically provides an acknowledge to the source of the event and operation completes.

Figure 33A:
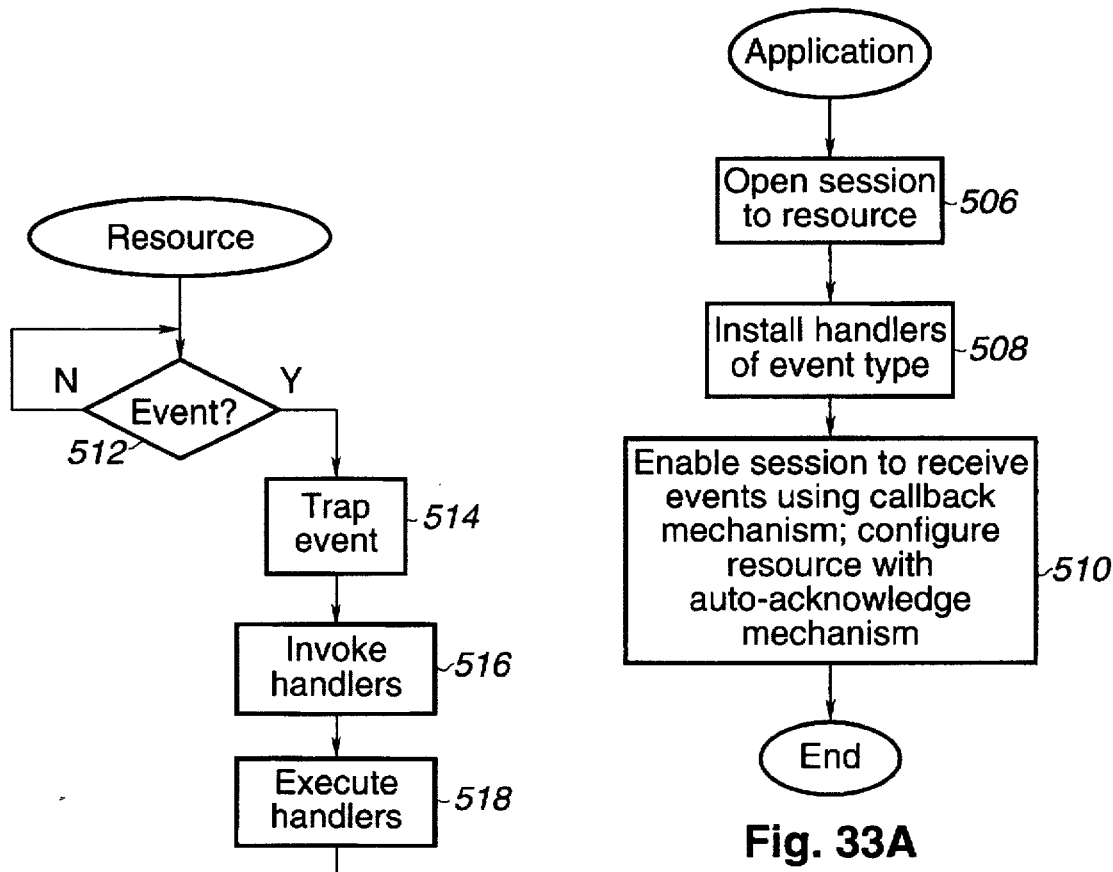
FIG. 33A, and 33B illustrate flowchart diagrams of an event auto-acknowledge feature using event callbacks according to the present invention.

Referring now to FIG. 33, flowchart diagrams illustrating an event auto-acknowledge feature using event callbacks according to the present invention are shown. Referring now to FIG. 33A, in step 506 the application opens a session to a resource. In step 508 the application installs handlers of an event type. In step 510 the application enables the session to receive events using a callback mechanism. This step of enabling includes configuring the resource with an auto-acknowledge mechanism to direct the resource to automatically acknowledge events.

Figure 33B:
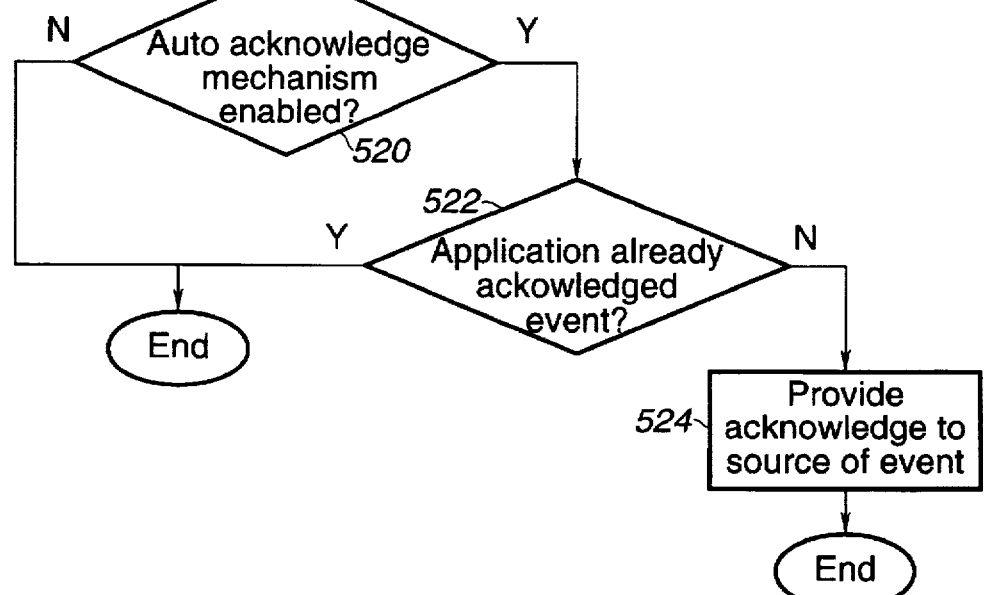

Referring now to FIG. 33B, In step 512 the resource determines if an event has occurred. In step 514 the resource traps the event. The resource then invokes one or more handlers in step 516. In step 518 the handlers are executed. In step 520 the resource determines if the auto-acknowledge mechanism is enabled. If the auto-acknowledge mechanism is not enabled, then operation completes. If the auto-acknowledge mechanism is enabled, then in step 522 the resource determines if the application has already acknowledged the event. If the application has already acknowledged the event, then operation completes. If the application has not already acknowledged the event, then in step 524 the resource automatically provides an acknowledge to the source of the event, and operation completes.

Therefore, according to the present invention, an application which enables a session to a resource to receive events can configure the resource with an auto-acknowledge mechanism which directs the resource to automatically acknowledge events of that type. This simplifies application development in the instrumentation system.

Auto-Enable

Referring now to FIG. 34, flowchart diagrams are shown illustrating an auto-enable feature according to the present invention. Referring now to FIG. 34A, in step 526 the application opens a first session to a resource. In step 528 the application opens a second session to a resource. In step 530 the application enables the first session to receive events from the resource using a queueing mechanism. This step of enabling enables hardware associated with the event type of the first session to report events. In step 532 the application enables the second session to receive events from the resource using a queueing mechanism. The hardware necessary to report these events is already enabled from step 530.

Referring now to FIG. 34B, in step 534 the resource determines if an event has occurred. In step 536 the resource traps the event. In step 538 the resource places the event in a queue of the first and second sessions, whereby both sessions can access the event in the session queue. Referring now to FIG. 34C, in step 540 the application disables events in the first session. Here it is noted that the hardware remains enabled since events are still enabled for the second session. The application then disables events in the second session in step 542. Referring now to FIG. 34D, in step 544 the resource determines if events of the first type are disabled for all sessions. If events of the first type are not disabled for all sessions, then operation completes. If all events of the first type are determined to be disabled, in step 546 the resource disables the hardware associated with the event type of the session, and operation completes.

Low Level Control of Interrupt Hardware

Figure 35:
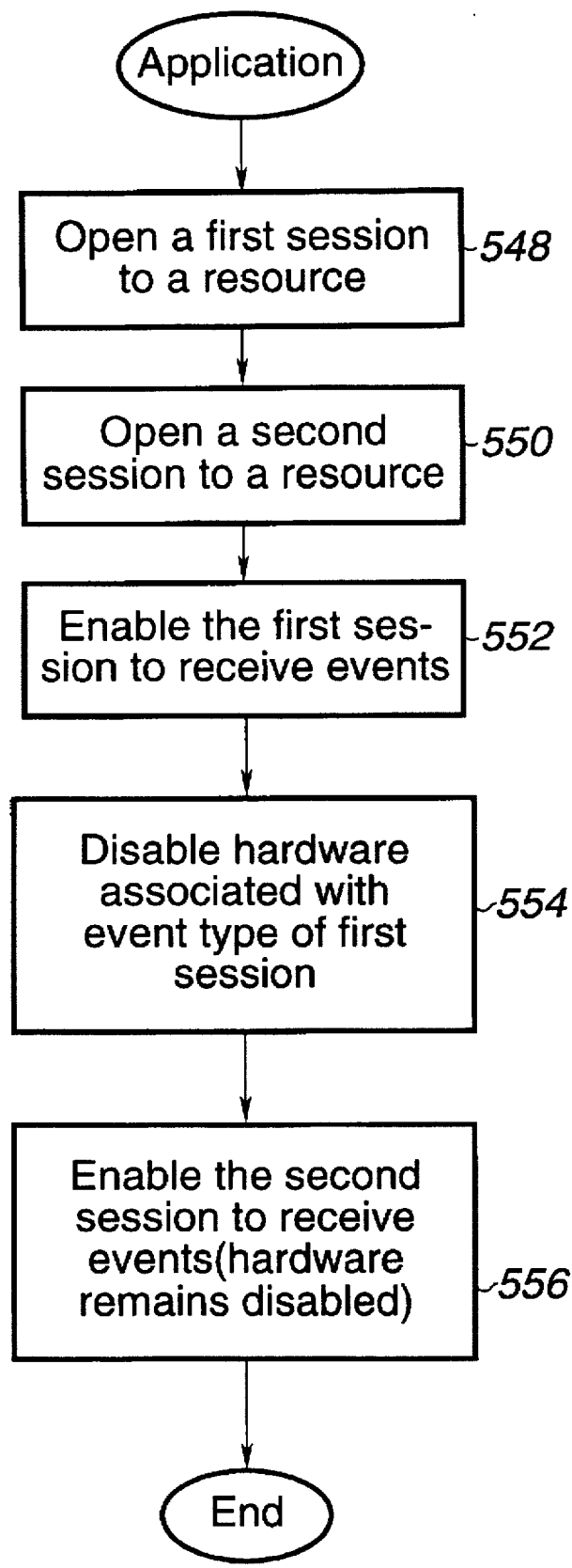
FIG. 35 is a flowchart diagram illustrating a session disabling hardware associated with an event type.

Referring now to FIG. 35, a flowchart diagram illustrating a session disabling hardware associated with an event type of a session is shown. In step 548 the application opens a first session to a resource. In step 550 the application opens a second session to a resource. In step 552 the application enables the first session to receive events from the resource. This step of enabling enables hardware associated with the event type of the first session to report events. In step 554 the application disables the hardware associated with the event type of the first session. In step 556 the application enables second session to receive events. Here the hardware remains disabled since the hardware associated with this event type was disabled in step 554. Operation then completes. Therefore, the present invention provides very low level control over interrupt conditions within the system.

Event Queue Full Disabling

Figures 36A, 36B, 36C:
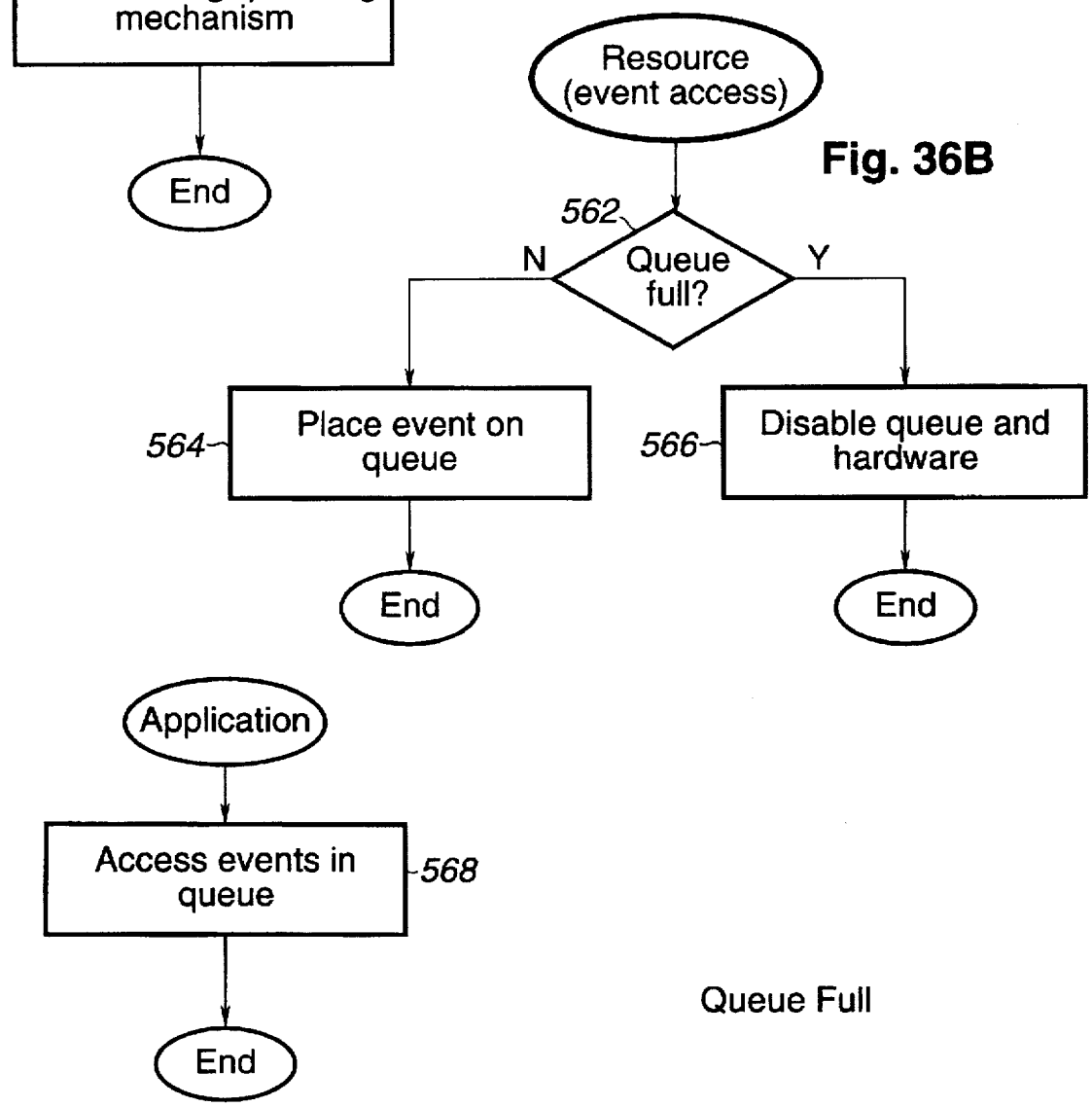
FIG. 36A-C illustrate flowchart diagrams of a resource disabling an event queue when the queue becomes full.

Referring now to FIG. 36, flowchart diagrams are shown illustrating a resource disabling an event queue when the queue becomes full. As shown in FIG. 36A, in step 558 the application opens a first session to a resource. The resource includes a queue of size N for receiving events. In step 560 the application enables the first session to receive events using a queueing mechanism. Referring now to FIG. 36B, when an event occurs, the resource determines in step 562 if the queue is full. If the queue is determined to be full, then in step 566 the resource disables the queue. The resource preferably maintains the queue disabled until the queue is no longer full. If the queue is not full, then in step 564 the resource places the event in the queue of the first session. Later when an application desires to access one or more events from the queue. In step 568 the application accesses an event in the queue and operation completes. Therefore, the present invention guarantees that events are not lost due to the queue becoming full.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for handling events in an instrumentation system comprising a computer system, one or more instruments coupled to the computer system, and one or more resources comprised in the computer system for controlling functions of said one or more instruments, the method comprising the computer-implemented steps of:

one of said one or more instruments generating an event in the system;

a resource trapping the event;

the resource determining which sessions have been enabled with callback mechanisms for said event after said step of trapping;

the resource invoking handlers in a handler list of each session determined to be enabled with a callback mechanism for said event after said step of determining which sessions have been enabled with callback mechanisms;

the resource determining if any current sessions are waiting on said event;

the resource unblocking wait of said sessions determined to be waiting on said event;

the resource determining if any sessions are enabled for queueing if current sessions are not waiting on events;

the resource placing an event in a session queue if any sessions are enabled for queueing and current sessions are not waiting on events;

the resource determining if any sessions have enabled handlers suspended; and the resource queuing the event occurrence for sessions determined to have enabled handlers suspended.

2. The method of claim 1, wherein said steps of the resource determining if any sessions have enabled handlers suspended and the resource queuing the event occurrence for sessions determined to have enabled handlers suspended are performed only if no sessions are enabled with callback mechanisms.

3. The method of claim 1, wherein said one of said one or more instruments comprises a VXI instrument.

4. The method of claim 1, wherein said one of said one or more instruments comprises a data acquisition card in the computer system.

5. The method of claim 1, wherein said one of said one or more instruments comprises a resource in the computer system.

6. A method for handling events in an instrumentation system comprising a computer system, one or more instruments coupled to the computer system, and one or more resources comprised in the computer system for controlling functions of said one or more instruments, wherein a single operation is used to enable events of all event types, the method comprising the computer implemented steps of:

opening a first session to a resource;

invoking a first operation to enable said first session to receive events of a first type from said resource using a queuing mechanism;

invoking said first operation to enable said first session to receive events of a second type from said resource using a queueing mechanism;

one of said one or more instruments causing an event of said first type to occur in the system;

the resource trapping said event of said first type;

the resource placing said event of said first type in a queue of said first session, wherein said first session can access said event in said session queue using a second operation;

one of said one or more instruments causing an event of said second type to occur in the system;

the resource trapping said event of said second type; and the resource placing said event of said second type in a queue of said first session, wherein said first session can access said event in said session queue using said second operation.

7. The method of claim 6, wherein said events of said first type comprise at least one of the group consisting of: triggers, interrupts, exceptions, system requests (SRQs), template events, and bus errors; and wherein said events of said second type comprise at least one of the group consisting of: triggers, interrupts, exceptions, system requests (SRQs), template events, and bus errors.

8. The method of claim 6, wherein the computer system includes Virtual Instrument Software Architecture (VISA) driver level software, wherein said first operation is viEnableEvent.

9. The method of claim 6, wherein said one of said one or more instruments comprises a VXI instrument.

10. The method of claim 6, wherein said one of said one or more instruments comprises a data acquisition card in the computer system.

11. The method of claim 6, wherein said one of said one or more instruments comprises a resource in the computer system.

12. A method for handling events in an instrumentation system comprising a computer system, one or more instruments coupled to the computer system, and one or more resources comprised in the computer system for controlling functions of said one or more instruments, wherein a single operation is used to install handlers for events of all event types, the method comprising the computer implemented steps of:

opening a first session to a resource;

invoking a first operation to install one or more first handlers which perform functions when an event of a first type occurs;

invoking said first operation to install said one or more second handlers which perform functions when an event of a second type occurs;

enabling said first session to receive events of said first type using a callback mechanism;

enabling said first session to receive events of said second type using a callback mechanism;

one of said one or more instruments generating an event of said first type in the system;

the resource trapping said event of said first type;

the resource invoking said one or more first handlers for said first session in response to said event occurrence of said first type;

one of said one or more instruments generating an event of said second type in the system;

the resource trapping said event of said second type;

the resource invoking said one or more second handlers for said first session in response to said event occurrence of said second type.

13. The method of claim 12, wherein said events of said first type comprise one or more of the group consisting of: triggers, interrupts, exceptions, system requests (SRQs), template events, and bus errors;

wherein said events of said second type comprise one or more of the group consisting of: triggers, interrupts, exceptions, system requests (SRQs), template events, and bus errors.

14. The method of claim 12, wherein the computer system includes Virtual Instrument Software Architecture (VISA) driver level software, wherein said first operation is viInstallHandler.

15. The method of claim 12, wherein said step of enabling said first session to receive events of said first type comprises invoking a second operation to enable said first session to receive events of said first type; and wherein said step of enabling said first session to receive events of said second type comprises invoking said second operation to enable said first session to receive events of said second type.

16. The method of claim 15, wherein the computer system includes Virtual Instrument Software Architecture (VISA) driver level software, wherein said first operation is viInstallHandler and wherein said second operation if viEnableEvent.

17. The method of claim 12, wherein said one of said one or more instruments comprises a VXI instrument.

18. The method of claim 12, wherein said one of said one or more instruments comprises a data acquisition card in the computer system.

19. The method of claim 12, wherein said one of said one or more instruments comprises a resource in the computer system.

20. A method for handling events in an instrumentation system comprising a computer system, one or more instruments coupled to the computer system, and one or more resources comprised in the computer system for controlling functions of said one or more instruments, the method comprising the computer implemented steps of:

opening a first session to a resource;

enabling said first session to receive events of a first type from said resource using a queuing mechanism, wherein said step of enabling is qualified by one or more filter parameters, wherein a first filter function is applied to events using said one or more filter parameters when events are received and said first filter only allows a subset of received events to be received by said first session;

one of said one or more instruments generating an event of said first type in the system;

the resource trapping said event of said first type;

the resource invoking said first filter function;

said first filter function comparing said event of said first type with said filter parameters;

said first filter function determining if said event of said first type should be received by said first session based on said step of comparing; and the resource placing said event of said first type in a queue of said first session if said comparison indicates that said session should receive said event, wherein said first session can access said event in said session queue, wherein said event is not placed in said queue if said comparison indicates that said session should not receive said event.

21. The method of claim 20, wherein said one or more filter parameters comprise a range of logical addresses of said one or more instruments from which it is desired to receive events;

wherein said one of said one or more instruments which generate an event of said first type in the system has a first logical address;

wherein said step of said first filter function comparing said event of said first type with said filter parameters comprises determining if said first logical address is in said range of logical addresses.

22. The method of claim 20, wherein said one or more filter parameters indicate an edge of a first interrupt line that is desired to be received as an event;

wherein said event of said first type in the system comprises a change in signal edge of said first interrupt line;

wherein said step of said first filter function comparing said event of said first type with said filter parameters comprises determining if said first interrupt line has said edge.

23. The method of claim 22, wherein said first interrupt line is a trigger line.

24. The method of claim 20, wherein said one of said one or more instruments comprises a VXI instrument.

25. The method of claim 20, wherein said one of said one or more instruments comprises a data acquisition card in the computer system.

26. The method of claim 20, wherein said one of said one or more instruments comprises a resource in the computer system.

27. A method for handling events in an instrumentation system comprising a computer system, one or more instruments coupled to the computer system, and one or more resources comprised in the computer system for controlling functions of said one or more instruments, the method comprising:

opening a first session to a resource;

installing one or more handlers which perform functions when an event of a first type occurs;

enabling said first session to receive events of said first type using a callback mechanism wherein said step of enabling is qualified by one or more filter parameters, wherein a first filter function is applied to events using said one or more filter parameters when events are received and said first filter only allows a subset of received events to be received by said first session;

one of said one or more instruments generating an event of said first type in the system;

the resource trapping said event of said first type;

the resource invoking said first filter function;

said first filter function comparing said event of said first type with said filter parameters;

said first filter function determining if said event of said first type should be received by said first session based on said step of comparing; and the resource invoking said one or more handlers for said first session in response to said event occurrence of said first type if said comparison indicates that said session should receive said event, wherein said one or more handlers are not invoked if said comparison indicates that said session should not receive said event.

28. The method of claim 27, wherein said one or more filter parameters comprise a range of logical addresses of said one or more instruments from which it is desired to receive events;

wherein said one of said one or more instruments which generate an event of said first type in the system has a first logical address;

wherein said step of said first filter function comparing said event of said first type with said filter parameters comprises determining if said first logical address is in said range of logical addresses.

29. The method of claim 27, wherein said one or more filter parameters indicate an edge of a first interrupt line that is desired to be received as an event;

wherein said event of said first type in the system comprises a change in signal edge of said first interrupt line;

wherein said step of said first filter function comparing said event of said first type with said filter parameters comprises determining if said first interrupt line has said edge.

30. The method of claim 29, wherein said first interrupt line is a trigger line.

31. The method of claim 27, wherein said one of said one or more instruments comprises a VXI instrument.

32. The method of claim 27, wherein said one of said one or more instruments comprises a data acquisition card in the computer system.

33. The method of claim 27, wherein said one of said one or more instruments comprises a resource in the computer system.

34. A method for handling events in an instrumentation system comprising a computer system, one or more instruments coupled to the computer system, one or more resources comprised in the computer system for controlling functions of said one or more instruments, and an application executing in the computer system which controls one or more of said one or more resources to perform desired instrumentation functions, the method comprising the computer implemented steps of:

the application opening a first session to a resource;

the application enabling said first session to receive events of a first type from said resource using a queuing mechanism, wherein said step of enabling includes configuring said resource with an auto-acknowledge mechanism to direct said resource to automatically acknowledge events of said first type;

one of said one or more instruments causing an event of said first type to occur in the system;

the resource trapping said event of said first type;

the resource placing said event of said first type in a queue of said first session, wherein said first session can access said event in said session queue;

the application accessing said event of said first type from said session queue;

the application discarding said event of said first type after said step of accessing;

the resource determining if said auto-acknowledge mechanism is enabled and if the application has not already acknowledged said event of said first type, wherein said step of determining is performed in response to said step of discarding; and the resource automatically providing an acknowledge to said instrument if said auto-acknowledge mechanism is enabled and the application has not already acknowledged said event of said first type.

35. The method of claim 34, wherein said step of enabling comprises configuring said resource to not automatically acknowledge said events of said first type; the method further comprising:

the application providing an acknowledge to the resource for said event before said step of discarding; and the resource providing an acknowledge to said one of said one or more instruments in response to said step of the application providing an acknowledge to the resource.

36. The method of claim 34, wherein said one of said one or more instruments comprises a VXI instrument.

37. The method of claim 34, wherein said one of said one or more instruments comprises a data acquisition card in the computer system.

38. The method of claim 34, wherein said one of said one or more instruments comprises a resource in the computer system.

39. A method for handling events in an instrumentation system comprising a computer system, one or more instruments coupled to the computer system, and one or more resources comprised in the computer system for controlling functions of said one or more instruments, and an application executing in the computer system which controls one or more of said one or more resources to perform desired instrumentation functions, the method comprising the computer implemented steps of:

the application opening a first session to a resource;

the application installing one or more handlers which perform functions when an event of a first type occurs;

the application enabling said first session to receive events of said first type using a callback mechanism, wherein said step of enabling comprises configuring said resource with an auto-acknowledge mechanism to direct said resource to automatically acknowledge events of said first type;

one of said one or more instruments generating an event of said first type in the system;

the resource trapping said event of said first type;

the resource invoking said one or more handlers for said first session in response to said event occurrence of said first type;

executing said one or more handlers;

the resource determining if said auto-acknowledge mechanism is enabled and if the application has not already acknowledged said event of said first type, wherein said step of determining is performed after said step of executing said one or more handlers;

the resource automatically providing an acknowledge to said instrument if said auto-acknowledge mechanism is enabled and the application has not already acknowledged said event of said first type.

40. The method of claim 39, wherein said step of enabling further comprises configuring said resource to not automatically acknowledge said events of said first type; the method further comprising:

the application providing an acknowledge to said resource for said event of said first type during said step of executing said one or more handlers; and the resource providing an acknowledge to said one of said one or more instruments.

41. The method of claim 39, wherein said one of said one or more instruments comprises a VXI instrument.

42. The method of claim 39, wherein said one of said one or more instruments comprises a data acquisition card in the computer system.

43. The method of claim 39, wherein said one of said one or more instruments comprises a resource in the computer system.

44. A method for handling events in an instrumentation system comprising a computer system, one or more instruments coupled to the computer system, and one or more resources comprised in the computer system for controlling functions of said one or more instruments, wherein the computer system includes hardware for monitoring signal conditions and reporting interrupts, the method comprising the computer implemented steps of:

opening a first session to a resource;

opening a second session to said resource;

enabling said first session to receive events of a first type from said resource using a queuing mechanism, wherein said step of enabling enables first hardware in the instrumentation system to report events, wherein said first hardware is associated with the event type of said first session;

enabling said second session to receive events of a first type from said resource using a queuing mechanism, wherein said first hardware is already enabled to report events;

an event of said first type occurring in the system;

the resource trapping said event of said first type;

the resource placing said event of said first type in a queue of said first session, wherein said first session can access said event in said session queue;

the application disabling events of said first type in said first session, wherein said first hardware is not disabled;

the application disabling events of said first type in said second session; and the resource disabling the first hardware associated with the event type of said session in response to application second session disabling events of said first type in said second session.

45. The method of claim 44, wherein said first hardware comprises hardware for controlling one or more on the group consisting of: triggers, interrupts, exceptions, system requests (SRQs), system events, and bus errors.

46. The method of claim 44, wherein said one of said one or more instruments comprises a VXI instrument.

47. The method of claim 44, wherein said one of said one or more instruments comprises a data acquisition card in the computer system.

48. The method of claim 44, wherein said one of said one or more instruments comprises a resource in the computer system.

49. A method for handling events in an instrumentation system comprising a computer system, one or more instruments coupled to the computer system, and one or more resources comprised in the computer system for controlling functions of said one or more instruments, wherein the computer system includes hardware for monitoring signal conditions and reporting interrupts, wherein an application executing in the computer system which controls one or more of said one or more resources to perform desired instrumentation functions, wherein the application can disable hardware associated with an event type of a session, the computer implemented steps of:

the application opening a first session to a resource;

the application opening a second session to said resource;

the application enabling said first session to receive events of a first type from said resource using a queuing mechanism, wherein said step of enabling enables first hardware in the instrumentation system associated with the event type of said first session to report events;

the application disabling said first hardware associated with the event type of said first session;

the application enabling said second session to receive events of a first type from said resource using a queuing mechanism after said step of the application disabling said first hardware, wherein said first hardware remains disabled;

an event of said first type occurring in the system;

the resource not trapping said event due to said first hardware being disabled.

50. The method of claim 49, wherein said first hardware comprises hardware for controlling one or more on the group consisting of: triggers, interrupts, exceptions, system requests (SRQs), system events, and bus errors.

51. The method of claim 49, wherein said one of said one or more instruments comprises a VXI instrument.

52. The method of claim 49, wherein said one of said one or more instruments comprises a data acquisition card in the computer system.

53. The method of claim 49, wherein said one of said one or more instruments comprises a resource in the computer system.

54. A method for handling events in an instrumentation system comprising a computer system, one or more instruments coupled to the computer system, one or more resources comprised in the computer system for controlling functions of said one or more instruments, and an application executing in the computer system which controls one or more of said one or more resources to perform desired instrumentation functions, the method comprising:

the application opening a first session to a resource, wherein said resource includes a queue of size N for receiving events of a first type;

the application enabling said first session to receive events of said first type from said resource using a queuing mechanism;

a plurality N of events of said first type occurring in the system;

the resource placing said N events of said first type in said queue of said first session, wherein said queue becomes full in response to said step of placing, wherein said first session can access said events in said session queue;

the resource disabling said queue of size N in response to said queue becoming full;

the application accessing an event in said queue, wherein said queue is no longer full;

the resource re-enabling said queue to receive additional events in response to said application accessing said event in said queue and said queue no longer being full.

55. The method of claim 54, wherein said one of said one or more instruments comprises a VXI instrument.

56. The method of claim 54, wherein said one of said one or more instruments comprises a data acquisition card in the computer system.

57. The method of claim 54, wherein said one of said one or more instruments comprises a resource in the computer system.

58. A method for handling events in an instrumentation system comprising a computer system, one or more instruments coupled to the computer system, and one or more resources comprised in the computer system for controlling functions of said one or more instruments, and an application executing in the computer system which controls one or more of said one or more resources to perform desired instrumentation functions, the method comprising the computer implemented steps of:

an application establishing a first session to a resource;

said application installing one or more handlers which perform functions when an event of a first type occurs;

said application enabling said first session to receive events of said first type using a callback mechanism;

said application causing said resource to signal its session that an event has occurred; and the resource invoking said one or more handlers for said first session in response to said event occurrence of said first type.

* * * * *